US012298392B2

(12) United States Patent
Wang et al.

(10) Patent No.: US 12,298,392 B2
(45) Date of Patent: May 13, 2025

(54) SCANNING MODULE, DISTANCE MEASURING DEVICE AND MOBILE PLATFORM

(71) Applicant: SZ DJI TECHNOLOGY CO., LTD., Shenzhen (CN)

(72) Inventors: Hao Wang, Shenzhen (CN); Huai Huang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 978 days.

(21) Appl. No.: 17/371,700

(22) Filed: Jul. 9, 2021

(65) Prior Publication Data

US 2021/0333393 A1     Oct. 28, 2021

Related U.S. Application Data

(63) Continuation of application No. PCT/CN2019/071055, filed on Jan. 9, 2019.

(51) Int. Cl.
*G01S 7/481*     (2006.01)
*G01S 7/484*     (2006.01)
(Continued)

(52) U.S. Cl.
CPC ............ *G01S 17/08* (2013.01); *G01S 7/4817* (2013.01); *G01S 7/484* (2013.01); *G02B 26/108* (2013.01)

(58) Field of Classification Search
None
See application file for complete search history.

(56) References Cited

U.S. PATENT DOCUMENTS 9,784,838 B1   10/2017   Shpunt et al.
2008/0252873 A1   10/2008   Ono
(Continued)

FOREIGN PATENT DOCUMENTS

CN     1580691 A     2/2005
CN     1651932 A     8/2005
(Continued)

OTHER PUBLICATIONS

The World Intellectual Property Organization (WIPO) International Search Report for PCT/CN2019/071055 Sep. 26, 2019 6 pages (translation included).

(Continued)

*Primary Examiner* — Eric L Bolda
(74) *Attorney, Agent, or Firm* — ANOVA LAW GROUP, PLLC

(57) ABSTRACT

A distance measuring device includes a scanning module including a rotor assembly, the rotor assembly including a rotor, the rotor including a receiving cavity and an optical element disposed in the receiving cavity, the optical element rotating synchronously with the rotor assembly, the optical element including a first end and a second end, the first end and the second end being respectively positioned at two ends in a radial direction of the optical element, a thickness of the first end being greater than a thickness of the second end, a notch being formed on a side of the first end of the rotor or/and the optical element; and a distance measuring module configured to emit a laser pulse to the scanning module.

21 Claims, 19 Drawing Sheets

(51) Int. Cl.
*G01S 17/08* (2006.01)
*G02B 26/10* (2006.01)

(56) References Cited

U.S. PATENT DOCUMENTS

| | | | |
|---|---|---|---|
| 2011/0026041 | A1 | 2/2011 | Schindler et al. |
| 2017/0160541 | A1* | 6/2017 | Carothers .............. G02B 17/08 |
| 2018/0180720 | A1 | 6/2018 | Pei et al. |
| 2018/0181839 | A1 | 6/2018 | Hoover et al. |
| 2018/0275275 | A1 | 9/2018 | Lundquist |
| 2018/0328728 | A1* | 11/2018 | Matsumoto .............. G02F 1/29 |
| 2020/0067390 | A1* | 2/2020 | Li .......................... H02K 16/02 |

FOREIGN PATENT DOCUMENTS

| | | |
|---|---|---|
| CN | 1969218 A | 5/2007 |
| CN | 101140349 A | 3/2008 |
| CN | 202255357 U | 5/2012 |
| CN | 102597802 A | 7/2012 |
| CN | 102928978 A | 2/2013 |
| CN | 104132639 A | 11/2014 |
| CN | 105115474 A | 12/2015 |
| CN | 105467398 A | 4/2016 |
| CN | 105759253 A | 7/2016 |
| CN | 105807284 A | 7/2016 |
| CN | 105954738 U | 9/2016 |
| CN | 106019293 A | 10/2016 |
| CN | 106019296 A | 10/2016 |
| CN | 106066475 A | 11/2016 |
| CN | 106094889 A | 11/2016 |
| CN | 106249405 A | 12/2016 |
| CN | 106291572 A | 1/2017 |
| CN | 106338725 A | 1/2017 |
| CN | 205899006 U | 1/2017 |
| CN | 106405828 A | 2/2017 |
| CN | 206073988 U | 4/2017 |
| CN | 106767513 A | 5/2017 |
| CN | 106772407 A | 5/2017 |
| CN | 206387904 U | 8/2017 |
| CN | 107219532 A | 9/2017 |
| CN | 107356930 A | 11/2017 |
| CN | 206627626 U | 11/2017 |
| CN | 107462895 A | 12/2017 |
| CN | 207067400 U | 3/2018 |
| CN | 107941204 A | 4/2018 |
| CN | 207191469 U | 4/2018 |
| CN | 108007365 A | 5/2018 |
| CN | 108061904 A | 5/2018 |
| CN | 207366745 U | 5/2018 |
| CN | 108107442 A | 6/2018 |
| CN | 207502719 U | 6/2018 |
| CN | 207516546 U | 6/2018 |
| CN | 108318874 A | 7/2018 |
| CN | 207663045 U | 7/2018 |
| CN | 108445467 A | 8/2018 |
| CN | 108474654 A | 8/2018 |
| CN | 108475961 A | 8/2018 |
| CN | 108490420 A | 9/2018 |
| CN | 108496298 A | 9/2018 |
| CN | 108508431 A | 9/2018 |
| CN | 108549085 A | 9/2018 |
| CN | 207820058 U | 9/2018 |
| CN | 208125924 U | 11/2018 |
| CN | 108983196 A | 12/2018 |
| CN | 209485276 U | 10/2019 |
| CN | 209878990 U | 12/2019 |
| CN | 111328376 A | 6/2020 |
| EP | 1503221 A1 | 2/2005 |
| EP | 2533068 B1 | 8/2018 |
| JP | 07098379 A | 4/1995 |
| JP | 2000168698 A | 6/2000 |
| JP | 2006162857 A | 6/2006 |
| JP | 2018066571 A | 4/2018 |
| PL | 224520 B1 | 1/2017 |
| WO | 2013183435 A | 12/2013 |
| WO | 2017191665 A1 | 11/2017 |
| WO | 2017215569 A1 | 12/2017 |
| WO | 2018055513 A2 | 3/2018 |
| WO | 2018056516 A1 | 3/2018 |

OTHER PUBLICATIONS

The World Intellectual Property Organization (WIPO) International Search Report for PCT/CN2019/071054 Oct. 9, 2019 6 pages (translation included).
The World Intellectual Property Organization (WIPO) International Search Report for PCT/CN2019/071056 Sep. 26, 2019 6 pages (translation included).
The World Intellectual Property Organization (WIPO) International Search Report for PCT/CN2019/071053 Sep. 30, 2019 6 pages (translation included).

* cited by examiner

SCANNING MODULE, DISTANCE MEASURING DEVICE AND MOBILE PLATFORM

CROSS-REFERENCE TO RELATED APPLICATIONS

This application is a continuation of International Application No. PCT/CN2019/071055, filed on Jan. 9, 2019, the entire content of which is incorporated herein by reference.

TECHNICAL FIELD

The present disclosure relates to the technical field of laser distance measuring and, more specifically, to a scanning module, a distance measuring device, and a mobile platform.

BACKGROUND

For a mechanical distance measuring device to improve the utilization efficiency of laser emitting and receiving element conditions and realize high-density and high-resolution three-dimensional spatial scanning and distance measuring, a high speed motor is needed to deflect and scan the light path. The high speed motor will cause greater vibration of the distance measuring device, thereby reducing the distance measuring efficiency of the distance measuring device.

SUMMARY

An aspect of the present disclosure provides a distance measuring device. The distance measuring device includes a scanning module including a rotor assembly, the rotor assembly including a rotor, and the rotor including a receiving cavity and an optical element disposed in the receiving cavity. The optical element rotates synchronously with the rotor assembly. The optical element includes a first end and a second end, the first end and the second end being respectively positioned at two ends in a radial direction of the optical element. A thickness of the first end being greater than a thickness of the second end. A notch is formed on a side of the first end of the rotor or/and the optical element. The distance measuring device further includes a distance measuring module configured to emit a laser pulse to the scanning module. The scanning module is configured to change a transmission direction of the laser pulse and emit the laser pulse. The laser pulse reflected by an object to be detected passes through the scanning module and enters the distance measuring module. The distance measuring module is configured to determine a distance between the object to be detected and the distance measuring device based on the reflected laser pulse.

Another aspect of the present disclosure provides a distance measuring device. The distance measuring device includes a scanning module. The scanning module includes a first rotor assembly, the first rotor assembly including a first rotor, the first rotor including a first receiving cavity; a first optical element mounted in the first receiving cavity, the first optical element including a first end and a second end, the first end of the first optical element and the second end of the first optical element being respectively positioned at two ends in a radial direction of the first optical element, a thickness of the first end of the first optical element being greater than a thickness of the second end of the first optical element, a notch being formed on a side of the first rotor or/and the first optical element positioned at the first end of the first optical element; a second rotor assembly, the second rotor assembly including a second rotor and a boss, the second rotor including a second receiving cavity, the boss being disposed on an inner wall of the second rotor and positioned in the second receiving cavity; and a second optical element mounted in the second receiving cavity, the second optical element including a first end and a second end, the first end of the second optical element and the second end of the second optical element being respectively positioned at two ends in a radial direction of the second optical element, a thickness of the first end of the second optical element being greater than a thickness of the second end of the second optical element, the second end of the second optical element being opposite to the boss and positioned on the same side of a second rotation axis of the second rotor. The distance measuring device further includes a distance measuring module configured to emit a laser pulse to the scanning module. The scanning module is configured to change a transmission direction of the laser pulse and emit the laser pulse. The laser pulse reflected by an object to be detected passes through the scanning module and enters the distance measuring module. The distance measuring module is configured to determine a distance between the object to be detected and the distance measuring device based on the reflected laser pulse.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION OF THE EMBODIMENTS

Figure 1:
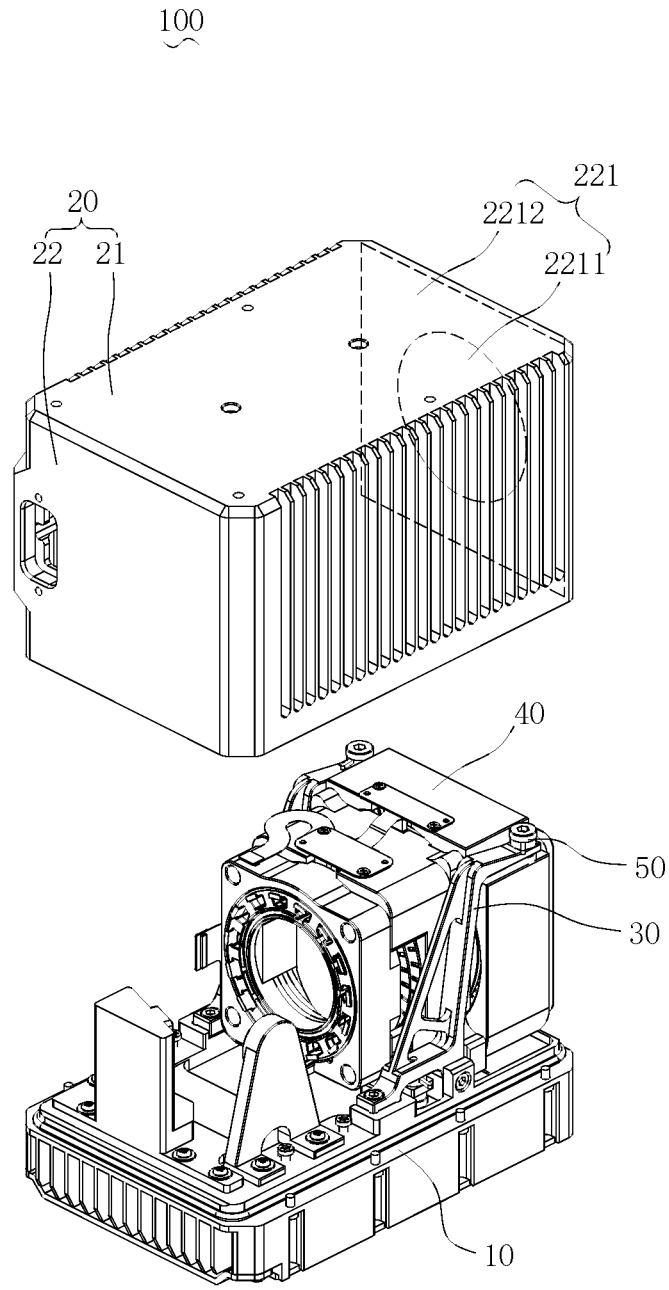
FIG. 1 is a partially exploded schematic diagram of a distance measuring device according to some embodiments of the present disclosure.

Reference will now be made in detail to exemplary embodiments, examples of which are illustrated in the accompanying drawings, in which the same or similar reference numbers throughout the drawings represent the same or similar elements or elements having same or similar functions. Embodiments described below with reference to drawings are merely exemplary and used for explaining the present disclosure, and should not be understood as limitation to the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom", "inner", "outer", "clockwise", "anticlockwise" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections or can communicate with each other; may also be direct connections or indirect connections via intervening structures; may also be inner communications of two elements or interactions of two elements, which can be understood by those skilled in the art according to specific situations.

In the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

The following disclosure provides many different embodiments or examples for implementing different structures of the present disclosure. To simplify the present disclosure, the components and arrangements of the specific examples are described below. Of course, they are merely examples and are not intended to limit the invention. In addition, the present disclosure may repeat the reference numerals and/or letters, which is for the purpose of simplicity and clarity and does not itself indicate the relationship between the various embodiments and/or settings discussed. In addition, the present disclosure provides examples of various specific processes and materials, but those of ordinary skill in the art may be aware of the application of other processes and/or the user of other materials.

Figure 9:
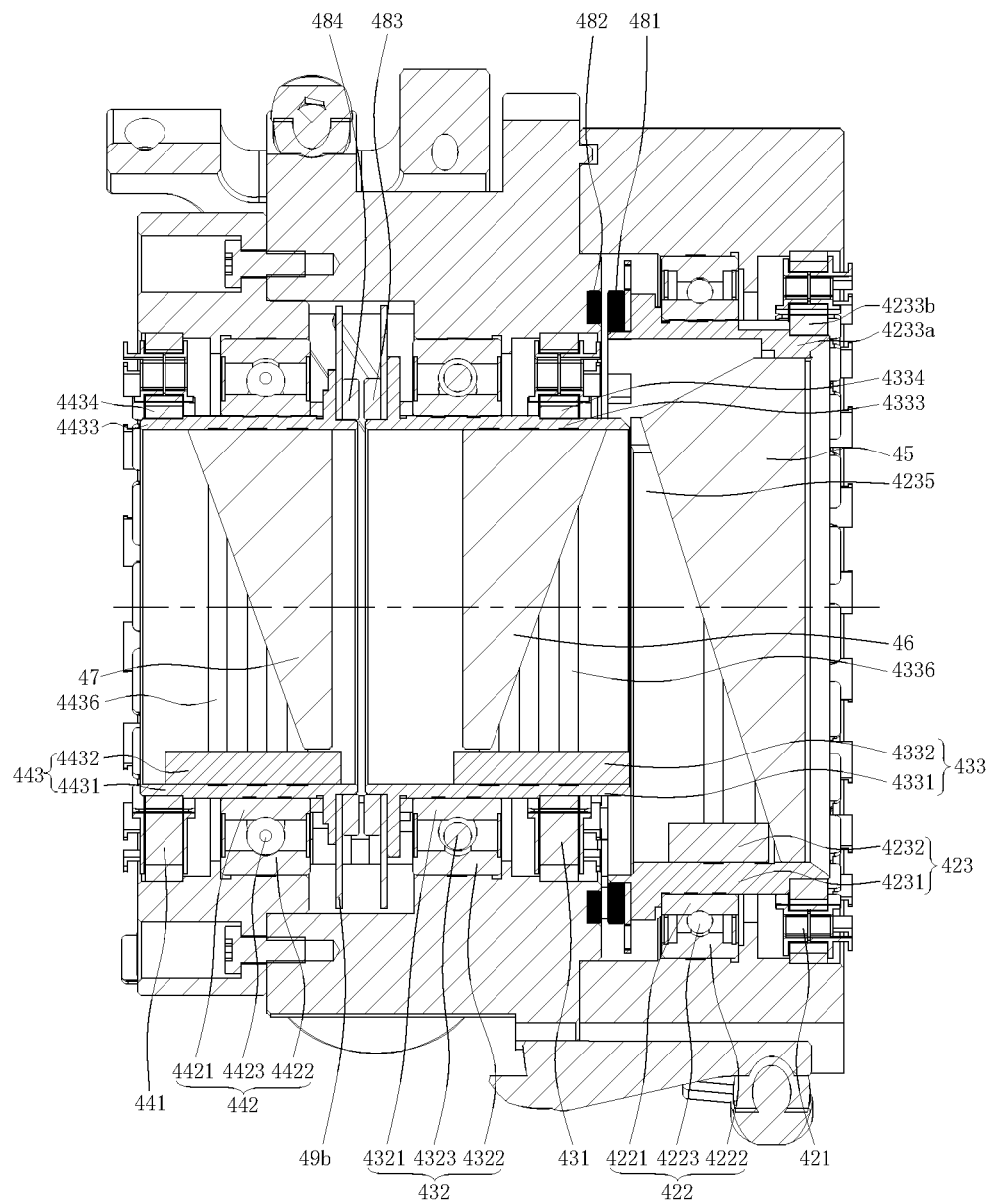
FIG. 9 is a schematic cross-sectional view of a partial structure of the scanning module shown in FIG. 4.
Figure 10:
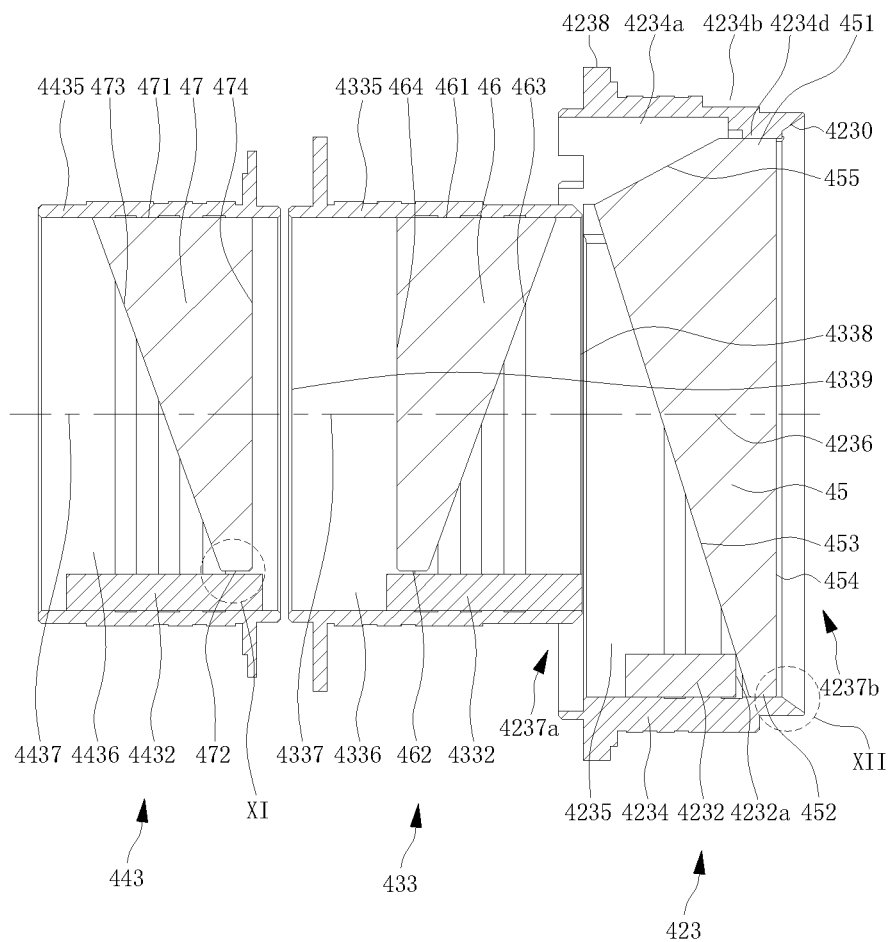
FIG. 10 is a schematic cross-sectional view of a partial structure of the scanning module shown in FIG. 4.

Referring to FIG. 9 and FIG. 10, an embodiment of the present disclosure provides a scanning module 40. The scanning module 40 includes a rotor assembly 433, a stator assembly 431, and an optical element 46. The rotor assembly 433 includes a rotor 4331 and a boss 4332. The rotor 4331 is formed with a receiving cavity 4336, and the boss 4332 is disposed on the inner wall of the rotor 4331 and positioned in the receiving cavity 4336. The stator assembly 431 may be configured to drive the rotor assembly 433 to rotate relative to the stator assembly 431. The optical element 46 may be mounted in the receiving cavity 4336 and configured to rotate synchronously with the rotor assembly 433. The optical element 46 may rotate synchronously with the rotor assembly 433. The optical element 46 includes a first end 461 and a second end 462. The first end 461 and the second end 462 are respectively positioned at two ends in the radial direction of the optical element 46. The thickness of the first end 461 may be greater than the thickness of the second end 462, and the second end 462 may be opposite to the boss 4332 and positioned on the same side of a rotation axis 4337 of the rotor 4331. Further, the first end 461 and the boss 4332 may be positioned on opposite sides of the rotation axis 4337.

Referring to FIG. 9 and FIG. 10, an embodiment of the present disclosure provides a scanning module 40. The scanning module 40 includes a rotor assembly 423 and an optical element 45. The rotor assembly 423 includes a rotor 4231, and the rotor 4231 is formed with a receiving cavity

4235. The optical element 45 is mounted in the receiving cavity 4235 and can rotate synchronously with the rotor assembly 423. The optical element 45 includes a first end 451 and a second end 452. The first end 451 and the second end 452 are respectively positioned at two ends in the radial direction of the optical element 45, and the thickness of the first end 451 may be greater than the thickness of the second end 452. A notch may be formed on the side of the rotor 4231 or/and the optical element 45 at the first end 451.

Referring to FIG. 9 and FIG. 10, an embodiment of the present disclosure provides a scanning module 40. The scanning module 40 includes a first rotor assembly 423, a first optical element 45, a second rotor assembly 433, and a second optical element 46. The first rotor assembly 423 includes a first rotor 4231, and the first rotor 4231 is formed with a first receiving cavity 4236. The first optical element 45 is mounted in the first receiving cavity 4236. The first optical element 45 includes a first end 451 and a second end 452. The first end 451 of the first optical element 45 and the second end 452 of the first optical element 45 are respectively positioned at two ends in the radial direction of the first optical element 45. The thickness of the first end 451 of the first optical element 45 may be greater than the thickness of the second end 452 of the first optical element 45. A notch may be formed on the first rotor 4231 or/and the side of the first optical element 45 positioned at the first end 451 of the first optical element 45. The second rotor assembly 433 includes a second rotor 4331 and a boss 4332. The second rotor 4331 is formed with a second receiving cavity 4336. The boss is disposed on the inner wall of the second rotor 4331 and positioned in the second receiving cavity 4336. The second optical element 46 is mounted in the second receiving cavity 4336. The second optical element 46 includes a first end 461 and a second end 462. The first end 461 of the second optical element 46 and the second end 462 of the second optical element 46 are respectively positioned at two ends of the second optical element 46 in the radial direction. The thickness of the first end 461 of the second optical element 46 may be greater than the thickness of the second end 462 of the second optical element 46. The second end 462 of the second optical element 46 may be opposite to the boss 4332 and positioned on the same side of the second rotation axis 4337 of the second rotor 4331. In addition, the first end 461 of the second optical element 46 and the boss 4332 may be positioned on opposite sides of the second rotation axis 4337.

Referring to FIG. 1 and FIG. 9, an embodiment of the present disclosure provides a distance measuring device 100. The distance measuring device 100 includes the scanning module 40 and the distance measuring module 60 of nay one of the above embodiments. The distance measuring module 60 may be configured to emit a laser pulse to the scanning module 40. The scanning module 40 may be configured to change the transmission direction of the laser pulse and then emit it. The laser pulse reflected by an object to be detected may pass through the scanning module 40 and then enter the distance measuring module 60. The distance measuring module 60 may be configured to determine the distance between the object to be detected and the distance measuring device 100 based on the reflected laser pulse.

In the scanning module 40 and the distance measuring device 100 of the present disclosure, due to the uneven weight distribution of the wedge mirror itself, when the wedge mirror is rotated at a high speed, the entire scanning module 40 may be easily shaken and not stable enough. In the present disclosure, a boss 4332 is disposed in the rotor 4331 to reduce the shaking of the rotor assembly 433 when it rotates, which is beneficial for the entire rotor assembly 433 to rotate more smoothly. Alternatively, the present disclosure can reduce the shaking of the rotor assembly 423 during rotation by forming a notch on the side of the rotor 4231 or/and the optical element 45 positioned at the first end 451, which is beneficial for the entire rotor assembly 423 to rotate more smoothly. That is, the vibration of the distance measuring device 100 can be reduced or even negligible, and the distance measuring accuracy of the distance measuring device 100 is improved.

Figure 25:
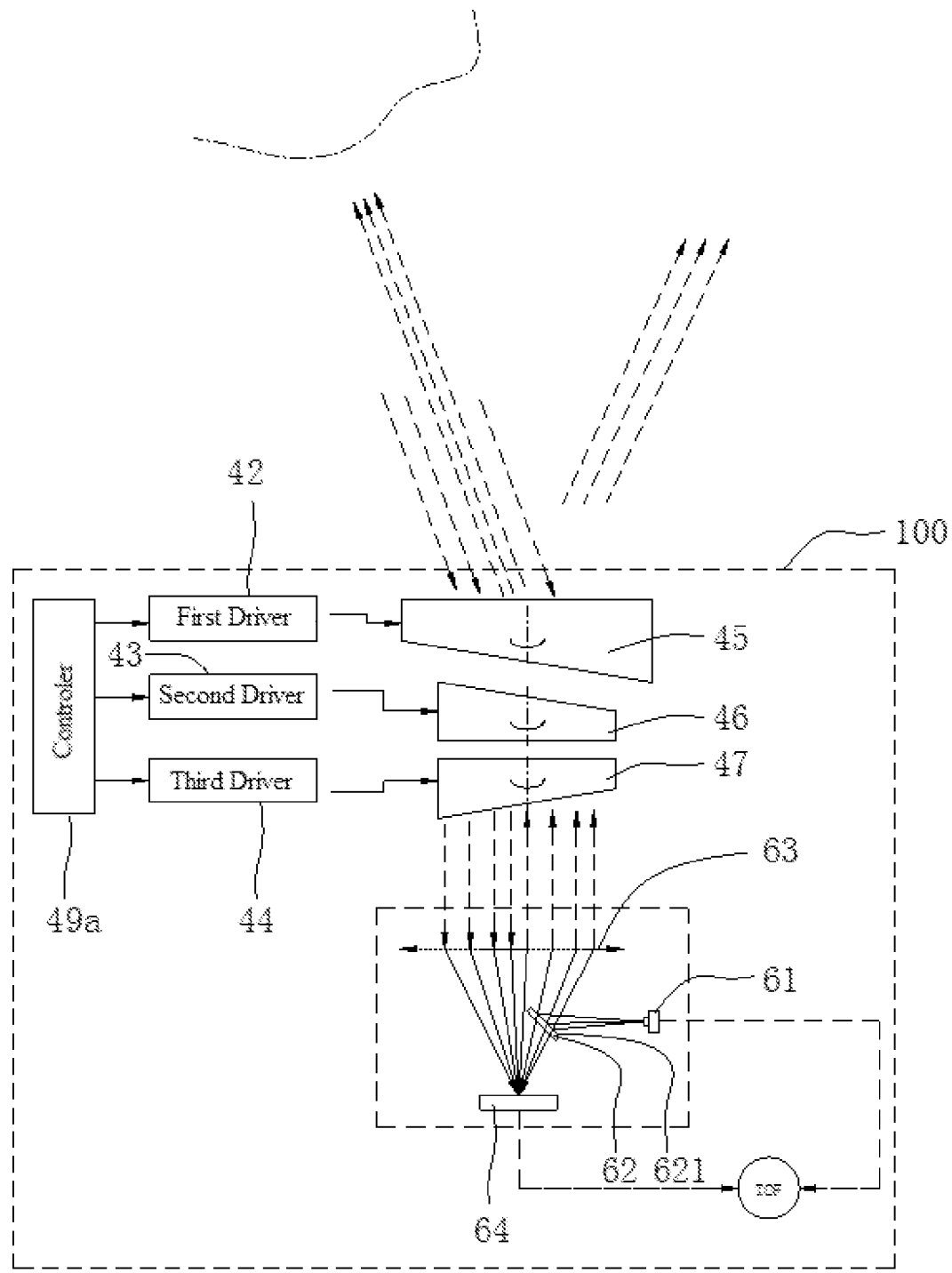
FIG. 25 is a schematic diagram of the distance measurement principle of the distance measuring device according to some embodiments of the present disclosure.

Referring to FIG. 1 and FIG. 25, the distance measuring device 100 includes a base 10, a cover 20, two brackets 30, a scanning module 40, a plurality of flexible connection assemblies 50, and a distance measuring module 60. The two brackets 30 are both fixed on opposite sides of the base 10. The scanning module 40 and the distance measuring module 60 are disposed on the base 10 at intervals and positioned between the two brackets 30, and each bracket 30 is connected to the scanning module 40 through at least two flexible connection assemblies 50. The distance measuring module 60 may be configured to emit a laser pulse to the scanning module 40. The scanning module 40 may be configured to change the transmission direction of the laser pulse and then emit it. The laser pulse reflected by an object to be detected may pass through the scanning module 40 and then enter the distance measuring module 60. The distance measuring module 60 may be configured to determine the distance between the object to be detected and the distance measuring device 100 based on the reflected laser pulse. The distance measuring device 100 may detect distance of the object to be detected to the distance measuring device 100 by measuring the time of light propagation between the distance measuring device 100 and the object to be detected, that is, the time-of-flight (TOF). Alternatively, the distance measuring device 100 may also detect the distance from the object to be detected to the distance measuring device 100 through other technologies, such as a distance measuring method based on phase shift measurement, or a distance measuring method based on frequency shift measurement, which is not limited herein.

Figure 2:
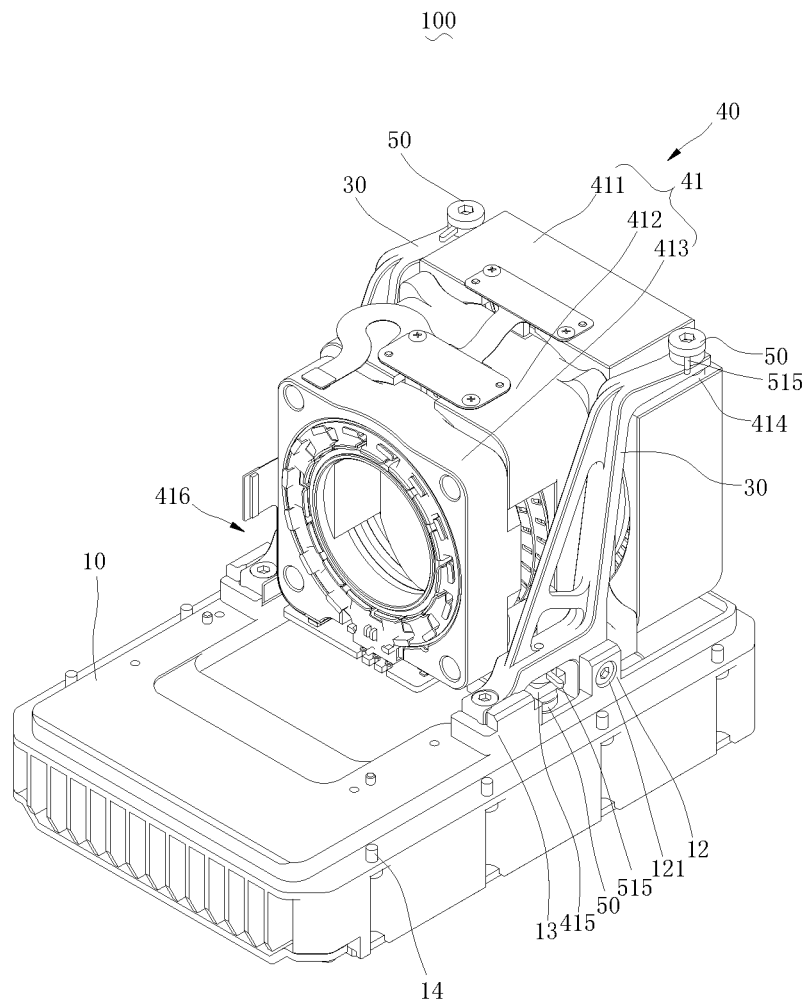
FIG. 2 is a partial three-dimensional schematic diagram of the distance measuring device shown in FIG. 1.
Figure 3:
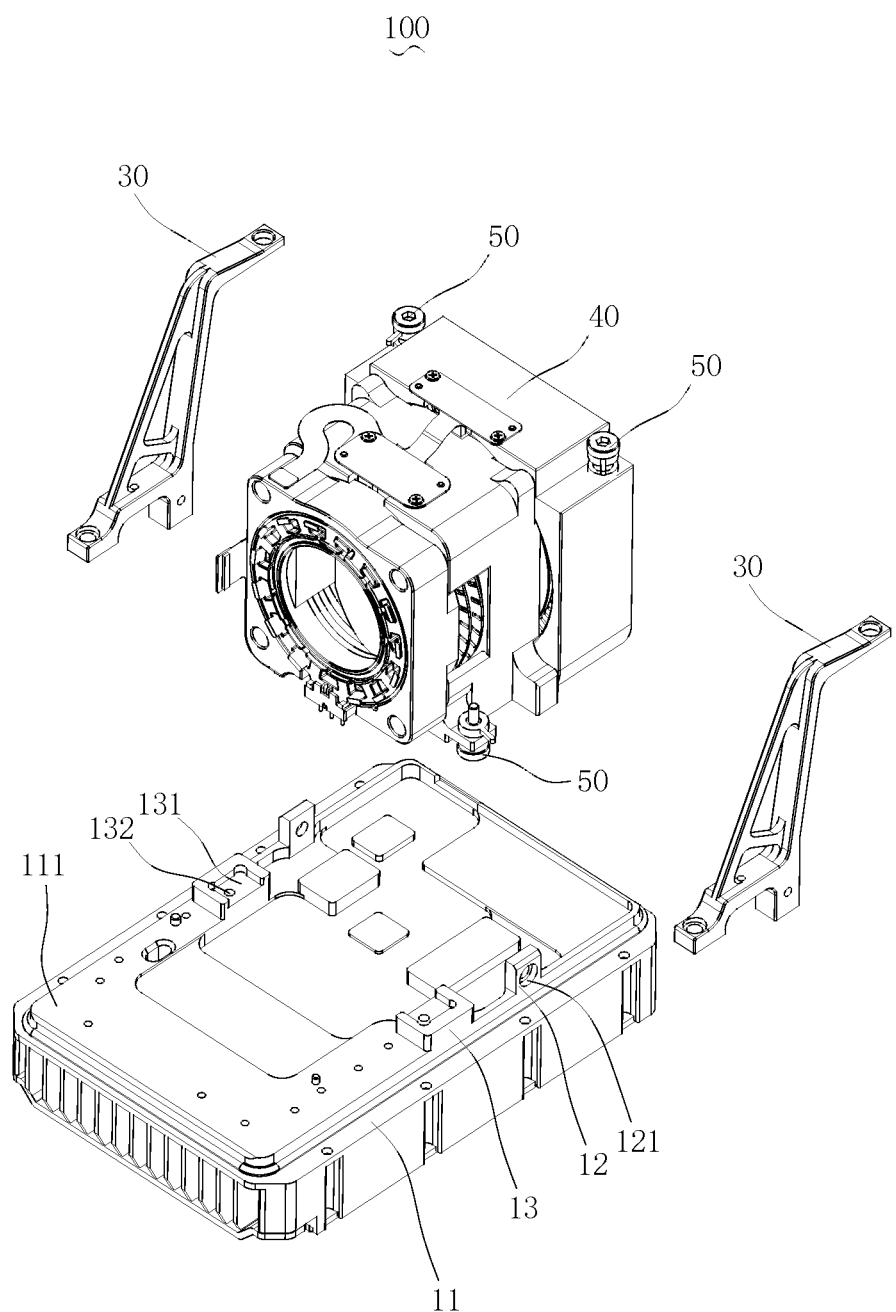
FIG. 3 is a partial three-dimensional exploded schematic diagram of the distance measuring device shown in FIG. 2.

Referring to FIG. 2 and FIG. 3, the base 10 includes a base body 11, a first mounting seat 12, and a second mounting seat 13, and the base body 11 has a plate-shaped structure. The first mounting seat 12 and the second mounting seat 13 may be formed on a top 111 of the base body 11. The first mounting seat 12 may be a mounting wall protruding from the top 111 of the base body 11. A first base mounting hole 121 may be disposed on the mounting wall, and the axial direction of the first base mounting hole 121 may be parallel to the top 111 of the base body 11.

Figure 22:
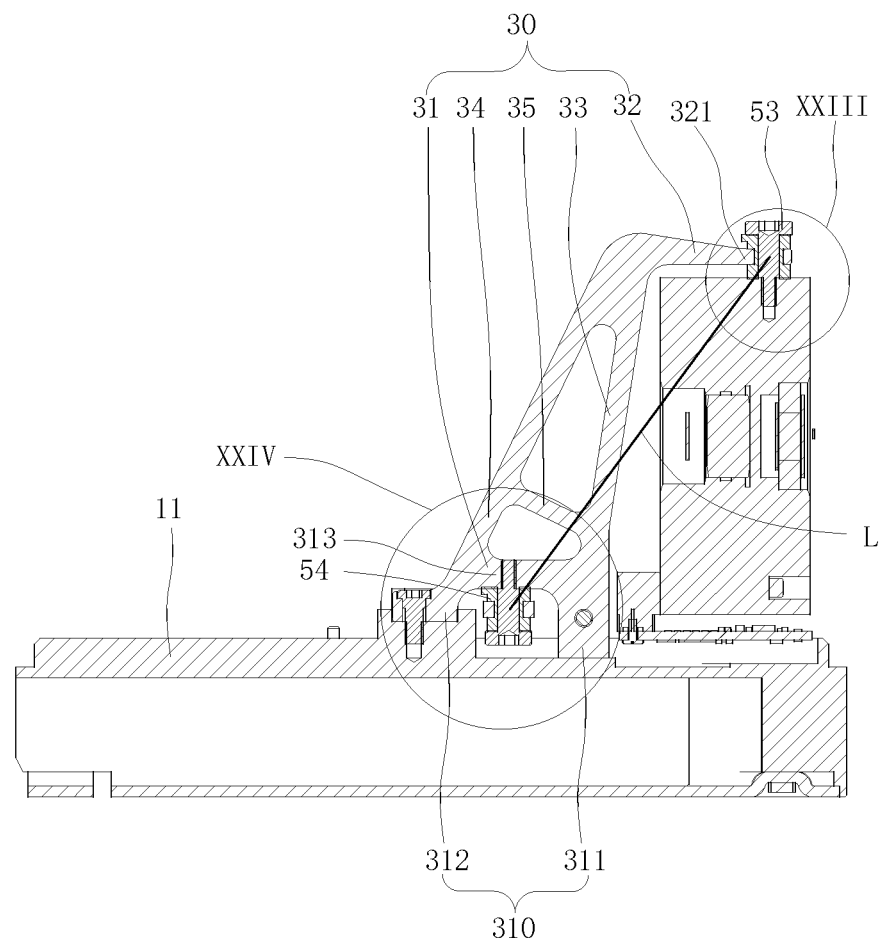
FIG. 22 is a schematic cross-sectional view of the distance measuring device shown in FIG. 21 along a line XXII-XXII.
Figure 23:
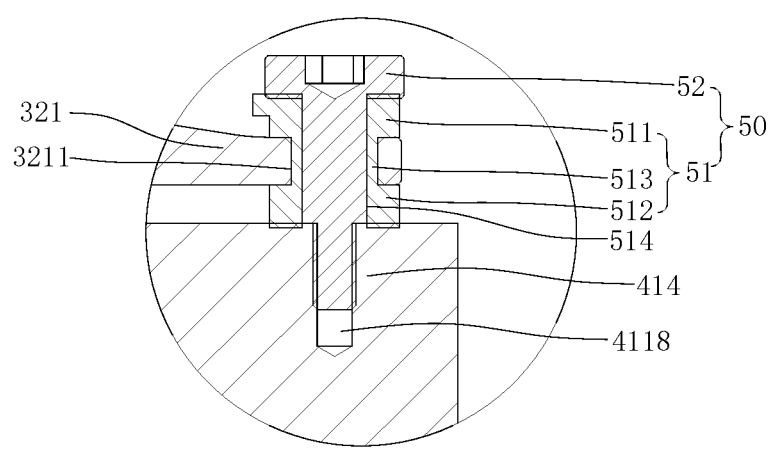
FIG. 23 is an enlarged schematic diagram of XXIII in the distance measuring device shown in FIG. 22.
Figure 24:
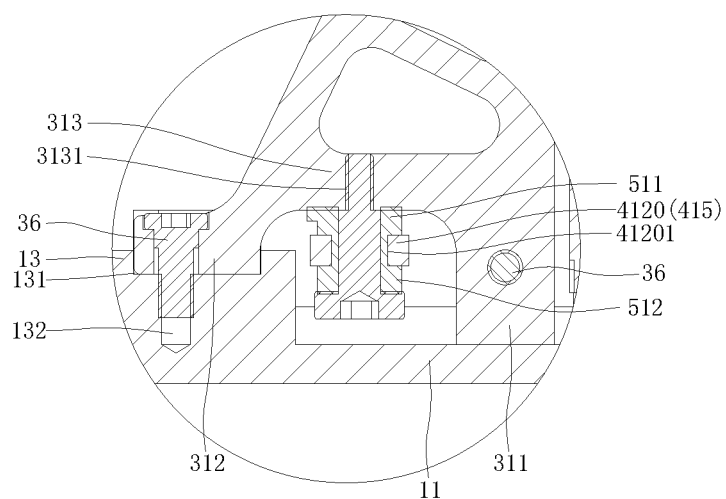
FIG. 24 is an enlarged schematic diagram of XXIV in the distance measuring device shown in FIG. 22.

Referring FIG. 22 to FIG. 24, the second mounting seat 13 may be a base boss protruding from the top 111 of the base body 11, and a base mounting groove 131 may be disposed on the base boss. A second base mounting hole 132 may be disposed at the bottom of the base mounting groove 131. The axis of the second base mounting hole 132 may be perpendicular to the top 111 of the base body 11, and the axis of the second base mounting hole 132 may be perpendicular to the axis of the first base mounting hole 121. The base body 11 of this embodiment has a rectangular plate-shaped structure, and the number of the first mounting seat 12 and the second mounting seat 13 are both two. The two first mounting seats 12 may be respectively positioned on opposite sides of the base body 11 and symmetrical about a symmetry plane of the base body 11, and the two second mounting seats 13 may also be respectively positioned on opposite sides of the base body 11 symmetrical about the symmetry plane of the base body 11. The first mounting seat 12 and the second mounting seat 13 on the same side may be spaced along the long side of the base body 11, and the above-mentioned symmetry plane may be a plane parallel to the long side of the base body 11 and perpendicular to the short side of the base body 11.

Referring to FIG. 1 to FIG. 3 again. The cover 20 is disposed on the base 10 and forms a receiving space together with the base 10. The cover 20 includes a cover top wall 21 and an annular cover side wall 22. Specifically, the cover top wall 21 may have a plate-like structure, and the shape of the cover top wall 21 may match the shape of the base body 11. In this embodiment, the shape of the cover top wall 21 of the cover matches the shape of the base 10 and has a rectangular plate-like structure. The cover side wall 22 is formed extending from a surface of the cover top wall 21, and the cover side wall 22 is disposed on the edge of the cover top wall 21 and surrounds the cover top wall 21. The end of the cover side wall 22 away from the cover top wall 21 may be mounted on the base 10 and surround the center of the base body 11 by any one or a combination of methods such as screw connection, clamping, gluing, welding, etc. The cover 20 of this embodiment is fixed on the base 10 by a locking member 14. More specifically, the locking member 14 passes through the base body 11 from the bottom side of the base 10 and is combined with the cover side wall 22. The locking member 14 may be a screw.

The cover side wall 22 includes a first cover side wall 221 and a second cover side wall 222. The first cover side wall 221 and the second cover side wall 222 may be positioned at opposite ends of the cover top wall 21. In one example, the first cover side wall 221 and the second cover side wall 222 may be respectively disposed on the short side of the cover top wall 21. A light-transmitting area 2211 is formed on the first cover side wall 221, and the area of the first cover side wall 221 other than the light-transmitting area 2211 is a non-light-transmitting area 2212. The light-transmitting area 2211 may be used for the distance measuring signal sent by the distance measuring module 60 to pass through. The light-transmitting area 2211 may be made of plastic, resin, glass, and other materials with high light transmittance, while the non-light-transmitting area 2212 may be made of copper, aluminum, and other metals with low light transmittance and heat conduction. In some embodiments, preferably, the light-transmitting area 2211 may be made of thermally conductive plastics, which not only meets the light transmission requirements, but also meets the heat dissipation requirements. In one example, the light-transmitting area 2211 may have a substantially circular shape. In one example, the light-transmitting area 2211 may have a substantially rectangular shape, such as a square shape.

Figure 4:
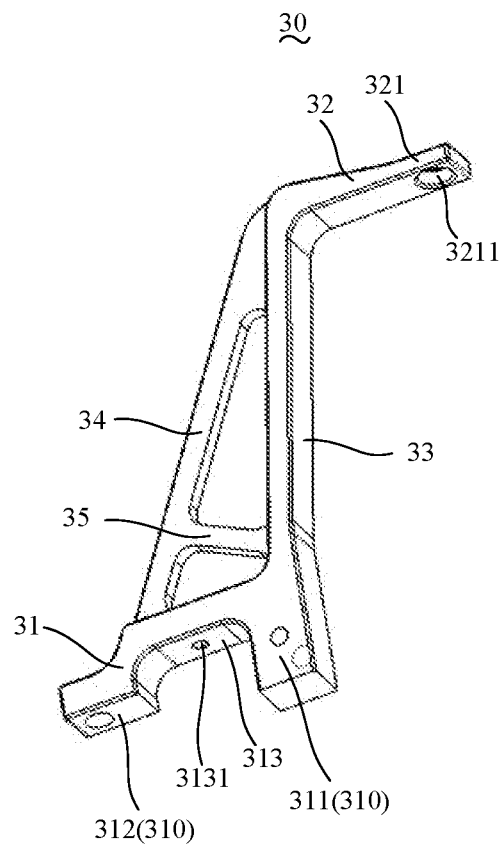
FIG. 4 is a perspective schematic diagram of a bracket of the distance measuring device shown in FIG. 3.

Referring to FIG. 3 and FIG. 4, the brackets 30 are mounted on the base 10. The number of brackets 30 in this embodiment of the present disclosure is two, and the two brackets 30 are respectively mounted on the opposite sides of the base 10. Each bracket 30 includes a fixing arm 31, a connecting arm 33, and a coupling arm 32.

The fixing arm 31 includes a plurality of fixing parts 310 and a second connecting part 313, and the fixing arm 31 is mounted on the base 10 through the plurality of fixing parts 310. The number of the fixing parts 310 in this embodiments is two, and the two fixing parts 310 are respectively a first fixing part 311 and a second fixing part 312. The first fixing part 311 and the second fixing part 312 are respectively positioned at opposite ends of the fixing arm 31. Both the first fixing part 311 and the second fixing part 312 are rigidly connected to the base 10. The first fixing part 311 and the second fixing part 312 are respectively fixed on the first mounting seat 12 and the second mounting seat 13 on the same side of the 10 by a fixing member 36 (such as a locking screw). Specifically, the first fixing part 311 is disposed on the base body 11 and positioned on one side of the mounting wall. The fixing member 36 passes through the first base mounting hole 121 and is combined with the first fixing part 311 to fix the first fixing part 311 on the first mounting seat 12. The second fixing part 312 is disposed in the base mounting groove 131, and the fixing member 36 passes through the second fixing part 312 and is combined with the second base mounting hole 132 to mount the second fixing part 312 on the second mounting seat 13. The second connecting part 313 is positioned between the first fixing part 311 and the second fixing part 312, and the second connecting part 313 is spaced from the top 111 of the base body 11. A bracket mounting hole may be disposed on the second connecting part 313, and the bracket mounting hole disposed in the second connecting part 313 may be defined as a second bracket mounting hole 3131.

One end of the connecting arm 33 may be connected to the first fixing part 311, and the other end of the connecting arm 33 may extend in a direction away from the base body 11.

One end of the joining arm 32 may be connected to the end of the connecting arm 33 away from the first fixing part 311, and the other end of the joining arm 32 may extend toward the side away from the fixing arm 31 and may be a free end. The joining arm 32 may be parallel to the top 111 of the base body 11. A first connecting part 321 may be disposed at an end of the joining arm 32 away from the connecting arm 33, and the second connecting part 313 may be closer to the base body 11 than the first connecting part 321. The bracket mounting hole may be disposed on the first connecting part 321. The bracket mounting hole disposed on the first connecting part 321 may be defined as a first bracket mounting hole 3211. In one example, the center of the first fixing part 311, the center of the second fixing part 312, the center of the first connecting part 321, and the center of the second connecting part 313 may be positioned in the same plane. When the distance measuring device 100 is subjected to an external impact and vibrates, the rotation torque of the bracket 30 and the scanning module 40 connected to the bracket 30 may be relatively small. The direction of the moment may be perpendicular to the plane with the center of the fixing parts 310, the center of the first connecting part 321, and the center of the second connecting part 313 are positioned, thereby reducing or even preventing the distance measuring device 100 from turning over due to the external impact.

Referring to FIG. 3, FIG. 5, FIG. 9, and FIG. 25. The scanning module 40 is mounted on the base 10 through the brackets 30 and is received in the receiving space, and the scanning module 40 is spaced from the base 10. The scanning module 40 includes a scanning housing 41, a first driver 42, a second driver 43, a third driver 44, a first optical element 45, a second optical element 46, a third optical element 47, a controller 49a, and a detector 49b. In some embodiments, the first driver 42 may be used to drive the movement of the first optical element 45 to change the transmission direction of the laser pulse passing through the first optical element 45. The second driver 43 may be used to drive the movement of the second optical element 46 to change the transmission direction of the laser pulse passing through the second optical element 46. The third driver 44 may be used to drive the movement of the third optical element 47 to change the transmission direction of the laser pulse passing through the third optical element 47. The three optical elements (the first optical element 45, the second optical element 46, and the third optical element 47) may cooperate with each other, and can be used to change the propagation direction of the light path and enable the scanning module 40 to have a larger field of view.

In one example, the first optical element 45, second optical element 46, and third optical element 47 may include a lens, a mirror, a prism, a galvanometer, a grating, a liquid crystal, an optical phased array, or any combination of the foregoing optical elements. In one example, at least one of the first optical element 45, second optical element 46, and third optical element 47 may be a light reflection element having a non-parallel light exit surface and a light entrance surface. When the light reflection element rotates, the light beam can be refracted to exit in different directions. In one example, the light reflection element may be a wedge prism.

In one example, at least part of the optical elements (the first optical element 45, the second optical element 46, and the third optical element 47) may be movable. For example, drivers (the first driver 42, the second driver 43, and the third driver 44) may be used to drive the at least part of the optical elements to move. The movable optical element may reflect, refract, or diffract the light beam to different directions at different times. In some embodiments, the plurality of optical elements of the scanning module 40 may rotate or vibrate around a common axis, and each rotating or vibrating optical elements may be used to continuously change the propagation direction of the incident light beam. In one embodiment, the plurality of optical elements of the scanning module 40 may rotate at different speeds or vibrate at different speeds. In another embodiment, at least part of the optical elements of the scanning module 40 may rotate at substantially the same speed. In some embodiments, the plurality of optical elements of the scanning module may also be rotated around different axes. In some embodiments, the plurality of optical elements of the scanning module 40 may also rotate in the same direction or different directions, or vibrate in the same direction or different directions, which is not limited herein.

The first driver 42, second driver 43, and third driver 44 may drive the optical elements (the first optical element 45, the second optical element 46, and the third optical element 47) to rotate, vibrate, move cyclically along a predetermined trajectory, or move back and forth along a predetermined trajectory, which is not limited herein. The following takes the optical elements (the first optical element 45, the second optical element 46, and the third optical element 47) including a prism as an example for description.

The scanning housing 41 may be used as the housing of the scanning module 40. The scanning housing 41 may be used to install elements such as the first driver 42, the second driver 43, the third driver 44, the first optical element 45, the second optical element 46, the third optical element 47, the controller 49a, and the detector 49b. The scanning housing 41 may be an integral structure, and the scanning housing 41 may also be composed of multiple separated structures. For example, referring to FIG. 6 to FIG. 8, the scanning housing 41 may include at least any two of a first support 411, a second support 412, and a third support 413, as well as a first mounting part 414 and a second mounting part 415. For example, the scanning housing 41 may include the first mounting part 414, the second mounting part 415, the first support 411, and the second support 412. Alternatively, the scanning housing 41 may include the first mounting part 414, the second mounting part 415, the second support 412, and the third support 413. Alternatively, the scanning housing 41 may include the first mounting part 414, the second mounting part 415, the first support 411, and the third support 413. Alternatively, the scanning housing 41 may include the first mounting part 414, the second mounting part 415, the first support 411, the second support 412, and the third support 413. In the following description, only the scanning housing 41 including the first mounting part 414, the second mounting part 415, the first support 411, the second support 412, and the third support 413 is used as an example.

Referring to FIG. 5 to FIG. 8, the first support 411 can be used to mount the first driver 42 and the first optical element 45. The first support 411 may be the support farthest from the distance measuring module 60 on the scanning housing 41. The first support 411 includes a first support body 4111. The first support body 4111 may have a hollow structure, and the hollow part forms a first receiving cavity 4119. In the embodiments of the present disclosure, the outer contour of the first support body 4111 is rectangular as a whole, the shape of the hollow part can be circular, and the first driver 42 and the first optical element 45 can be mounted in the first receiving cavity 4119. In the embodiments of the present disclosure, the first support body 4111 includes a first support top surface 4115 and two first support side surfaces 4116. The two first support side surfaces 4116 may be respective positioned on opposite sides of the first support body 4111 and connected to the first support top surface 4115. A support mounting groove 4117 is disposed on the first support top surface 4115, a housing mounting hole is disposed on the bottom surface of the support mounting groove 4117, and the housing mounting hole disposed on the bottom surface of the support mounting groove 4117 may be defined as a first housing mounting hole 4118.

The second support 412 may be used to mount the second driver 43 and the second optical element 46. The second support 412 may cooperate with the first support 411. For example, the second support 412 may be sleeved in the first support 411, and the second support 412 may be disposed coaxially or on different axis with the first support 411. In some embodiments, the coaxial arrangement of the second support 412 and the first support 411 means that the center axis of the second support 412 coincides with the center axis of the first support 411, the different axis arrangement means that the center axis of the second support 412 does not coincide with the center axis of the first support 411, such as being parallel and spaced or intersecting at any angle. The second support 412 includes a second support body 4121 and a protrusion 4120. In one example, the protrusion 4120 may be used to mount the second support 412 on the bracket 30. The second support body 4121 may have a hollow structure, the hollow part forms a second receiving cavity 4126, the second driver 43 and the second optical element 46 may be mounted in the second receiving cavity 4126. In the embodiments of the present disclosure, the second support body 4121 includes a second support bottom surface 41211 and two second support side surfaces 41212. The two second support side surfaces 41212 may be respectively positioned on opposite sides of the second support body 4121 and connected to the second support bottom surface 41211. The two second support side surfaces 41212 may respectively correspond to the two first support side surfaces 4116. In one example, the protrusion 4120 may be disposed on the first support body 4111 at a position close to the second support bottom surface 41211. It can be understood that the protrusion 4120 may be formed by extending outward from a position of the second support side surface 41212 close to the second support bottom surface 41211. A housing mounting hole may be deposed on the protrusion 4120, and the housing mounting hole disposed on the protrusion 4120 may be defined as a second housing mounting hole 41201.

The third support 413 may be used to mount the third driver 44 and the third optical element 47. The third support 413 may cooperate with the second support 412, the third support 413 may be sleeved in the second support 412, and the third support 413 may be coaxially disposed wit. For example, the second support 412 may be sleeved in the first support 411, and the second support 412 may be disposed coaxially or on different axis with the second support 412. The third support 413 includes a third support body 4130. The third support body 4130 may have a hollow structure, and the hollow part forms a third receiving cavity 4134. The third driver 44 and the third optical element 47 may be mounted in the third receiving cavity 4134. The third support 413 and the first support 411 may be respectively disposed on opposite sides of the second support 412. The light pulse emitted by the distance measuring module 60 may pass through the third support 413, the second support 412, and the first support 411 successively and then enter the outside world. The light pulse reflected by a target object may pass through the first support 411, the second support 412, and the third support 413 and then be received by the distance measuring module 60. The third support body 4130 include two third support side surfaces 4133 opposite to each other. At this time, the opposite sides of the first support 411 opposite to the opposite sides of the second support 412 and the opposite sides of the third support 413 protrude to form two mounting spaces 416. The opposite sides of the third support 413 may not exceed the corresponding opposite sides of the second support 412. In this embodiment, the opposite sides of the third support 413 are respectively flush with the opposite sides of the second support 412. The opposite sides of the third support 413 may not exceed the corresponding opposite sides of the second support 412, such that the second mounting seat 13 can be conveniently formed in the mounting space 416. In other embodiments, the opposite sides of the third support 413 may also extend beyond the corresponding opposite sides of the second support 412, which facilitates the formation of the first mounting seat 12 in the mounting space 416.

The first mounting part 414 may be positioned at an end of the first support 411 away from the base 10. Specifically, the first mounting part 414 may be positioned on the first support body 4111 close to the first support top surface 4115. The first mounting part 414 may be used to mount the first support 411 on the brackets 30. The first mounting part 414 of the present disclosure may be a part of the first support body 4111. Specifically, the first mounting part 414 may be understood as a structure forming the support mounting groove 4117 and the first housing mounting hole 4118 on the first support body 4111. In other embodiments, the first mounting part 414 may be a flange disposed on the first support body 4111, and the first housing mounting hole 4118 may be disposed on the flange.

The second mounting part 415 may be positioned at an end of the second support 412 close to the base 10. Specifically, the second mounting part 415 may be positioned on the second support body 4121 close to the second support bottom surface 41211. The second mounting part 415 may be used for mounting the second support 412 on the brackets 30. The second mounting part 415 of the present disclosure may be a part of the second support 412. Specifically, the second mounting part 415 may be the protruding part 4120. The 41 may be mounted on the brackets 30 through the first mounting seat 12 and the second mounting seat 13.

Figure 5:
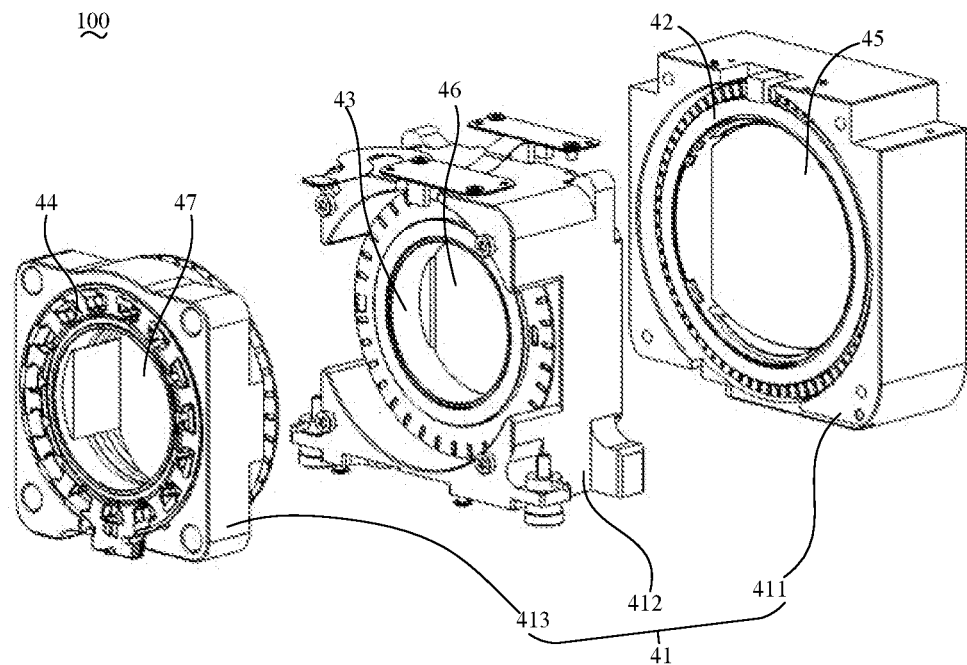
FIG. 5 is a three-dimensional exploded schematic diagram of a scanning module of the distance measuring device shown in FIG. 3.

Referring to FIG. 5, FIG. 9, and FIG. 10, the first driver 42 is mounted in the scanning housing 41. Specifically, the first driver 42 may be mounted in the first receiving cavity 4119. The first driver 42 includes a first stator assembly 421, a first positioning assembly 422, and a rotor assembly 423. The first stator assembly 421 may be relatively fixed to the first support body 4111. The first stator assembly 421 may be used to drive the rotor assembly 423 to rotate. The first stator assembly 421 may include a first winding body and a first winding mounted on the first winding body. In some embodiments, the first winding body may be a stator core, and the first winding may be a coil. The first winding may generate a specific magnetic field under the action of current, and the direction and intensity of the magnetic field may be changed by changing the direction and intensity of the current. The first stator assembly 421 may be sleeved on the rotor assembly 423.

The rotor assembly 423 may also be driven by the first stator assembly 421 to rotate. Specifically, the rotor assembly 423 includes a first rotor 4231, and the axis of the first rotor 4231 relative to the first stator assembly 421 is referred to as a first rotation axis 4236. It can be understood that the first rotation axis 4236 may be a physical rotation axis or a virtual rotation axis. The first rotor 4231 includes a first yoke 4233a and a first magnet 4233b. The first magnet 4233b may be sleeved on the first yoke 4233a and positioned between the first yoke 4233a and the first winding. The magnetic field generated by the first magnet 4233b may interact with the magnetic field generated by the first winding and generate a force. Since the first winding is fixed, the first magnet 4233b may drive the first yoke 4233a to rotate under the force. The first rotor 4231 may have a hollow shape, and the hollow part of the first rotor 4231 forms a first receiving cavity 4235. The laser pulse may pass through the first receiving cavity 4235 and pass through the scanning module 40. Specifically, the first receiving cavity 4235 may be enclosed by a first side wall 4234 of the first rotor 4231. More specifically, in the embodiments of the present disclosure, the first yoke 4233a is in the shape of a hollow cylinder, the hollow part of the first yoke 4233a forms the first receiving cavity 4235, and the side wall of the first yoke 4233a is used to as a side wall surrounding the first receiving cavity 4235. Of course, in other embodiments, the first receiving cavity 4235 may not be formed on the first yoke 4233a, but may also be formed on the first magnet 4233b and other structures. The first side wall 4234 may also be a side wall of a structure such as the first magnet 4233b, which is not limited herein. The first side wall 4234 may have an annular structure or may be a part of the annular structure. The first winding of the first stator assembly 421 may have an annular shape and surround the outer surface of the first side wall 4234.

The first positioning assembly 422 may be positioned on the outer surface of the first side wall 4234, and the first positioning assembly 422 may be used to restrict the rotor assembly 423 to rotate around the fixed first rotation axis 4236. The first stator assembly 421 and the first positioning assembly 422 may surround the outer surface of the first side wall 4234 side by side. The first positioning assembly 422 includes an annular first bearing 422, which surrounds the outer surface of the first side wall 4234. The first bearing 422 includes a first inner annular structure 4221, a first outer annular structure 4222, and a first rolling element 4223. The outer surface of the first inner annular structure 4221 and the first side wall 4234 may be fixed to each other. The first outer annular structure 4222 and the scanning housing 41 may be fixed to each other. Specifically, the first outer annular structure 4222 and the first support 411 may be fixed to each other. The first rolling element 4223 may be positioned between the first inner annular structure 4221 and the first outer annular structure 4222, and the first rolling element 4223 may be used for a rolling connection with the first outer annular structure 4222 and the first inner annular structure 4221, respectively.

The first optical element 45 may be mounted in the first receiving cavity 4235. Specifically, the first optical element 45 may be mounted in cooperation with the first side wall 4234 and fixedly connected to the first rotor 4231, and the first optical element 45 may be positioned on the exit and incident light paths of the laser pulse. The first optical element 45 may rotate synchronously with the first rotor 4231 around the first rotation axis 4236. When the first optical element 45 rotates, the transmission direction of the laser light passing through the first optical element 45 can be changed.

The second driver 43 may be mounted in the scanning housing 41. Specifically, the second driver 43 may be mounted in the second receiving cavity 4126. The second driver 43 includes a second stator assembly 431, a second positioning assembly 432, and a second rotor assembly 433. The second stator assembly 431 may be relative fixed to the second support body 4121. The second stator assembly 431 may be used to drive the second rotor assembly 433 to rotate. The second stator assembly 431 may include a second winding body and a second winding mounted on the second winding body. In some embodiments, the second winding body may be a stator core, and the second winding may be a coil. The second winding may generate a specific magnetic field under the action of current, and the direction and intensity of the magnetic field may be changed by changing the direction and intensity of the current.

The second rotor assembly 433 may be driven by the second stator assembly 431 to rotate. Specifically, the second rotor assembly 433 includes a second rotor 4331 and the rotation axis of the second rotor 4331 relative to the second stator assembly 431 is referred to as a second rotation axis 4337. It can be understood that the second rotation axis 4337 may be a physical rotation axis or a virtual rotation axis. The second rotor 4331 includes a second yoke 4333 and a second magnet 4334. The second magnet 4334 may be sleeved on the second yoke 4333 and positioned between the second yoke 4333 and the second winding. The magnetic field generated by the second magnet 4334 may interact with the magnetic field generated by the second winding and generate a force. Since the second winding is fixed, the second magnet 4334 may drive the second yoke 4333 to rotate under the force. The second rotor 4331 may have a hollow shape, and the hollow part of the second rotor 4331 forms a second receiving cavity 4336, and the laser pulse may pass through the second receiving cavity 4336 and pass through the scanning module 40. Specifically, the second receiving cavity 4336 may be enclosed by a second side wall 4335 of the second rotor 4331. More specifically, in the embodiments of the present disclosure, the second yoke 4333 may be in the shape of a hollow cylinder, the hollow part of the second rotor assembly 433 forms the second receiving cavity 4336, and the side wall of the second yoke 4333 is used as the side wall surrounding the second receiving cavity 4336. Of course, in other embodiments, the second receiving cavity 4336 may not be formed on the second yoke 4333, but may also be formed on a structure such as the second magnet 4334. The second side wall 4335 may also be a side wall of a structure such as the second magnet 4334, which is not limited herein. The second side wall 4335 may have an annular structure or may be a part of an annular structure. The second winding of the second stator assembly 431 may have an annular shape and surround the outer surface of the second side wall 4335.

The second positioning assembly 432 may be disposed on the second rotor 4331 and positioned on the side of the second stator assembly 431 away from the rotor assembly 423. The second positioning assembly 432 may be used to restrict the second rotor assembly 433 to rotate around the fixed second rotation axis 4337. The second stator assembly 431 and the second positioning assembly 432 may surround the outer surface of the second side wall 4335 side by side. The second positioning assembly 432 includes an annular second bearing 432. The second bearing 432 surrounds the outer surface of the second side wall 4335. The second bearing 432 includes a second inner annular structure 4321, a second outer annular structure 4322, and a second rolling element 4323. The outer surface of the second inner annular structure 4321 and the second side wall 4335 may be fixed to each other. The second outer annular structure 4322 and the scanning housing 41 may be fixed to each other. Specifically, the second outer annular structure 4322 and the second support 412 may be fixed to each other. The second rolling element 4323 may be positioned between the second inner annular structure 4321 and the second outer annular structure 4322, and the second rolling element 4323 may be used for a rolling connection with the second outer annular structure 4322 and the second inner annular structure 4321, respectively.

The second optical element 46 may be mounted in the second receiving cavity 4336. Specifically, the second optical element 46 may be mounted in cooperation with the second side wall 4335 and fixedly connected to the second rotor 4331. The second optical element 46 may be positioned on the exit light path of the light source and the incident light path of the returned light. The second optical element 46 may rotate synchronously with the second rotor 4331 around the second rotation axis. When the second optical element 46 rotates, the transmission direction of the laser light passing through the second optical element 46 can be changed.

The third driver 44 may be mounted in the scanning housing 41. Specifically, the third driver 44 may be mounted in a third receiving cavity 4134. The third driver 44 includes a third rotor assembly 441, a third positioning assembly 442, and a third rotor assembly 443. The third rotor assembly 441 may be relatively fixed to the third support body 4130, and the third rotor assembly 441 may be used to drive the third rotor assembly 443 to rotate. The third rotor assembly 441 may include a third winding body and a third winding mounted on the third winding body. In some embodiments, the third winding body may be a stator core, and the third winding may be a coil. The third winding may generate a specific magnetic field under the action of current, and the direction and intensity of the magnetic field may be changed by changing the direction and intensity of the current.

The third rotor assembly 443 may be driven by the third rotor assembly 441 to rotate. Specifically, the third rotor assembly 443 includes a third rotor 4431, and the rotation axis of the third rotor 4431 relative to the third rotor assembly 441 is referred to as a third rotation axis 4437. It can be understood that the third rotation axis 4437 may be a physical rotation axis or a virtual rotation axis. The third rotor 4431 includes a third yoke 4433 and a third magnet 4434. The third magnet 4434 may be sleeved on the third yoke 4433 and positioned between the third yoke 4433 and the third winding. The magnetic field generated by the third magnet 4434 may interact with the magnetic field generated by the third winding and generate a force. Since the third winding is fixed, the third magnet 4434 may drive the third yoke 4433 to rotate under the force. The third rotor 4431 may have a hollow shape, and the hollow part of the third rotor 4431 forms a third receiving space 4436. The laser pulse may pass through the third receiving space 4436 and pass through the scanning module 40. Specifically, the third receiving space 4436 may be enclosed by a third side wall 4435 of the third rotor 4431. More specifically, in the embodiments of the present disclosure, the third yoke 4433 may have a hollow cylindrical shape, the hollow part of the third yoke 4433 forms the third receiving space 4436, and the side wall of the third yoke 4433 may be used as a side wall surrounding the third receiving space 4436. Of course, in other embodiments, the third receiving space 4436 may not be formed on the third yoke 4433, but may also be formed on a structure such as the third magnet 4434. The third side wall 4435 may also be a side wall of a structure such as the third magnet 4434, which is not limited herein. The third side wall 4435 may have an annular structure or may be a part of an annular structure. The third winding of the third rotor assembly 441 may have an annular shape and surround the outer surface of the third side wall 4435.

The third positioning assembly 442 may be disposed on the third rotor 4431, and the third positioning assembly 442 may be positioned on the side of the third rotor assembly 441 close to the second rotor assembly 433. In other words, the third positioning assembly 442 may be closer to the third rotor assembly 443 than the third rotor assembly 441. The third positioning assembly 442 may be used to limit the rotation of the third rotor assembly 443 around the fixed third rotation axis 4437. The third rotor assembly 441 and the third positioning assembly 442 may surround the outer surface of the third side wall 4435 side by side. The third positioning assembly 442 includes an annular third bearing 442, and the third bearing 442 surrounds the outer surface of the third side wall 4435. The third bearing 442 includes a third inner annular structure 4421, a third outer annular structure 4422, and a third rolling element 4423. The third inner annular structure 4421 and the outer surface of the third side wall 4435 may be fixed to each other. The third outer annular structure 4422 and the scanning housing 41 may be fixed to each other. Specifically, the third outer annular structure 4422 and the third support 413 may be fixed to each other. The third rolling element 4423 may be positioned between the third inner annular structure 4421 and the third outer annular structure 4422, and the third rolling element 4423 may be used for a rolling connection with the third outer annular structure 4422 and the third inner annular structure 4421, respectively.

The third optical element 47 may be mounted in the third receiving space 4436. Specifically, the third optical element 47 may be mounted in cooperation with the third side wall 4435 and fixedly connected to the third rotor 4431. The third optical element 47 may be positioned on the exit and incident light paths of the laser pulse. The third optical element 47 may rotate in synchronization with the third rotor 4431 around the third rotation axis 4437. When the third optical element 47 rotates, the transmission direction of the laser light passing through the third optical element 47 can be changed.

Referring to FIG. 5 and FIG. 25, the controller 49a is connected to the drivers (the first driver 42, the second driver 43, and the third driver 44). The controller 49a can be used to control the drivers to drive the optical elements (the first optical element 45, the second optical element 46, and the third optical element 47) to rotate. The controller can be connected to the windings (the first winding, the second winding, and the third winding) and used to control the magnitude and direction of the current on the windings to control the rotation parameters (rotation direction, rotation angle, rotation duration, etc.) of the rotor assemblies (the rotor assembly 423, the second rotor assembly 433, and the third rotor assembly 443) to achieve the purpose of controlling the rotation parameters of the optical elements. In one example, the controller 49a may include an electronic speed controller, and the controller 49a may be disposed on the electronic speed controller.

Referring to FIG. 9, the detector 49b can be used to detect the rotation parameters of the optical elements, and the rotation parameters of the optical elements may be the rotation direction, the rotation angle, and the rotation speed of the optical elements. There may be a plurality of detectors 49b, and each detector 49b may include a code disc and a photoelectric switch. The code disc may be fixedly connected with a rotor (the first rotor 4231, the second rotor 4331, or the third rotor 4431) and rotate synchronously with the rotor assembly (the rotor assembly 423, the second rotor assembly 433, or the third rotor assembly 443). It can be understood that since the optical element rotate synchronously with the rotor, the code disc and the optical element rotate synchronously, and the rotation parameters of the optical element may be obtained by detecting the rotation parameters of the code disc. Specifically, the rotations parameters of the code disc may be detected through the cooperation of the code disc and the photoelectric switch.

When the scanning housing 41 (the scanning module 40) is mounted on the two brackets 30, the two brackets 30 may be respectively positioned outside the two second support side surfaces 41212, and the two brackets 30 may be respectively mounted in the two mounting spaces 416. Specifically, when the two brackets 30 are mounted on the base 10 and the scanning housing 41 is mounted on the two brackets 30, the first mounting seat 12 and the second mounting seat 13 may be both positioned in the mounting space 416, the connecting arm 33, a first reinforcing arm 33, and the second reinforcing arm 35 may all be received in the mounting space 416, and the coupling arm 32 may be received in a support mounting groove 4117. The scanning housing 41 forms the mounting space 416 to facilitate the mounting of the bracket 30 in the mounting space 416 to reduce the size of the distance measuring device 100. Further, the support mounting groove 4117 is disposed on the first support 411, and the coupling arm 32 is received in the support mounting groove 4117 to further reduce the size of the distance measuring device 100.

Figure 21:
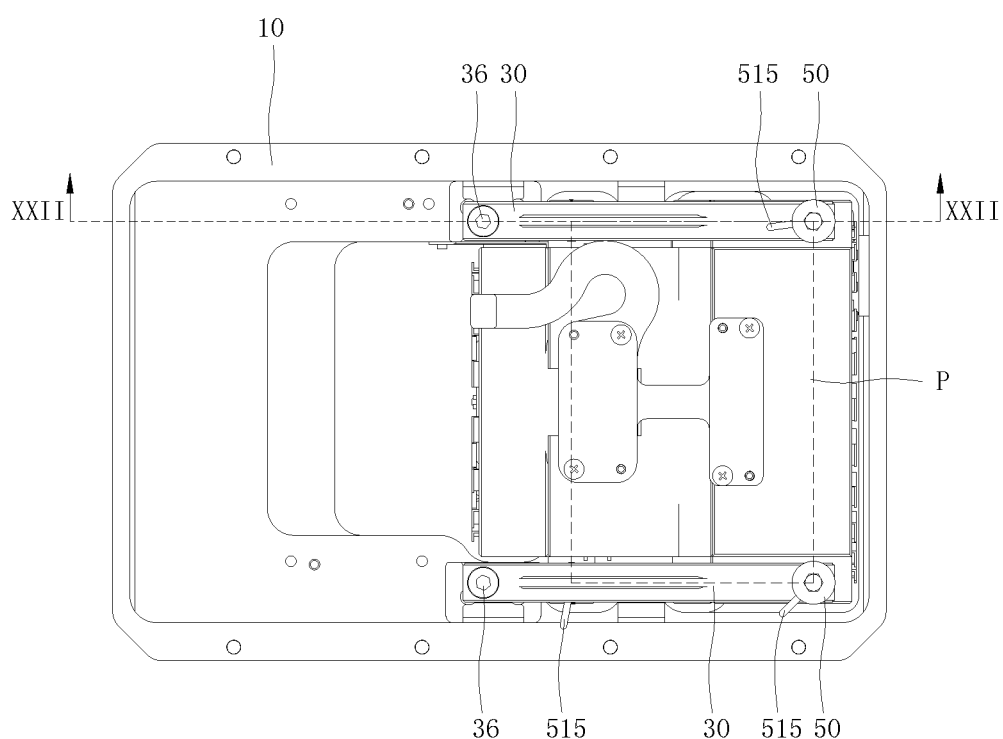
FIG. 21 is a top view of the distance measuring device shown in FIG. 2.

Referring to FIG. 21 to FIG. 23, the flexible connection assemblies 50 are used to connect the scanning housing 41 to the brackets 30, and the flexible connection assemblies 50 provide gaps between the scanning housing 41 and the base 10 to provide a vibration space between for the scanning module 40. The scanning module 40 may be mounted on the brackets 30 through the flexible connection assemblies 50. The flexible connection assemblies 50 can prevent direct contact between the scanning module 40 and the base 10, thereby reducing or even avoiding the transmission of the vibration of the scanning module 40 to the base 10, which can reduce or even avoid the transmission of the vibration of the scanning module 40 to the distance measuring module 60 through the base 10.

Specifically, the flexible connection assembly 50 includes a flexible connection part 51 and a fastener 52, and the scanning housing 41 and the brackets 30 may be connected by the flexible connection part 51 and the fastener 52. Specifically, each flexible connection assembly 50 includes a flexible first support part 511, a flexible connection part 513, and a flexible second support part 512. The flexible first support part 511 and the flexible second support part 512 may be respectively connected to opposite ends of the flexible connection part 513. A through hole 514 may be disposed on the flexible connection part 51 passing through the flexible first support part 511, the flexible connection part 513, and the flexible second support part 512.

Each bracket 30 may be connected to the scanning housing 41 through at least two flexible connection assemblies 50. The at least two flexible connection assemblies 50 include a first flexible connection component 53 and a second flexible connection component 54.

Referring to FIG. 23 and FIG. 24, the first flexible connection component 53 connects the bracket 30 (the first connecting part 321) and the first mounting part 414. Specifically, the flexible connection part 513 of the fastener 52 passes through the first bracket mounting hole 3211, the flexible first support part 511 and the flexible second support part 512 of the first flexible connection component 53 are respectively positioned on opposite sides of the first connecting part 321, the flexible second support part 512 of the first flexible connection component 53 is positioned between the first connecting part 321 and the bottom surface of the support mounting groove 4117, the fastener 52 of the first flexible connection component 53 passes through the through hole 514 and combines with the inner wall of the first housing mounting hole 4118, and the first flexible connection component 53 is received in the support mounting groove 4117. The cross-sectional size of the flexible first support part 511 and the cross-sectional size of the flexible second support part 512 may be both larger than the cross-sectional size of the first bracket mounting hole 3211. In this way, when the second flexible connection component 54 is mounted in the first bracket mounting hole 3211, the flexible first support part 511 may be positioned between the end of the fastener 52 and the first connecting part 321, and the flexible second support part 512 may absorb the vibration generated by the first support 411 and transmitted to the fastener 52. The flexible second support part 512 may be positioned between the bottom surface of the support mounting groove 4117 and the first connecting part 321, and the flexible second support part 512 may absorb the vibration generated by the first support 411 and reduce the transmission of the vibration to the bracket 30. The cross-sectional size of the flexible connection part 513 may be greater than, less than, or equal to the cross-sectional size of the first bracket mounting hole 3211.

The second flexible connection component 54 connects the bracket 30 (the second connecting part 313) and the second mounting part 415. Specially, the flexible connection part 513 of the second flexible connection component 54 passes through the second housing mounting hole 41201, the flexible first support part 511 and the flexible second support part 512 of the second flexible connection component 54 are respectively positioned on opposite sides of the protrusion 4120, the flexible first support part 511 of the second flexible connection component 54 is positioned between the protrusion 4120 and the second connecting part 313, and the fastener 52 of the second flexible connection component 54 passes through the through hole 514 and combines with the inner wall of the second bracket mounting hole 3131. The cross-sectional size of the flexible first support part 511 and the cross-sectional size of the flexible second support part 512 may be both larger than the cross-sectional size of the second housing mounting hole 41201. In this way, when the first flexible connection component 53 is mounted in the second bracket mounting hole 3131, the flexible first support part 511 may be positioned between the protrusion 4120 and the second connecting part 313, and the flexible first support part 511 may absorb the vibration generated by the second support 412 and reduce the transmission of the vibration to the bracket 30. The flexible second support part 512 may be positioned between the end of the fastener 52 and the second connecting part 313, and the flexible second support part 512 may absorb the vibration generated by the second support 412 and transmitted to the fastener 52. The cross-sectional size of the flexible connection part 513 may be greater than, less than, or equal to the cross-sectional size of the second housing mounting hole 41201. Since the first connecting part 321 is positioned on the side of the bracket 30 away from the base 10, and the second connecting part 313 is positioned on the side of the bracket 30 close to the base 10, the scanning housing 41 is connected to the first connecting part 321 and the second connecting part 313 through a flexible connection part 51. Therefore, when the distance measuring device 100 is impacted by an external impact, the rotating torque received by the scanning housing 41 is relatively small, and the direction of the torque is perpendicular to the plane where the brackets 30 are positioned, thereby reducing or even preventing the distance measuring device 100 from turning over due to the external impact. The brackets 30 in the distance measuring device 100 of the present disclosure are fixed to the base 10, and the scanning module 40 is mounted on the brackets 30 through the flexible connection assemblies 50. The flexible connection assemblies 50 can prevent direct contact between the scanning module 40 and the base 10, thereby reducing or even avoiding the transmission of the vibration of the scanning module 40 to the base 10.

Referring to FIG. 23, in this embodiment, the cross section of the flexible connection part 51 which is cut by the plane passing through the axis of the through hole 514 has an "I" shape. The flexible connection part 51 may be a rubber pad.

The distance measuring module 60 may be disposed on the base 10 and spaced apart from the scanning module 40. Specifically, the distance measuring module 60 may be rigidly fixed on the base 10. In one example, the distance measuring module 60 may be an integrated structure, and the scanning module 40 and the distance measuring module 60 may be mounted on the same base 10. In one example, the base 10 may be a separated structure, and the distance measuring module 60 and the scanning module 40 may be mounted on two different separated structures of the base 10. Since the scanning module 40 and the distance measuring module 60 are disposed at intervals, the transmission of the vibration of the scanning module 40 to the distance measuring module 60 can be reduced or even prevented, thereby improving the detection accuracy of the distance measuring device 100. Since the distance measuring module 60 may be rigidly fixed on the base 10, the vibration of the scanning module 40 may be limited effect on the distance measuring module 60, thereby ensuring the stability of the relative position of the entire installation of the distance measuring module 60 and the distance measuring device 100, which further improves the detection accuracy.

Figure 27:
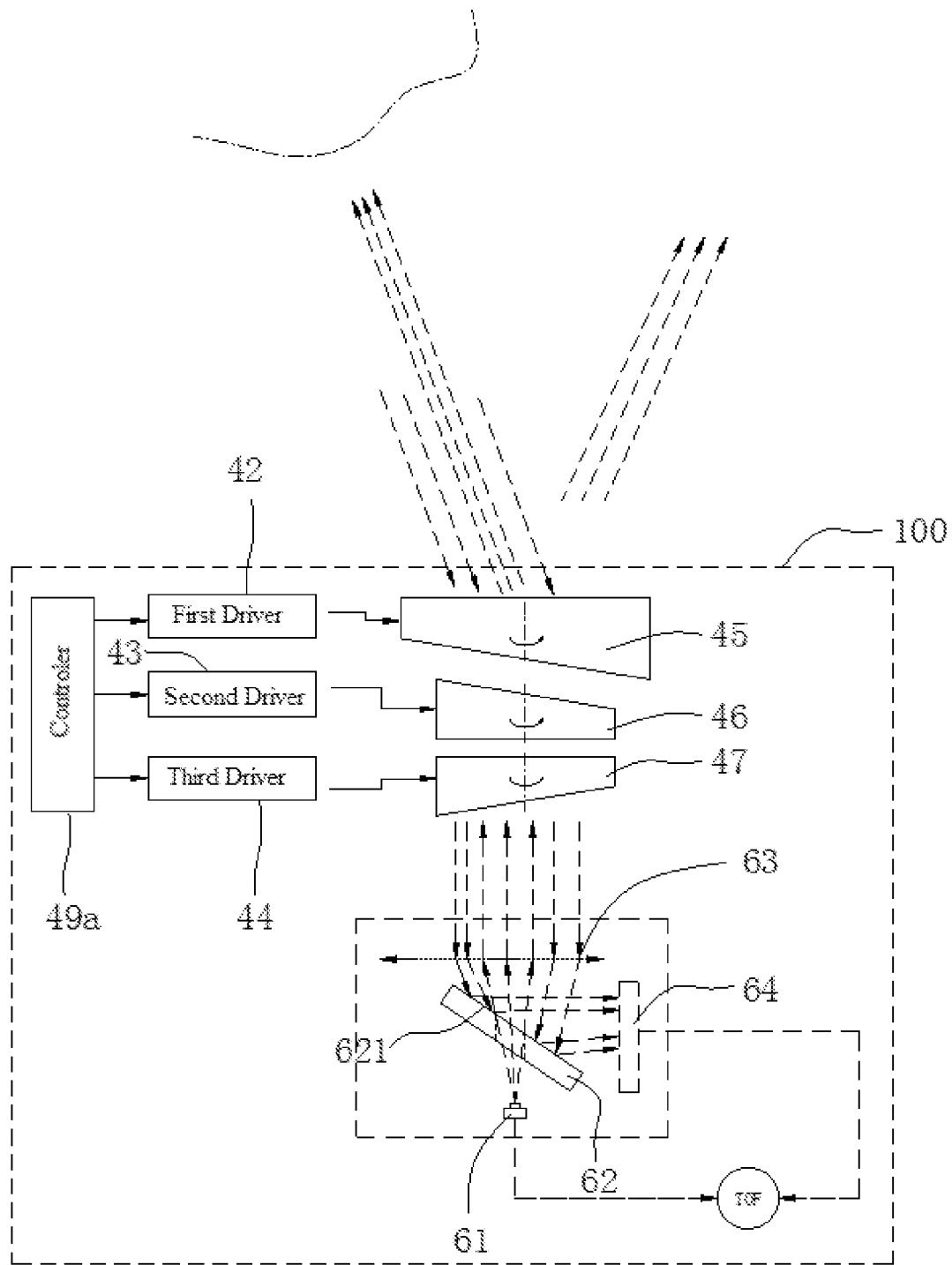
FIG. 27 is a schematic diagram of another distance measurement principle of the distance measuring device according to some embodiments of the present disclosure.

Referring to FIG. 25 and FIG. 27, the distance measuring module 60 includes a light source 61, an optical path changing element 62, a collimating element 63, and a detector 64. A coaxial optical path can be used in the distance measuring module 60, that is, the laser beam emitted from the distance measuring module 60 and the reflected laser beam can share at least part of the optical path in the distance measuring module 60. Alternatively, the distance measuring module 60 may also adopt an off-axis optical path, that is, the light beam emitted by the distance measuring module 60 and the reflected light beam may be respectively transmitted along different optical paths in the distance measuring module 60.

Referring to FIG. 25, the light source 61, the optical path changing element 62, the collimating element 63, and the detector 64 will be described below by taking the distance measuring module 60 using a coaxial optical path.

The light source 61 can be used to emit light pulse sequences. In some embodiments, the light beam emitted by the light source 61 may be a narrow-bandwidth light beam with a wavelength outside the visible light range. In some embodiments, the light source 61 may include a laser diode through which nanosecond laser light can be emitted. For example, the laser pulse emitted by the light source 61 may last for 10 ns.

The collimating element 63 may be disposed on the light exit path of the light source 61, and may be used to collimate the laser beam emitted from the light source 61. That is, the laser beam emitted by the light source 61 may be collimated, and the light pulse from the light source 61 may be collimated and then projected to the scanning module 40. The collimating element 63 may be positioned between the light source 61 and the scanning module 40. The collimating element 63 may also be used to converge at least a part of the returned light reflected by the object to be detected and passing through the scanning module 40 to the detector 64. The collimating element 63 may be a collimating lens or other elements capable of collimating a light beam. In one embodiment, the collimating element 63 may be coated with an anti-reflection coating, which can increase the intensity of the transmitted light beam.

The optical path changing element 62 may be disposed on the light path of the light source 61 and may be used to combine the optical path of the light source 61 with the optical path of the detector 64. Specifically, the optical path changing element 62 may be positioned on the side of the collimating element 63 opposite to the scanning module 40. The optical path changing element 62 may be a mirror or a half mirror. In one example, the optical path changing element 62 may be a small reflector, which can change the optical path direction of the laser beam emitted by the light source 61 by 90° or other angles.

The detector 64 and the light source 61 may be placed on the same side of the collimating element 63. In one example, the detector 64 may be directly opposite to the collimating element 63. It can be understood that the scanning module 40 can change the emission direction of the light pulse sequences to different directions at different times, and light pulses reflected by the object to be detected can be incident on the detector 64 after passing through the scanning module 40. The detector 64 can be used to convert at least part of the returned light passing through the collimating element 63 into electrical signals. The electrical signal may specifically be an electric pulse. The detector 64 may also determine the distance between the object to be detected and the distance measuring device 100 based on the electric pulse.

When the distance measuring device 100 is working, the light source 61 emits a laser pulse, the laser pulse is collimated by the collimating element 63 after passing through the optical path changing element 62, and the collimated laser pulse is emitted by the scanning module 40 after changing the transmission direction and projected onto the object to be detected. After the laser pulse reflected by the object to be detected passes through the scanning module 40, at least part of the returned light is converged on the detector 64 by the collimating element 63. The detector 64 converts at least part of the returned light passing through the collimating element 63 into electrical signal pulses.

Figure 26:
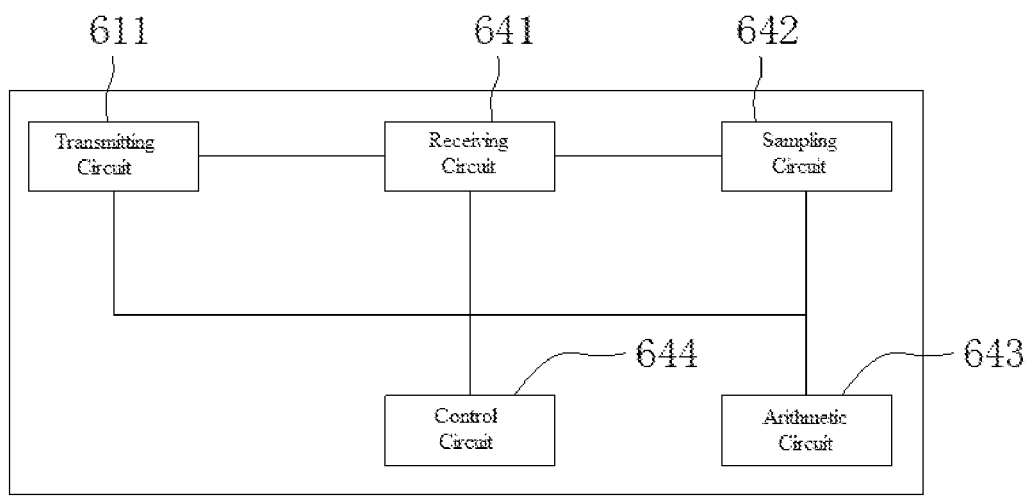
FIG. 26 is a schematic circuit diagram of a distance measuring module of the distance measuring device according to some embodiments of the present disclosure.

Referring to FIG. 25 and FIG. 26, the distance measuring device 100 of the present disclosure includes a transmitting circuit 611, a receiving circuit 641, a sampling circuit 642, and an arithmetic circuit 643. The transmitting circuit 611 may emit a light pulse sequence (e.g., a laser pulse sequence). The receiving circuit 641 can receive the light pulse sequence reflected by the object to be detected, and perform photoelectric conversion on the light pulse sequence to obtain an electrical signal, and then the electrical signal can be processed and output to the sampling circuit 642. The sampling circuit 642 can sample the electrical signal to obtain a sampling result. The arithmetic circuit 643 may determine the distance between the distance measuring device 100 and the object to be detected based on the sampling result of the sampling circuit 642. In this embodiment, the transmitting circuit 611 includes the light source 61, and the detector 64 includes the receiving circuit 641, the sampling circuit 642, and the arithmetic circuit 643.

In some embodiments, the distance measuring device 100 may further include a control circuit 644. The control circuit 644 can control other circuit, for example, control the working time of each circuit and/or set parameters for each circuit, etc. At this time, the detector 64 may further include the control circuit 644.

It should be understood that although the distance measuring device shown in FIG. 26 includes a transmitting circuit 611, a receiving circuit 641, a sampling circuit 642, and an arithmetic circuit 643, however, the embodiments of the present disclosure are not limited thereto. The number of any one of the transmitting circuit 611, the receiving circuit 641, the sampling circuit 642, and the arithmetic circuit 643 may also be at least two, which can be used to emit at least two light beams in the same direction or different directions. In some embodiments, the at least two light beams may be emitted at the same time or at different times. In one example, the light emitting chips in the at least two emitting circuits may be packaged in the same module. For example, each transmitting circuit may include a laser transmitting chip, and the dies in the laser transmitting chips in the at least two transmitting circuits may be packaged together and housed in the same packaging space.

Referring to FIG. 27, the light source 61, the optical path changing element 62, the collimating element 63, and the detector 64 will be described below by taking the distance measuring module 60 using a second type of coaxial optical path. At this time, the structure and position of the collimating element 63 are the same as the structure and position of the collimating element 63 in the first coaxial optical that, except that the optical path changing element 62 is a large reflector. The large reflector includes a reflective surface 621, and a light transmitting hole is disposed in the middle of the large reflector. The detector 64 and the light source 61 are still placed on the same side of the collimating element 63. Compared with the aforementioned first coaxial optical path, the positions of the detector 64 and the light source 61 are interchanged. That is, the light source 61 is directly opposite to the collimating element 63, the detector 64 is opposite to the reflective surface 621, and the optical path changing element 62 is positioned between the light source 61 and the collimating element 63.

When the distance measuring device 100 is working, the light source 61 emits a laser pulse, the laser pulse passes through the light transmitting hole of the optical path changing element 62 and is collimated by the collimating element 63. The collimated laser pulse is emitted by the scanning module 40 after changing the transmission direction and projected onto the object to be detected. After the laser pulse reflected by the object to be detected passes through the scanning module 40, at least part of the returned light is condensed by the collimating element 63 onto the reflective surface 621 of the optical path changing element 62. The reflective surface 621 reflects the at least part of the returned light to the detector 64. The detector 64 converts the reflected at least part of the returned light into electrical signal pulses, and the distance measuring device 100 determines the laser pulse receiving time based on the rising edge time and/or the falling edge time of the electrical signal pulse. In this way, the distance measuring device 100 can use the pulse receiving information and the pulse sending time information to calculate the flight time, thereby determining the distance from the object to be detected to the distance measuring device 100. In this embodiment, the size of the optical path changing element 62 is relatively large, and can cover the entire field of view of the light source 61. The returned light is directly reflected by the optical path changing element 62 to the detector 64, which avoids the blocking of the returned light optical path by the optical path changing element 62 itself, which increases the intensity of the returned light that the detector 64 can detect, and improves the distance measuring accuracy.

Referring to FIG. 4 and FIG. 22, in some embodiments, the bracket 30 also includes a first reinforcing arm 34. One end of the first reinforcing arm 34 is connected to the second fixing part 312, the other end of the first reinforcing arm 34 is connected to the end of the connecting arm 33 away from the first fixing part 311, and the fixing arm 31, the connecting arm 33, and the first reinforcing arm 34 together form a triangle. In other embodiments, one end of the first reinforcing arm 34 is connected to the second fixing part 312, and the other end of the first reinforcing arm 34 is connected between the opposite ends of the connecting arm 33. At this time, the fixing parts 310, the first reinforcing arm 34, and a part of the connecting arm 33 together 'form a triangle. In this embodiment, the fixing arm 31, the connecting arm 33, the coupling arm 32, and the first reinforcing arm 34 are positioned in the same plane. In this embodiment, the first reinforcing arm 34 is disposed on the brackets 30 to increase the strength of the brackets 30. When the distance measuring device 100 is impacted by the outside, the shaking of the bracket 30 will be relatively small.

Referring to FIG. 4 and FIG. 22, in some embodiments, the bracket 30 further includes a first reinforcing arm 34 and a second reinforcing arm 35. One end of the first reinforcing arm 34 is connected to the second fixing part 312, the other end of the first reinforcing arm 34 is connected to the connecting arm 33, and the fixing arm 31, the connecting arm 33, and the first reinforcing arm 34 together form a triangle. The second reinforcing arm 35 is connected to the first reinforcing arm 34 and the connecting arm 33, and the second reinforcing arm 35 is positioned in the space enclosed by the first reinforcing arm 34, the fixing arm 31, and the connecting arm 33. The fixing arm 31, the connecting arm 33, the coupling arm 32, the first reinforcing arm 34, and the second reinforcing arm 35 of this embodiments are positioned in the same plane. In this embodiment, the first reinforcing arm 34 and the second reinforcing arm 35 are provided to increase the strength of the bracket 30. When the distance measuring device 100 is impacted by the outside, the vibration of the bracket 30 will be relatively small.

Referring to FIG. 4 and FIG. 22, in some embodiments, the scanning housing 41 includes a first support 411 and a second support 412 connected to each other. The bracket 30 includes a fixing arm 31, a connecting arm 33, and a coupling arm 32 that are connected in sequence. The fixing arm 31 may be fixed on the base 10 and positioned on the same side of the first support 411 and the second support 412. Each bracket 30 may be connected to the scanning housing 41 through at least two flexible connection assemblies 50. The at least two flexible connection assemblies 50 may include a first flexible connection component 53 and a second flexible connection component 54. The first flexible connection component 53 may connect the coupling arm 32 and the first support 411, and the second flexible connection component 54 may connect the fixing arm 31 and the second support 412. At this time, the scanning housing 41 may not be formed with the mounting space 416. The length of the coupling arm 32 in this embodiment can be made shorter than the length of the coupling arm 32 in the above embodiment. Therefore, compared with the bracket 30 in the above-mentioned embodiment, the strength of the bracket 30 in this embodiment is greater, which can reduce the shaking of the bracket 30 caused by the vibration of the scanning module 40.

Referring to FIG. 4 and FIG. 22, in some embodiments, the fixing arm 31 includes a first fixing part 311, a second fixing part 312, and a second connecting part 313. The first fixing part 311 and the second fixing part 312 are positioned at opposite ends of the fixing arm 31 and are both fixed on the base 10. The first fixing part 311 is positioned on one side of the first support 411, the second fixing part 312 is positioned on one side of the second support 412, the second connecting part 313 is positioned between the first fixing part 311 and the second fixing part 312, and the second flexible connection component 54 connects the second connecting part 313 and the second support 412. The length of the coupling arm 32 in this embodiment can be made shorter than the length of the coupling arm 32 in the above embodiment. Therefore, compared with bracket 30 (the bracket 30 only including the fixing arm 31, the connecting arm 33, and the coupling arm 32, the bracket 30 being mounted in the mounting space 416) in the above embodiment, the bracket 30 of this embedment has greater strength, such that the shaking of the bracket 30 caused by the vibration of the scanning module 40 can be reduced.

Referring to FIG. 4 and FIG. 22, in some embodiments, the scanning housing 41 includes a first support 411 and a second support 412 connected to each other. The bracket 30 includes a fixing arm 31, a connecting arm 33, a coupling arm 32, and a first reinforcing arm 34. The fixing arm 31, the connecting arm 33, and the coupling arm 32 are connected in sequence. The fixing arm 31 is fixed on the base 10 and positioned on the same side of the first support 411 and the second support 412. One end of the first reinforcing arm 34 is connected to the end of the fixing arm 31 away from the connecting arm 33, and the other end of the first reinforcing arm 34 is connected to the end of the connecting arm 33 away from the fixing arm 31. Each bracket 30 may be connected to the scanning housing 41 through at least two flexible connection assemblies 50. The at least two flexible connection assemblies 50 may include a first flexible connection component 53 and a second flexible connection component 54. The first flexible connection component 53 may connect the coupling arm 32 and the first support 411, and the second flexible connection component 54 may connect the fixing arm 31 and the second support 412. In other embodiments, one end of the first reinforcing arm 34 may be connected to the end of the fixing arm 31 away from the connecting arm 33, and the other end of the first reinforcing arm 34 may be connected between opposite ends of the connecting arm 33. The length of the coupling arm 32 in this embodiment can be made shorter than the length of the coupling arm 32 in the above embodiment. Therefore, compared with bracket 30 (the bracket 30 only including the fixing arm 31, the connecting arm 33, the coupling arm 32, and first reinforcing arm 34, the bracket 30 being mounted in the mounting space 416) in the above embodiment, the bracket 30 of this embedment has greater strength, such that the shaking of the bracket 30 caused by the vibration of the scanning module 40 can be reduced.

Referring to FIG. 4 and FIG. 22, in some embodiments, the scanning housing 41 includes a first support 411 and a second support 412 connected to each other. The bracket 30 includes a fixing arm 31, a connecting arm 33, a coupling arm 32, a first reinforcing arm 34, and a second reinforcing arm 35. The fixing arm 31, the connecting arm 33, and the coupling arm 32 are connected in sequence. The fixing arm 31 is fixed on the base 10 and positioned on the same side of the first support 411 and the second support 412. One end of the first reinforcing arm 34 is connected to the end of the fixing arm 31 away from the connecting arm 33, and the other end of the first reinforcing arm 34 is connected to the connecting arm 33. The second reinforcing arm 35 is connected to the first reinforcing arm 34 and the connecting arm 33, and the second reinforcing arm 35 is positioned in the space enclosed by the first reinforcing arm 34 and the connecting arm 33. Each bracket 30 may be connected to the scanning housing 41 through at least two flexible connection assemblies 50. The at least two flexible connection assemblies 50 may include a first flexible connection component 53 and a second flexible connection component 54. The first flexible connection component 53 may connect the coupling arm 32 and the first support 411, and the second flexible connection component 54 may connect the fixing arm 31 and the second support 412. In other embodiments, one end of the first reinforcing arm 34 may be connected to the end of the fixing arm 31 away from the connecting arm 33, and the other end of the first reinforcing arm 34 may be connected between opposite ends of the connecting arm 33. The length of the coupling arm 32 in this embodiment can be made shorter than the length of the coupling arm 32 in the above embodiment. Therefore, compared with bracket 30 (the bracket 30 only including the fixing arm 31, the connecting arm 33, the coupling arm 32, first reinforcing arm 34, and the second reinforcing arm 35, the bracket 30 being mounted in the mounting space 416) in the above embodiment, the bracket 30 of this embedment has greater strength, such that the shaking of the bracket 30 caused by the vibration of the scanning module 40 can be reduced.

Referring to FIG. 21 to FIG. 24, in some embodiments, the flexible connection part 51 further includes a limiting protrusion 515, the limiting protrusion 515 protruding from the flexible first support part 511. The flexible connection part 51 may be mounted from one end of the flexible connection part 512 into the bracket mounting hole (the first bracket mounting hole 3211) or the housing mounting hole (the second housing mounting hole 41201). Specifically, when the flexible connection part 51 is mounted, the flexible second support part 512 may be elastically deformed under the action of the pulling force and may pass through the first bracket mounting hole 3211 or the second housing mounting hole 41201. A limiting protrusion 515 may be disposed on the flexible connection part 51, which can avoid the flexible first support part 511 also passing through the first bracket mounting hole 3211 or the second housing mounting hole 41201 due to excessive pulling force when the flexible connection part 51 is mounted in the first bracket mounting hole 3211 or the second housing mounting hole 41201.

In this embodiment, the number of the flexible connection assemblies 50 is at least four, and each bracket 30 is connected to the scanning housing 41 through at least two flexible connection assemblies 50 and forms a plurality of connection points. The projections of the plurality of connection points on the base 10 form an auxiliary plane P (as shown in FIG. 21). The center of gravity of the scanning housing 41 (or the center of gravity of the scanning module 40) is positioned at the center of the auxiliary plane P. The plurality of connection points on the same side of the scanning housing 41 include two connection points arranged diagonally, and the two connection points arranged diagonally form a connecting line L. The distance from the midpoint of the connecting line L to the base 10 may be the same as the distance from the center of gravity to the base 10.

Referring to FIG. 21 to FIG. 24, in some embodiments, each bracket 30 is connected to the scanning housing 41 through two flexible connection assemblies 50 and forms two connection points. The projections of the four connection points on the base 10 forms an auxiliary plane P. The two connection points positioned on the same side of the 41 are diagonally arrange and form a connecting line L. Two flexible connection assemblies 50 for connecting a bracket 30 and a scanning housing 41 include the first flexible connection component 53 and the second flexible connection component 54. The first flexible connection component 53 connects the first connecting part 321 and the first mounting part 414, and the second flexible connection component 54 connects the second connecting part 313 and the second mounting part 415. The centers of the first flexible connection component 53 and the second flexible connection component 54 can be connected to form a connecting line L. The distance from the midpoint of the connecting line L to the base 10 may be the same as the distance from the center of gravity of the scanning housing 41 (or the center of gravity of the scanning module 40) to the base 10, thereby further reducing the transmission of the vibration of the scanning module 40 to the base 10. In addition, when the distance measuring device 100 is shocked by the outside, the rotating torque received by the scanning housing 41 will be relatively small. The direction of the torque may be perpendicular to the plane where the center of the fixing parts 310, the center of the first connecting part 321, and the center of the second connecting part 313 are positioned, thereby reducing or even preventing the distance measuring device 100 from turning over due to external impact.

Referring to FIG. 21 to FIG. 24, in some embodiments, each bracket 30 is connected to the scanning housing 41 through four flexible connection assemblies 50 and forms four connection points. The projections of the eight connection points on the base 10 forms an auxiliary plane. The four connection points on the same side of the scanning housing 41 are disposed at opposite corners, two diagonal connection points form a first connection line, and the other two diagonal connection points form a second connection line. The distance from the midpoint of the first connection line to the base 10 may be the same as the distance from the center of gravity to the base 10, and the distance from the midpoint of the second connection line to the base 10 may be the same as the distance from the center of gravity to the base 10. At this time, two of the flexible connection assemblies 50 can connect the coupling arm 32 and the third rotor assembly 441, and the other two flexible connection assemblies 50 can connect the fixing arm 31 and the second support 412. Each bracket 30 can be connected to the scanning housing 41 through four flexible connection assemblies 50, such that the scanning housing 41 can be more stably mounted on the bracket 30.

Referring to FIG. 21 to FIG. 24, in some embodiments, the four connection points formed by each bracket 30 may include a first connection point, a second connection point, a third connection point, and a fourth connection point. The first connection point and the third connection point may be positioned on the side of the bracket 30 away from the base 10, and the second connection point and the fourth connection point may be positioned on the side of the bracket close to the base 10. The fourth connection point may be closer to the first connection point than the second connection point. The shape formed by sequentially connecting the first connection point, the third connection point, the second connection point, the fourth connection point, and the first connection point may be a rectangular or a parallel quadrilateral. At this time, the first connection point and the second connection point may be connected to form a first connection line, and the third connection point and the fourth connection point may be connected to form a second connection line. The midpoint of the first connection line coincides with the midpoint of the second connection line. Each bracket 30 may be connected to the scanning housing 41 through four flexible connection assemblies 50, such that the scanning housing 41 can be more stably mounted on the bracket 30.

Figure 7:
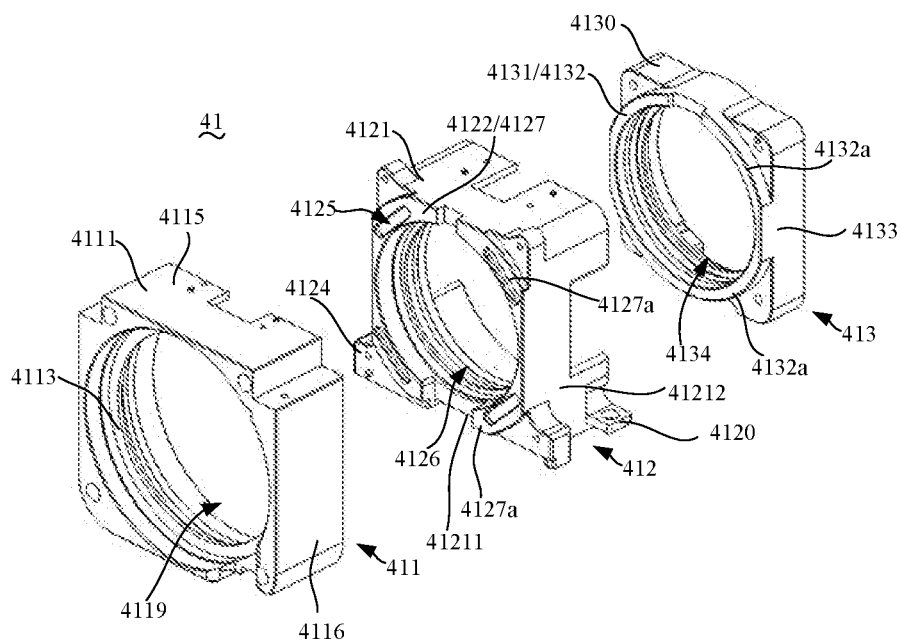
FIG. 7 is a three-dimensional exploded schematic diagram of three brackets of the scanning module shown in FIG. 5.
Figure 8:
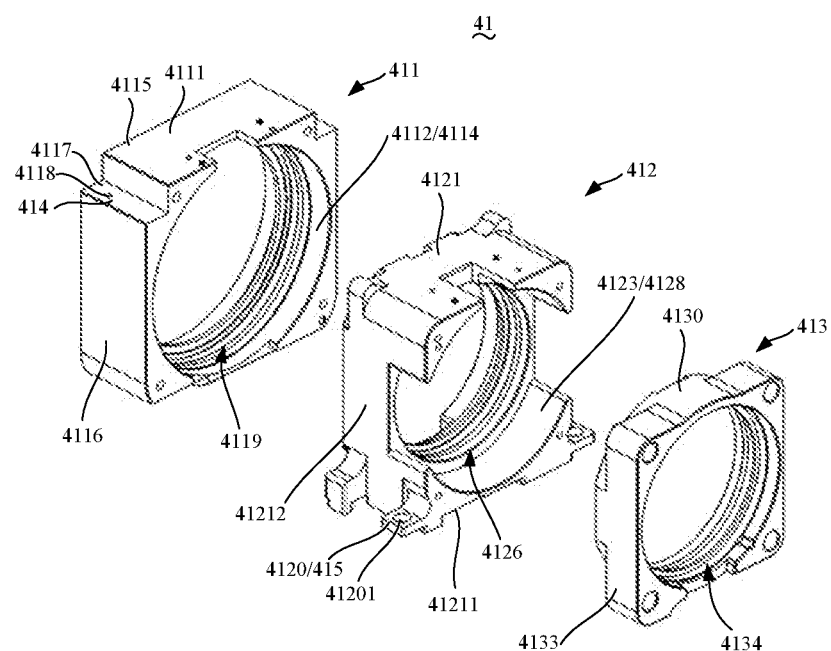
FIG. 8 is a three-dimensional exploded schematic diagram of the three brackets of the scanning module shown in FIG. 5 from another perspective.

Referring to FIG. 7 and FIG. 8, in some embodiments, a first positioning member 4112 can be formed on the first support 411, and a second positioning member 4122 can be formed on the second support 412. The first support 411 may be connected to the second support 412, and the first positioning member 4112 may cooperate with the second positioning member 4122, such that the first rotation axis 4236 and the second rotation axis 4337 may be spaced in parallel at a predetermined distance. Since the first optical element 45 is mounted in the first driver 42, the first driver 42 can be mounted on the first support 411. Further, the second optical element 46 is mounted in the second driver 43, and the second driver 43 can be mounted on the second support 412. Through the positioning function of the first positioning member 4112 and the second positioning member 4122, the positions of the rotation axes of the first optical element 45 and the second optical element 46 are not easily shifted, and the distance measuring accuracy of the distance measuring device 100 is relatively high.

In some embodiments, the predetermined distance between the first rotation axis 4236 and the second rotation axis 4337 may be set based on the actual needs of the scanning module 40. In the embodiments of the present disclosure, the first rotation axis 4236 and the second rotation axis 4337 coincide, that is, the predetermined distance between the first rotation axis 4236 and the second rotation axis 4337 is zero. The first positioning member 4112 may be formed at one end of the first support body 4111 near the second support 412, and the second positioning member 4122 may be formed at one end of the second support body 4121 near the first support 411. During installation, the installation angle of the first support 411 and the second support 412 may be determined by the first positioning member 4112 and the second positioning member 4122. Only when the first rotation axis 4236 and the second rotation axis 4337 coincide, the first support 411 and the second support 412 can be correctly matched, that is, the first positioning member 4112 and the second positioning member 4122 can fit together correctly.

Based on the difference in the shape and coupling of the first support 411 and the second support 412, the specific forms of the first positioning member 4112 and the second positioning member 4122 can be appropriately adjusted. The first positioning member 4112 and the second positioning member 4122 may be a buckle and a groove, respectively, and the first positioning member 4112 and the second positioning member 4122 may be internal threads and external threads, respectively.

In the example shown in FIG. 8, the first positioning member 4112 includes a positioning groove 4114, the second positioning member 4122 includes a positioning protrusion 4127, and the positioning protrusion 4127 extends into the positioning groove 4114 to cooperate with each other. The positioning groove 4114 can communicate with the first receiving cavity 4119, and the depth direction of the positioning groove 4114 may be the same as the direction of the first rotation axis 4236. The positioning protrusion 4127 can be formed by extending from one end of the second support body 4121, and the extending direction of the positioning protrusion 4127 may be the same as the direction of the second rotation axis 4337.

Specifically, referring to FIG. 7 and FIG. 8, the inner wall of the positioning groove 4114 has a ring shape or is part of a ring, and the positioning protrusion 4127 includes a plurality of spaced positioning protrusion elements 4127a. The outer wall of the plurality of positioning protrusion elements 4127a form a ring or a part of the ring, and the outer wall of the plurality of positioning protrusion elements 4127a abut against the inner wall of the positioning groove 4114. The center axis of the inner wall of the positioning groove 4114 may coincide with the first rotation axis 4236, and the center axis of the outer wall of the plurality of positioning protrusion elements 4127a may coincide with the second rotation axis 4337. The plurality of positioning protrusion elements 4127a may be distributed at equal angular intervals around the circumference of the second rotation axis 4337. The outer wall of the plurality of positioning protrusion elements 4127a may be interference fit with the inner wall of the positioning groove 4114, such that the first positioning member 4112 and the second positioning member 4122 are not prone to shaking after being matched.

Referring to FIG. 7 and FIG. 8, in some embodiments, the second positioning member 4122 is formed at one end of the second support 412, and the other end of the second support 412 is formed with a third positioning member 4123. A fourth positioning member 4131 is formed on the third support 413, and the third positioning member 4123 cooperates with the fourth positioning member 4131, such that the second rotation axis 4337 and the third rotation axis 4437 are spaced in parallel at a predetermined distance. Since the second optical element 46 is mounted in the second driver 43, the second driver 43 can be mounted on the second support 412. Further, the third optical element 47 is mounted in the third driver 44, the third driver 44 can be mounted on the third support 413. Through the positioning effect of the third positioning member 4123 and the fourth positioning member 4131, the positions of the rotation axes of the second optical element 46 and the third optical element 47 are not easily shifted, and the distance measuring accuracy of the distance measuring device is relatively high.

In some embodiments, the predetermined distance between the second rotation axis 4337 and the third rotation axis 4437 may be set based on the actual needs of the scanning module 40. In the embodiments of the present disclosure, the second rotation axis 4337 and the third rotation axis 4437 coincide, that is, the predetermined distance between the second rotation axis 4337 and the third rotation axis 4437 is zero. At the same time, the first rotation axis 4236, the second rotation axis 4337, and the third rotation axis 4437 can all be arranged to overlap, such that the light collection system composed of the first optical element 45, the second optical element 46, and the third optical element 47 can collect light with higher efficiency.

The third positioning member 4123 may be formed at one end of the second support body 4121 close to the third support 413, and the fourth positioning member 4131 may be formed at one end of the third support body 4130 near the second support 412. During installation, the installation angles of the first support 411 and the second support 412 may be determined by the third positioning member 4123 and the fourth positioning member 4131. Only when the second rotation axis 4337 and the third rotation axis 4437 coincide, the second support 412 and the third support 413 can be correctly matched, that is, the third positioning member 4123 and the fourth positioning member 4131 can fit together correctly.

Based on the difference in the shape and coupling of the scanning housing 41 and the third support 413, the specific forms of the third positioning member 4123 and the fourth positioning member 4131 can be appropriately adjusted. The third positioning member 4123 and the fourth positioning member 4131 may be a buckle and a groove, respectively, and the third positioning member 4123 and the fourth positioning member 4131 may be internal threads and external threads, respectively.

In the example shown in FIG. 8, the third positioning member 4123 includes a positioning groove 4128, the fourth positioning member 4131 includes a positioning protrusion 4132, and the positioning protrusion 4132 extends into the positioning groove 4128 to cooperate with each other. The positioning groove 4128 can communicate with the second receiving cavity 4126, and the depth direction of the positioning groove 4128 may be the same as the direction of the second rotation axis 4337. The positioning groove 4128 can be formed by extending from one end of the third support body 4130, and the extending direction of the positioning protrusion 4132 may be the same as the direction of the third rotation axis 4437.

Specifically, referring to FIG. 7 and FIG. 8, the inner wall of the positioning groove 4128 has a ring shape or is part of a ring, and the positioning protrusion 4132 includes a plurality of spaced positioning protrusion elements 4132*a*. The outer wall of the plurality of positioning protrusion elements 4132*a* form a ring or a part of the ring, and the outer wall of the plurality of positioning protrusion elements 4132*a* abut against the inner wall of the positioning groove 4128. The center axis of the inner wall of the positioning groove 4128 may coincide with the first rotation axis 4236, and the center axis of the outer wall of the plurality of positioning protrusion elements 4132*a* may coincide with the third rotation axis 4437. The plurality of positioning protrusion elements 4132*a* may be distributed at equal angular intervals around the circumference of the third rotation axis 4437. The outer wall of the plurality of positioning protrusion elements 4132*a* may be interference fit with the inner wall of the positioning groove 4128, such that the third positioning member 4123 and the fourth positioning member 4131 are not prone to shaking after being matched.

Referring to FIG. 7, in some embodiments, the first support 411 further includes a support ring 4113. The first support body 4111 forms a first receiving cavity 4119, and the support ring 4113 extends from the inner wall of the first support body 4111 to the receiving cavity. As described above, the first support body 4111 has a hollow structure, and the hollow part forms the first receiving cavity 4119. In order to increase the size of the first receiving cavity 4119, the inner wall of the first support body 4111 is generally set to be thinner, which may cause the strength of the first support body 4111 to decrease, which is prone to deformation when subjected to compression and impact. The support ring 4113 extends from the inner wall of the first support body 4111 to the receiving cavity, which can increase the overall strength of the first support 411, and the first support 411 is not easily deformed. In the embodiments of the present disclosure, the first receiving cavity 4119 has a cylindrical shape, and the support ring 4113 is also in an annular shape. The support ring 4113 can ensure the roundness of the first receiving cavity 4119.

Referring to FIG. 5 and FIG. 7, in some embodiments, the first driver 42 is mounted in the first receiving cavity 4119, and the first stator assembly 421 and the first positioning assembly 422 are mounted on opposite sides of the support ring 4113, respectively. When mounting the first driver 42, the first stator assembly 421 can be mounted in the first receiving cavity 4119 from one side of the support ring 4113, and the first positioning assembly 422 can be mounted in the first receiving cavity 4119 from the other side of the support ring 4113. The two can be mounted at the same time without mounting the first positioning assembly 422 and the first stator assembly 421 from the same side of the support ring 4113, which improves the installation efficiency.

Figure 6:
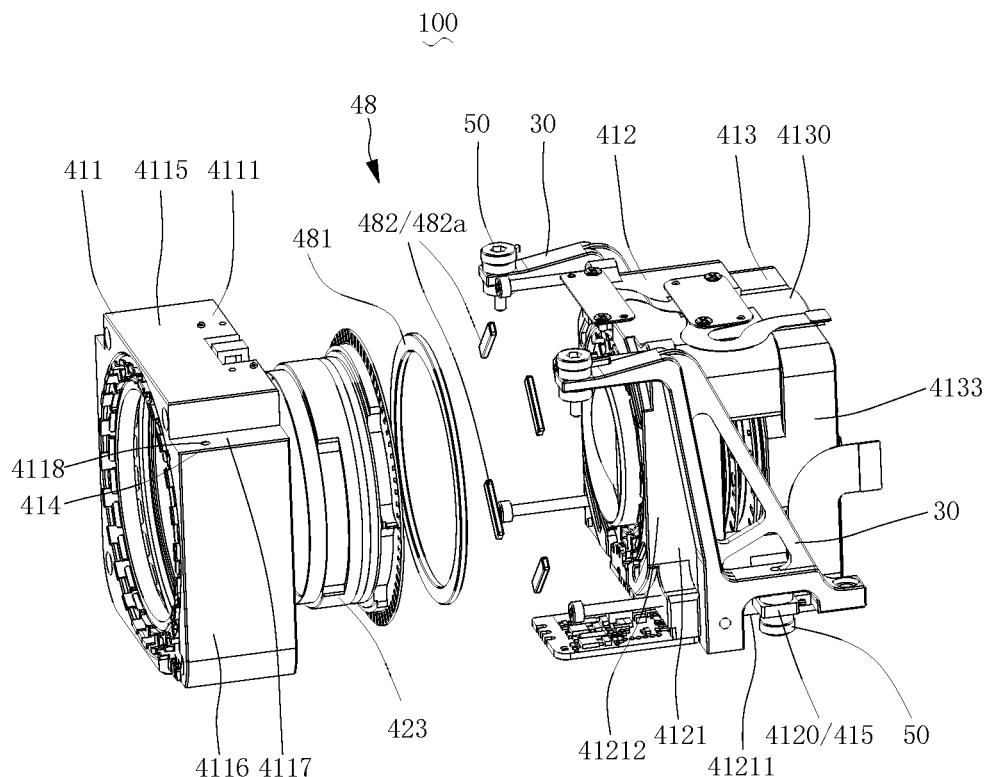
FIG. 6 is a partial three-dimensional exploded schematic diagram of the distance measuring device shown in FIG. 3.

Referring to FIG. 6 and FIG. 9, in some embodiments, the scanning module 40 further includes a pre-tensioning assembly 48. The pre-tensioning assembly 48 includes a first pre-tensioning member 481 and a second pre-tensioning member 482. The first pre-tensioning member 481 is fixed on the first rotor 4231, and the second pre-tensioning member 482 is fixed on the second support 412. The first pre-tensioning member 481 and the second pre-tensioning member 482 are oppositely disposed, and the first pre-tensioning member 481 and the second pre-tensioning member 482 can generate an interaction force along the axial direction of the first bearing 422, such that the first inner annular structure 4221 and the first outer annular structure 4222 can jointly abut against the first rolling element 4223.

It can be understood that the second support 412 can be relatively fixed to the first support 411, and the first outer annular structure 4222 can be relatively fixed to the first support 411. That is, the first outer annular structure 4222 and the second support 412 can be relatively fixed. Before the pre-tensioning assembly 48 is set, there may be a gap between the first inner annular structure 4221 and the first rolling element 4223. The gap may cause the first inner annular structure 4221 to move easily in the axial direction of the first bearing 422 when the first inner annular structure 4221 rotates, which can cause noise. After the pre-tensioning assembly 48 is set, the interaction force generated by the first pre-tensioning member 481 and the second pre-tensioning member 482 acts on the first inner annular structure 4221 and the second support 412, respectively. The first inner annular structure 4221 abuts against the first rolling element 4223 under the action of the interaction force, which can eliminate the gap of the first bearing 422, and ensure the stable rotation of the first rotation shaft.

Specifically, the interaction force between the first pre-tensioning member 481 and the second pre-tensioning member 482 can be mutual attraction or mutual repulsion. In the embodiments of the present disclosure, the first pre-tensioning member 481 and the second pre-tensioning member 482 can both be specifically made of ferromagnetic, for example, both may be magnets. The above-mentioned mutual repulsive force can be generated by facing the magnets with the same polarity, and the above-mentioned mutual attraction force can be generated by facing the magnets with different polarities.

Referring to FIG. 6 and FIG. 9, in some embodiments, the first pre-tensioning member 481 has a ring shape, and the first pre-tensioning member 481 is sleeved on the first rotor 4231. After receiving the interaction force, the first pre-tensioning member 481 is transferred to the first rotor 4231 and then to the first inner annular structure 4221. The interaction force received by the ring-shaped first pre-tensioning member 481 can be relatively uniform, which prevents the first inner annular structure 4221 from tilting. In another example, the first pre-tensioning member 481 may also include a plurality of sub-pre-tensioners, and the plurality of sub-pre-tensioners can be disposed at equal angular intervals along the circumferential direction of the first rotor 4231.

Referring to FIG. 6 and FIG. 9 again, in some embodiments, the second pre-tensioning member 482 includes a plurality of second sub-pre-tensioners 482a, and the plurality of second sub-pre-tensioners 482a are disposed at equal angular intervals along the circumferential direction of the second support 412. The second pre-tensioning members 482 disposed at equal angular intervals can provide the first pre-tensioning member 481 with a more uniform interaction force. In another example, they may have a ring shape. In the example shown in FIG. 7, the second support 412 includes a first end surface 4124 facing the first driver 42. A receiving groove 4125 is disposed on the first end surface 4124, and the second pre-tensioning member 482 is at least partially received in the receiving groove 4125. The second pre-tensioning member 482 is easily fixed on the second support 412, and the second pre-tensioning member 482 does not protrude too much from the second support 412 to increase the axial size of the scanning module 40.

Referring FIG. 9 again, in some embodiments, the pre-tensioning assembly 48 further includes a third pre-tensioning member 483 and a fourth pre-tensioning member 484. The third pre-tensioning member 483 is fixed on the second rotor 4331, the fourth pre-tensioning member 484 is fixed on a fourth rotor, and the third pre-tensioning member 483 and the fourth pre-tensioning member 484 are disposed opposite to each other. The 483 and the fourth pre-tensioning member 484 can generate an interaction force along the axial direction of the second bearing 432 and the third bearing 442, such that the second inner annular structure 4321 and the second outer annular structure 4322 jointly abut against the second rolling element 4323, and the third inner annular structure 4421 and the third outer annular structure 4422 jointly abut against the first rolling element 4223.

The second outer annular structure 4322 and the second support 412 can be fixed to each other, the third outer annular structure 4422 and the third support 413 can be fixed to each other, and the second support 412 and the third support 413 can be fixed to each other, then the second outer annular structure 4322 and the third outer annular structure 4422 can be fixed to each other. The interaction force between the third pre-tensioning member 483 and the fourth pre-tensioning member 484 can act on the second rotor 4331 and the third rotor 4431 respectively, and then respectively transferred to the second inner annular structure 4321 and the third inner annular structure 4421. As such, the second inner annular structure 4321 can abut against the second rolling element 4323 to eliminate the gap of the second bearing 432, and the third inner annular structure 4421 can abut against the third rolling element 4423 to eliminate the gap of the third bearing 442 to ensure the stably rotation of the second bearing 432 and the third bearing 442.

Specifically, the interaction force between the third pre-tensioning member 483 and the fourth pre-tensioning member 484 can be mutual attraction or mutual repulsion. In the embodiments of the present disclosure, the third pre-tensioning member 483 and the fourth pre-tensioning member 484 can both be specifically made of ferromagnetic, for example, both may be magnets. The above-mentioned mutual repulsive force can be generated by facing the magnets with the same polarity, and the above-mentioned mutual attraction force can be generated by facing the magnets with different polarities. The third pre-tensioning member 483 may be ring-shaped and sleeved on the third rotor 4431, and the fourth pre-tensioning member 484 may be ring-shaped and sleeve on the fourth rotor.

In the embodiments of the present disclosure, the first bearing 422, the second bearing 432, and the third bearing 442 can be coaxially disposed. That is, the first rotation axis 4236, the second rotation axis 4337, and the third rotation axis 4437 can be coaxially disposed.

Referring FIG. 9, in some embodiments, the first optical element 45, the second optical element 46, and the third optical element 47 are sequentially disposed side by side. The scanning module 40 may be configured to receive light pulses, change the propagation direction of the light pulses and emitting them, and receive the light pulses reflected by the object. In some embodiments, in the process of changing the propagation direction of the light pulses and emitting them, the light pulses pass through the first optical element 45, the second optical element 46, and the third optical element 47 successively. In the embodiments of the present disclosure, the aperture of the first optical element 45 is larger than the aperture of the third optical element 47.

By providing three optical elements, the three optical elements can combine more refraction angles, and the aperture of the first optical element 45 can be larger than the aperture of the third optical element 47. The first optical element 45 can receive more light pulses reflected by the object, and the light pulses passing through the second optical element 46 can be deflected by the first optical element 45 by a larger angle, which improves the field of view of the scanning module 40.

In one example, the aperture of the first optical element 45 may be larger than the aperture of the second optical element 46, and the aperture of the second optical element 46 may be equal to the aperture of the third optical element 47. The second driver 43 for mounting the second optical element 46 and the third driver 44 for mounting the third optical element 47 can be set the same, and the size of the second support 412 for mounting the second driver 43 and the third support 413 for mounting the third driver 44 can be set to be similar to the same.

In other embodiments, the aperture of the second optical element 46 may be larger than the aperture of the first optical element 45, and the aperture of the second optical element 46 may be larger than the aperture of the third optical element 47. In the process of emission, the light pulse may pass through the third optical element 47, the second optical element 46, and the first optical element 45 successively. The range to which the light pulse can be refracted can gradually increase without being blocked by the rotors (the third rotor 4431, the second rotor 4331, and the first rotor 4231). Of course, the aperture of the first optical element 45 may also be equal to the aperture of the second optical element 46, and the aperture of the second optical element 46 may be larger than the aperture of the third optical element 47.

Figure 17:
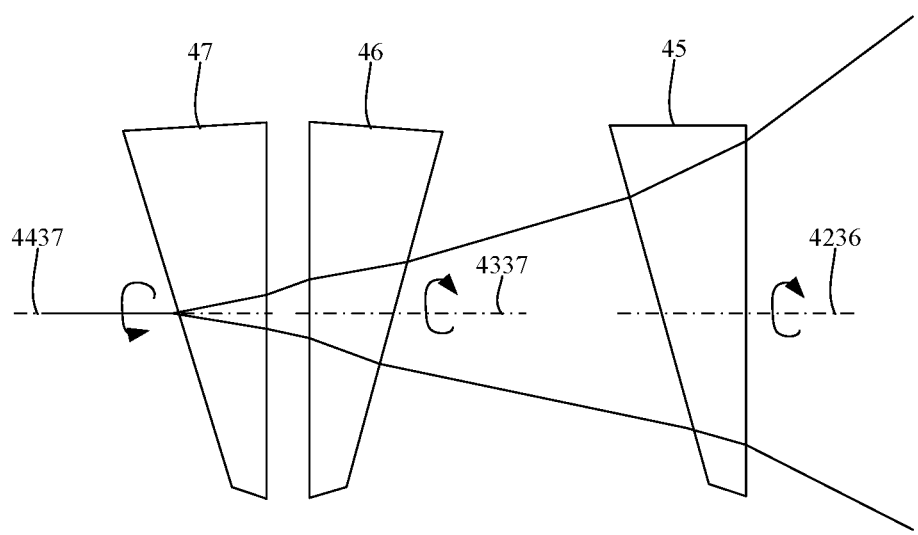
FIG. 17 and FIG. 18 are schematic diagrams of a light path of the scanning module in some embodiments.

Referring to FIG. 9, in some embodiments, the second rotor 4331 extends into the first receiving cavity 4235. Specifically, the second yoke 4333 extends into the first receiving cavity. Since the first optical element 45 is mounted in the first receiving cavity 4235, the second optical element 46 is mounted in the second receiving cavity 4336 formed by the second rotor 4331. The second rotor 4331 extends into the first receiving cavity 4235, which can actually make the second optical element 46 and the first optical element 45 relatively close, and the optical path between the second optical element 46 and the first optical element 45 can be reduced. Referring to FIG. 9 and FIG. 17, take the emitted laser as an example, the laser beam is refracted after passing through the second optical element 46. Since the second optical element 46 is relatively close to the first optical element 45, the range of the laser beam on the first optical element 45 is relatively short under the same refraction angle, which can prevent the laser from being irradiated on the first rotor 4231 to be blocked, and improve the efficiency of the light emission and light collection. At the same time, the size of the scanning module 40 in the axial direction can also be reduce. In one example, the second optical element 46 may at least partially extend into the first receiving cavity 4235, such that the second optical element 46 and the first optical element 45 can be close to each other, thereby further improving the efficiency of light emission and light collection.

Figure 12:
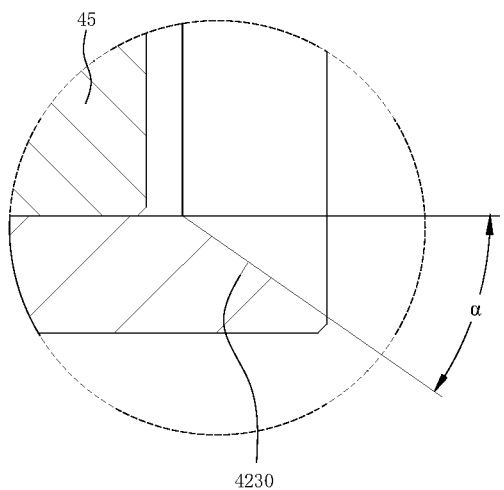
FIG. 12 is an enlarged schematic diagram of the scanning module of XII shown in FIG. 10.

Referring to FIG. 9 and FIG. 12, in some embodiments, the inner wall of the first rotor 4231 forms a first receiving cavity 4235, and the first rotor 4231 includes an outer end 4239 away from the second driver 43. An avoiding chamfer 4230 is formed at the intersection of the outer end 4239 and the inner wall of the first rotor 4231. On one hand, forming the avoiding chamfer 4230 does not reduce the length of the first rotor 4231 in the axial direction such that the first stator assembly 421 can be disposed on the outer peripheral surface of a first yoke 4223a, on the other hand, forming the avoiding chamfer 4230 and facilitating the light to pass through the avoiding chamfer 4230 without being blocked by the inner wall of the first rotor 4231 can improve the efficiency of light emission and light collection of the scanning module 40. Specifically, the angel α of the avoiding chamfer 4230 can be in the range of (0°, 40° ], such as 10°, 12°, 15.5°, 23°, 27°, 40°, etc., of any degrees within the range. As such, the strength of the first rotor 4231 will not be greatly weakened, and the first stator assembly 421 can be better supported.

Correspondingly, in the process of receiving the light pulse reflected by the object, the light pulse first passes through the first optical element 45, and then passes through the second optical element 46 and the third optical element 47. In the embodiments of the present disclosure, the first optical element 45, the second optical element 46, and the third optical element 47 are all light refractive elements, that is, the first optical element 45, the second optical element 46, and the third optical element 47 can independently refract the passing light to change the original propagation direction of the light.

In the embodiments of the present disclosure, the first optical element 45, the second optical element 46, and the third optical element 47 are coaxially disposed, such that the laser pulse is not easily blocked by the first rotor 4231, the second rotor 4331, or the third rotor 4431 after being refracted, thereby improving the efficiency of light emission and light collection of the scanning module 40. Of course, in other embodiments, the optical axes of the first optical element 45, the second optical element 46, and the third optical element 47 may not be coaxially disposed. In addition, devices such as reflective elements may also be added, which is not limited herein.

In one example, the distance between the first optical element 45 and the second optical element 46 may be less than the distance between the second optical element 46 and the third optical element 47. Alternatively, the distance between the first optical element 45 and the second optical element 46 may be equal to or greater than the distance between the second optical element 46 and the third optical element 47.

In some embodiments, the viewing angle of the scanning module 40 in the horizontal direction may be greater than the viewing angle in the vertical direction, such that the distance measuring device can more easily detect the depth information of the surrounding objects to be detected. For example, the viewing angle of the scanning module 40 in the horizontal direction may be between [60°, 80° ], such as 60°, 65°, 70°, 71°, 75°, 75.8°, 78, 80°, etc. or any angle in the above range. The viewing angle of the scanning module 40 in the vertical direction may be between [25°, 35° ], such as 25°, 26°, 26.5°, 27.4°, 28°, 29°, 32°, 35°, etc. or any angle in the above range. In one example, the field of view of the scanning module 40 may be elongated, such as a rectangular. The long side of the rectangle may be parallel to the horizontal or vertical line. The field of view of the scanning module 40 may also be an ellipse. The long axis of the ellipse may be parallel to the horizontal or vertical line.

In some embodiments, the second driver 43 may rotate to drive the second optical element 46 to rotate around the second rotation axis 4337, and the third driver 44 may rotate to drive the third optical element 47 to rotate around the third rotation axis 4437. It can be understood that the second driver 43 and the third driver 44 may be independently controlled to rotate. The second optical element 46 may rotate at the same time as the third optical element 47, and the direction and speed of rotation can be the same or different. It is also possible that the second optical element 46 rotates and the third optical element 47 does not rotate. It may also be that the second optical element 46 does not rotate and the third optical element 47 rotates. During the rotation of the second optical element 46 and/or the third optical element 47, the light pulses can be changed to different directions and emitted by the second optical element 46 and/or the third optical element 47.

Further, the first driver 42 may rotate to drive the first optical element 45 to rotate around the first rotation axis 4236. The first driver 42, the second driver 43, and the third driver 44 can be independently controlled to rotate, such that the rotation speed and direction of the second optical element 46 and the third optical element 47 will not affect the rotation speed and direction of the first optical element 45.

Referring to FIG. 17, in some embodiments, the angle between the light-emitting surface of the first optical element 45 and a plane perpendicular to the first rotation axis 4236 may be less than 10°. In addition, the angle between the light-emitting surface of the third optical element 47 and the plane perpendicular to the third rotation axis 4437 may be less than 10°.

In other words, the included angle between the light-emitting surface of the first optical element 45 and the first receiving cavity 4235 may be between 80° to 90°. In addition, the included angle between the light-emitting surface of the third optical element 47 and the second rotation axis 4337 may be between 80° to 90°.

In the example shown in FIG. 17, the light-emitting surface of the first optical element 45 is perpendicular to the first rotation axis 4236, and the light-emitting surface of the third optical element 47 is perpendicular to the third rotation axis 4437. In some embodiments, the light-emitting surface may refer to the last surface that the laser pulse passes through the optical element when the laser pulse is emitted by the distance measuring device. For example, the light-emitting surface of the first optical element 45 indicates the surface that he emitted laser pulse passes through the first optical element 45 last. The light-emitting surface of the first optical element 45 is perpendicular to the third rotation axis 4437, such that for the same light-emitting surface area, the effective light receiving area of the first optical element 45 is larger.

It can be understood that the first optical element 45, the second optical element 46, and the third optical element 47 may be disposed side by side, and there facing surfaces and opposing surfaces between two adjacent optical elements. In the example shown in FIG. 17, the two opposite surfaces of the second optical element 46 and the third optical element 47 are parallel. The distance between two facing surfaces of the second optical element 46 and the third optical element 47 may be between [1.5 mm, 5 mm], specifically, the distance may be 1.5 mm, 2 mm, 2.7 mm, 3.4 mm, 4.9 mm, 5 mm, etc. or any value within the above range. The distance between two facing surfaces of the first optical element 45 and the second optical element 46 may be between [10 mm, 25 mm], specifically, the distance may be 10 mm, 15 mm, 17.3 mm, 17.5 mm, 20 mm, 22.5 mm, 24 mm, 25 mm, etc. or any value within the above range. The facing surfaces of the first optical element 45 and the third optical element 47 may be parallel, and the facing surfaces of the first optical element 45 and the third optical element 47 may refer to the surfaces where the first optical element 45 and the third optical element 47 are close to each other. In some embodiments, the distance between two facing surfaces may refer to the distance between the two facing surfaces and the intersection between the two surfaces and the respective optical axes.

When the first optical element 45, the second optical element 46, and the third optical element 47 are all wedge prisms, the wedge angle of the second optical element 46 and the third optical element 47 may be between [19°, 21°], such as 19°, 19.5°, 20°, 20.5°, 20.8°, 21°, etc., or any value within the above range. The wedge angles of the second optical element 46 and the third optical element 47 may be the same, for example both may be 20° or both may be 21°. The wedge angles of the second optical element 46 and the third optical element 47 may not be the same, for example, the wedge angle of the second optical element 46 may be 20° and the wedge angle of the third optical element 47 may be 21°. The wedge angle of the first optical element 45 may be between [17°, 19°], such as 17°, 17.7°, 18°, 18.30, D 19°, etc., or any value within the above range.

Referring to FIG. 17 to FIG. 20, the surface of the third optical element 47 away from the first optical element 45 may not be perpendicular to the optical axis of the third optical element 47. In some embodiments, not being perpendicular can be understood as oblique. The optical axis of the third optical element 47 may coincide with the third rotation axis 4437, which can prevent the surface of the third optical element 47 away from the surface of the first optical element 45 from reflecting the light emitted from the distance measuring module 60 back to the detector 64, and avoid interference with the light received by the detector 64.

Figure 18:
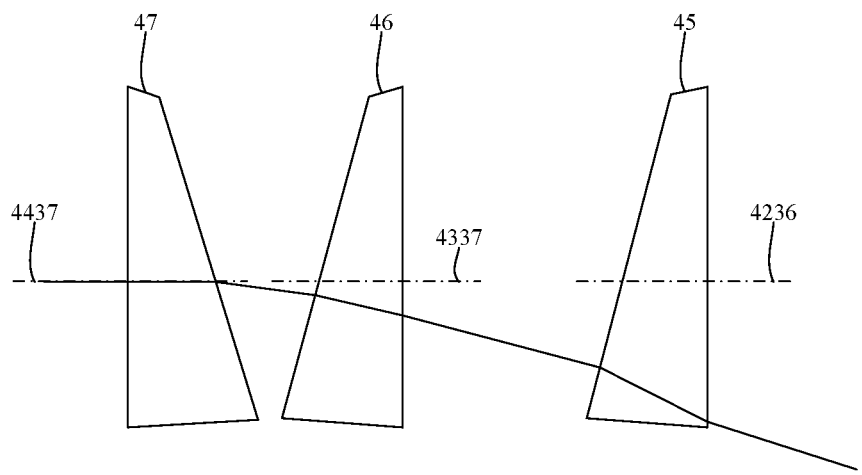

Referring to FIG. 18, in some embodiments, the difference between the refractive power of the second optical element 46 and the third optical element 47 for the light pulse may be less than 10°. For example, the difference in refractive power may be 0°, 2°, 5°, 7°, 8.3°, 10°, etc., or any degree less than the range of 10°. In one example, the second optical element 46 and the third optical element 47 may have the same refractive power for the light pulse, that is, the different between the refractive power of the second optical element 46 and the third optical element 47 for the light pulse is 0°. In some embodiments, the refractive power of an optical element may refer to the deflection angle of the emitted light compared to the incident light when the incident light is perpendicular to the light incident surface. The difference in refractive power being less than 10° may mean that when the incident light is perpendicular to the light entrance surface, the direction of deflection of the incident light is the same, but the difference in deflection angle is less than 10°, or direction of deflection is different, but the angle of the direction of deflection is less than 10°.

The material of the second optical element 46 and the third optical element 47 may be the same, the second optical element 46 and the third optical element 47 may both be wedge-shaped prisms, and the wedge angles of the two may be the same. The two opposite surfaces of the second optical element 46 and the third optical element 47 may be parallel to each other.

When rotating the second optical element 46 and the third optical element 47, the second optical element 46 and the third optical element 47 may be rotated in opposite directions at the same speed. For example, the second optical element 46 may rotate forward and the third optical element 47 may rotate in reverse at the same speed, or the second optical element 46 may rotate in reverse and the third optical element 47 may rotate forward at the same speed.

Figure 19:
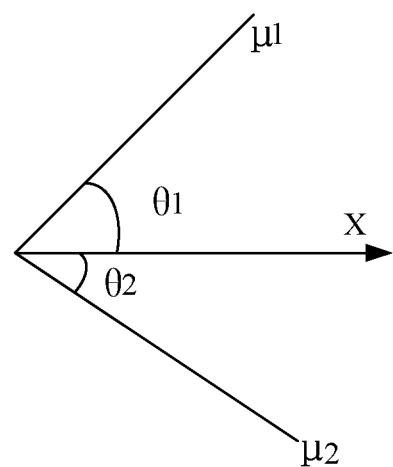
FIG. 19 is a schematic diagram of a phase angle of the scanning module in some embodiments.

In some embodiments, during the rotation of the second optical element 46 and the third optical element 47, the sum of the phase angle of the second optical element 46 and the third optical element 47 may float around a fixed value, and the floating range may not exceed 20°. In some embodiments, the phase angle may refer to the angle between the zero position of the light refraction element and a reference direction. Referring to FIG. 18 and FIG. 19, along the direction of the optical axis of the second optical element 46 and the third optical element 47, the reference direction can be shown by a direction x, the zero position of the second optical element 46 is represented by μ1, the zero position of the third optical element 47 is represented by μ2, the phase angle of the second optical element 46 is represented by θ1, the phase angle of the third optical element 47 is represented by θ2, and the sum of the phase angle of the second optical element 46 and the phase angle of the third optical element 47 is represented by θ1+θ2. In some embodiments, the phase angle formed in the reference direction in the counterclockwise direction may be positive and the clockwise direction may be negative, or the phase angle formed in the reference direction in the clockwise direction may be negative and the counterclockwise direction may be positive.

In one example, during the rotation of the second optical element 46 and the third optical element 47, the sum of the phase angle of the second optical element 46 and the phase angle of the third optical element 47 may be a fixed value. In another example, the reference direction described above may be the horizontal direction, and the sum of the phase angle of the second optical element 46 and the phase angle of the third optical element 47 may float around 0°, which enables the scanning module 40 to scan a strip-shaped field of view extending in the horizontal direction, such that the distance measuring device is more suitable for certain scenarios, for example, more suitable for obstacle avoidance of autonomous vehicles.

Referring to FIG. 9 and FIG. 10, in this embodiment, the radial dimension of the second rotor 4331 is smaller than the radial dimension of the first rotor 4231. The second rotor 4331 and the first rotor 4231 are coaxially disposed, that is, the second rotation axis 4337 and the first rotation axis 4236 overlap. The second rotor assembly 433 and the rotor assembly 423 are distributed along the same rotation axis direction, and the second rotor assembly 433 is positioned at a position facing a first surface 453 of the first optical element 45 in the rotor assembly 423.

The radial dimension of the third rotor 4431 may be equal to the radial dimension of the second rotor 4331, and the axial dimension of the third rotor 4431 may be less than or equal to or greater than the axial dimension of the second rotor 4331. The third rotor 4431 and the second rotor 4331 may be coaxially disposed, that is, the third rotation axis 4437, the second rotation axis 4337, and the first rotation axis 4236 may overlap. The third rotor assembly 443 and the second rotor assembly 433 may be distributed along the same rotation axis direction, and the third rotor assembly 443 may be positioned at a positioned facing a second surface 464 of the second optical element 46 in the second rotor assembly 433.

Referring to FIG. 9 and FIG. 10, in the embodiments of the present disclosure, the first optical element 45 is formed with a first surface 453 and a second surface 454 opposite to each other. The first surface 453 is inclined with respect to the first rotation axis 4236, that is, the angle between the first surface 453 and the first rotation axis 4236 is not 0° or 90°. The second surface 454 is perpendicular to the first rotation axis 4236, that is, the angle between the second surface 454 and the first rotation axis 4236 is 90°.

It can be understood that since the first surface 453 and the second surface 454 are not parallel, the thickness of the first optical element 45 may not be uniform, that is, the thickness of the first optical element 45 may not be the same everywhere, and there may be places with greater thickness and places with less thickness. In one example, the first optical element 45 includes a first end 451 and a second end 452. The first end 451 and the second end 452 are respectively positioned at two ends of the first optical element 45 in the radial direction. The thickness of the first optical element 45 may gradually increase in one direction, and the thickness of the first end 451 may be greater than the thickness of the second end 452. In other words, the first optical element 45 may be a wedge mirror (wedge prism).

Due to the uneven weight distribution of each optical element itself, when rotating at a high speed, it will easily shake and not be stable enough, thereby limiting the speed of rotation. To solve this technical problem, in some embodiments of the present disclosure, the dynamic balance of the scanning module 40 is improved by reducing the weight of the scanning module 40 and increasing the weight of the scanning module 40.

For example, when reducing the weight of the scanning module 40 to improve the dynamic balance of the scanning module 40, in the following embodiments, a notch can be formed on the first optical element 45 and/or the first rotor 4231 to improve the dynamic balance of the scanning module 40.

The position of the notch between the first optical element 45 and the first rotor 4231 will be described below.

Referring to FIG. 9 and FIG. 10, in one example, the notch includes a corner 455 disposed on the first optical element 45, and the corner 455 is positioned at the edge of the first end 451. The corner 455 is opposite to the inner surface of the first side wall 4234 of the first rotor 4231 and is positioned at a position of the first optical element 45 away from the optical path of the first optical element 45. In other words, the corner 455 is positioned at a positioned in the first optical element 45 where light does not pass. In this way, the corner 455 can improve the dynamic balance of the scanning module 40 without affecting the laser transmission in the first optical element 45.

Referring to FIG. 9 and FIG. 10, in one example, the first rotor 4231 includes a third end 4237*a* and a fourth end 4237*b* distributed along the direction of the first rotation axis 4236 of the first rotor 4231, and the third end 4237*a* and the fourth end 4237*b* are disposed opposite to each other. The third end 4237*a* of the first rotor 4231 is close to the second surface 454 of the first optical element 45, and the fourth end 4237*b* of the first rotor 4231 is close to the first surface 453 of the first optical element 45. The notch includes an inner groove 4234*a* formed on the inner surface of the first side wall 4234 of the first rotor 4231, and the inner groove 4234*a* is close to the first end 451 of the first optical element 45. The inner groove 4234*a* is closer to the fourth end 4237*b* than the third end 4237*a*, or in other words, the inner groove 4234*a* extends from the third end 4237*a* toward the fourth end 4237*b*. In another example, the inner groove 4234*a* may be opposite to the corner 455, and the projection range of the inner groove 4234*a* on the first rotation axis 4236 may cover the projection range of the corner 455 on the first rotation axis 4236. In another example, there may be a plurality of inner grooves 4234*a* (greater than or equal to two), and the plurality of inner grooves 4234*a* may be disposed at intervals. In this way, it can avoid a single inner groove 4234*a* having a larger area, which can have an impact on the strength of the first side wall 4234.

Figure 13:
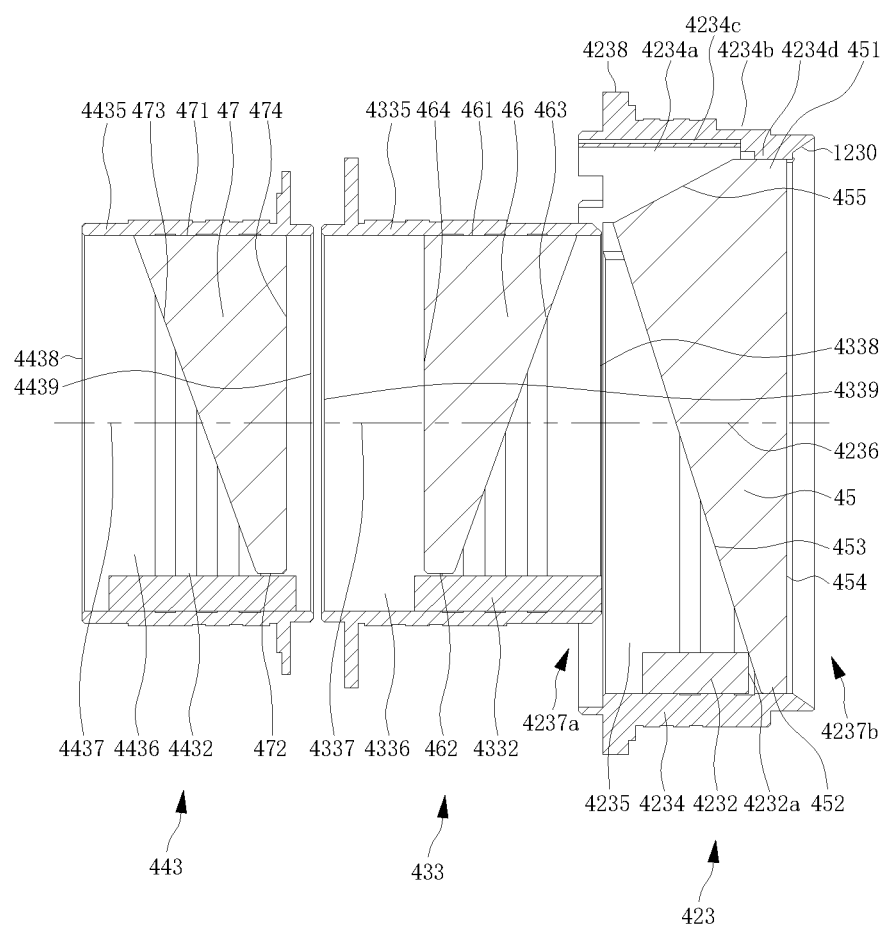
FIG. 13 and FIG. 14 are schematic cross-sectional views of partial structures of the scanning module in some embodiments.

Referring to FIG. 9 and FIG. 13, in one example, the first rotor 4231 includes a third end 4237*a* and a fourth end 4237*b* distributed along the direction of the first rotation axis 4236 of the first rotor 4231. The third end 4237*a* and the fourth end 4237*b* are disposed opposite to each other. The third end 4237*a* of the first rotor 4231 is close to the second surface 454 of the first optical element 45, and the fourth end 4237*b* of the first rotor 4231 is close to the first surface 453 of the first optical element 45. The notch includes a groove 4234*c* formed in the middle (between the outer surface and the inner surface) of the first side wall 4234 of the first rotor 4231, that is, the groove 4234*c* does not penetrate the inner surface and the outer surface of the first side wall 4234. The groove 4234*c* is close to the first end 451 of the first optical element 45, and the groove 4234*c* is closer to the fourth end 4237*b* than the third end 4237*a*. In other words, the groove 4234*c* extends from the third end 4237*a* toward the fourth end 4237*b*. In another example, there may be a plurality of inner grooves 4234*c* (greater than or equal to two), and the plurality of inner grooves 4234*c* may be disposed at intervals. In this way, it can avoid a single inner groove 4234*c* having a larger area, which can have an impact on the strength of the first side wall 4234.

Referring to FIG. 9 and FIG. 13, in one example, the projection range of the groove 4234*c* on the first rotation axis 4236 may cover the projection range of the chamfer on the first rotation axis 4236. In another example, the projection range of the groove 4234*c* on the first rotation axis 4236 may cover the projection range of the inner groove 4234*a* on the first rotation axis 4236. In another example, the projection range of the groove 4234*c* on the first rotation axis 4236 may cover all the projection range of the corner and the inner groove 4234*a* on the first rotation axis 4236.

In one example, the first rotor 4231 includes a third end 4237*a* and a fourth end 4237*b* distributed along the direction of the first rotation axis 4236 of the first rotor 4231. The third end 4237*a* and the fourth end 4237*b* are disposed opposite to each other. The third end 4237*a* of the first rotor 4231 is close to the second surface 454 of the first optical element 45, and the fourth end 4237*b* of the first rotor 4231 is close to the first surface 453 of the first optical element 45. The notch includes an outer groove 4234*b* formed on the outer surface of the first side wall 4234 of the first rotor 4231. The outer groove 4234*b* is close to the first end 451 side of the first optical element 45, and the outer groove 4234*b* is closer to the third end 4237*a* than the fourth end 4237*b*. In other words, the outer groove 4234*b* extends from the fourth end 4237*b* toward the third end 4237*a*. In another example, there may be a plurality of inner grooves 4234*b* (greater than or equal to two), and the plurality of inner grooves 4234*b* may be disposed at intervals. In this way, it can avoid a single inner groove 4234*b* having a larger area, which can have an impact on the strength of the first side wall 4234.

Figure 15:
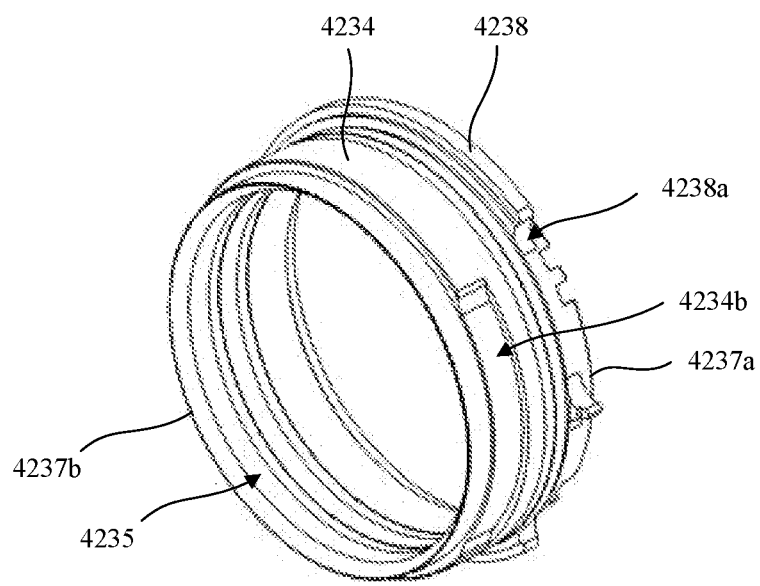
FIG. 15 is three-dimensional schematic diagram of a rotor of the scanning module shown in FIG. 9.
Figure 16:
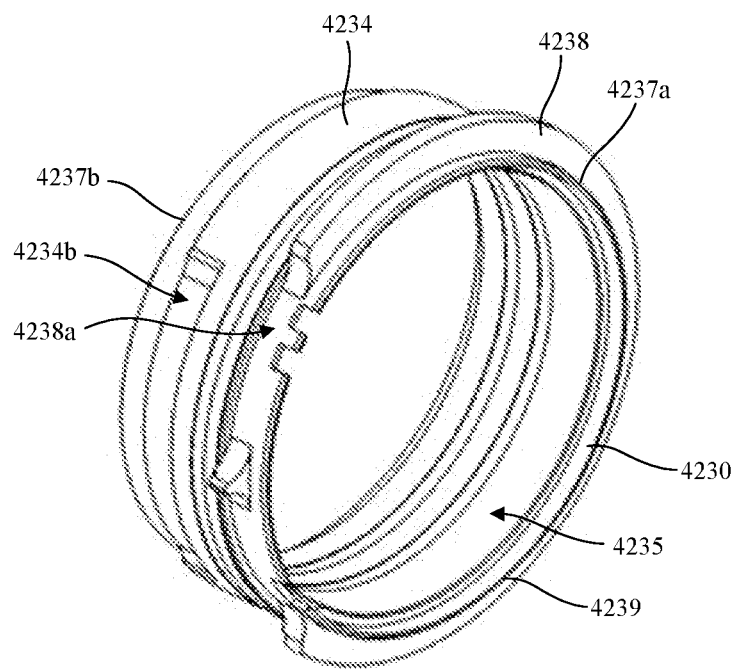
FIG. 16 is a three-dimensional schematic diagram of the rotor of the scanning module shown in FIG. 9 from another perspective.

Referring to FIG. 10, FIG. 15, and FIG. 16, in one example, the first rotor 4231 includes a third end 4237*a* and a fourth end 4237*b* distributed along the direction of the first rotation axis 4236 of the first rotor 4231. The third end 4237*a* and the fourth end 4237*b* are disposed opposite to each other. The third end 4237*a* of the first rotor 4231 is close to the second surface 454 of the first optical element 45, and the fourth end 4237*b* of the first rotor 4231 is close to the first surface 453 of the first optical element 45. A rib 4238 is formed on the outer surface of the first side wall 4234 of the first rotor 4231 to extend radially outward. The rib 4238 is disposed around the first side wall 4234 of the first rotor 4231, and the rib 4238 is closer to the fourth end 4237*b* than the third end 4237*a*. The notch includes an opening 4238*a* disposed on the rib 4238, and the opening 4238*a* is close to the side of the first end 451 of the first optical element 45. In another example, there may be a plurality of openings 4238*a* (greater than or equal to two), and the plurality of opening 4238*a* may be disposed at intervals. In this way, it can avoid a single opening 4238*a* having a larger area, which can have an impact on the strength of the rib 4238.

In one example, the notch (the corner 455, the inner groove 4234*a*, the outer groove 4234*b*, the groove 4234*c*, and the opening 4238*a*) may be symmetrical about a third auxiliary plane. The third auxiliary plane may be a plane passing through the first rotation axis 4236, the first end, and the second end.

In this way, the arrangement of the notch described above is beneficial to reduce the shaking caused by the uneven thickness of the first optical element 45 when rotating, and is beneficial to the entire rotor assembly 423 to rotate more smoothly.

Figure 20:
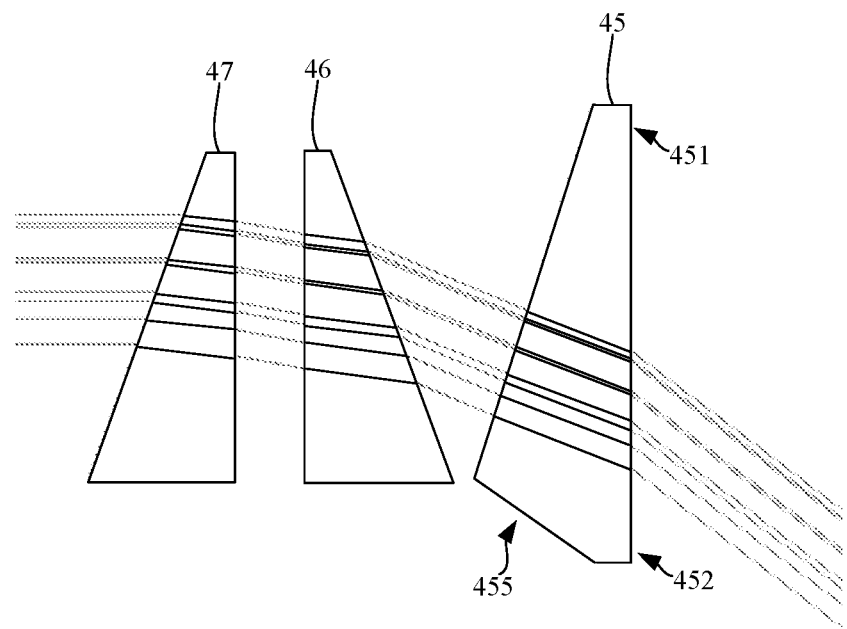
FIG. 20 is a schematic diagram of the light path of the scanning module in some embodiments.

Referring to FIG. 20, it can be understood that the position of the notch described above may be a position where the light path does not pas, which does not affect the propagation of the light beam, and does not reduce the light output and light collection efficiency of the optical elements.

When the weight of the scanning module 40 is increase to improve the dynamic balance of the scanning module 40, in the following embodiments, a bump 4232 is added to the first rotor 4231 to improve the dynamic balance of the scanning module 40.

Referring to FIG. 9 and FIG. 10, the position of the first rotor 4231 and the bump 4232 will be described below.

The rotor assembly 423 further includes a bump 4232. The bump 4232 can be used to improve the smooth movement of the rotor assembly 423 when rotating. Specifically, the bump 4232 is disposed on the first side wall 4234 of the first rotor 4231 and is positioned in the first receiving cavity 4235. The bump 4232 extends from the first side wall 4234 to the center of the first receiving cavity 4235. The height of the bump 4232 extends toward the center of the first receiving cavity 4235 may be lower than a predetermined ratio of the radial width of the first receiving cavity 4235, and the predetermined ratio may be 0.1, 0.22, 0.3, 0.33, etc. to prevent the bump 4232 from blocking the first receiving cavity 4235 too much and affecting the transmission optical path of the laser pulse.

The bump 4232 may be fixedly connected to the first rotor 4231, such that the bump 4232 and the first rotor 4231 can rotate synchronously. The bump 4232 may be integrally formed with the first rotor 4231, for example, by injection molding or other processes. The bump 4232 may also be formed separately from the first rotor 4231. After the bump 4232 and the first rotor 4231 are formed separately, the bump 4232 may be fixed on the first side wall 4234 of the first rotor 4231, such as bonding the bump 4232 to the first side wall 4234 by glue, or fixing the bump 4232 on the first side wall 4234 of the first rotor 4231 by a fastener such as a screw. In some embodiments, the surface of the bump 4232 that is attached to the first side wall 4234 may be a curved surface. In the embodiments of the present disclosure, the bump 4232 may rotate synchronously with the first yoke 4233*a*, and the bump 4232 may be fixedly connected to the first yoke 4233*a*.

Figure 11:
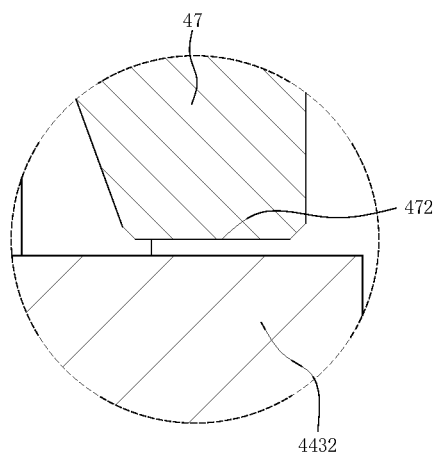
FIG. 11 is an enlarged schematic diagram of the scanning module of XI shown in FIG. 10.

Referring to FIG. 10 and FIG. 11, in one example, when the bump 4232 is mounted in the first receiving cavity 4235, the bump 4232 and the first optical element 45 are distributed along the radial direction of the first rotor 4231. At this time, the first end 451 of the first optical element 45 can be in contact with the inner surface of the first side wall 4234, the second end 452 may form a gap with the first side wall 4234, and the bump 4232 may extend into the gap. In this way, since the second end 452 and the bump 4232 are positioned on the same side of the first rotation axis 4236, and the first end 451 and the bump 4232 are positioned on opposite sides of the first rotation axis 4236, when the first optical element 45 and the rotor assembly 423 rotate synchronously, the overall rotation formed by the first optical element 45 and the bump 4232 is stable, thereby avoiding the shaking of the rotor assembly 423, which is beneficial to the entire rotor assembly 423 to rotate more smoothly. In another example, the bump 4232 may be spaced from the first optical element 45, and the surface of the bump 4232 facing the first optical element 45 may be a flat surface. In another example, the projection range of the bump 4232 on the first rotation axis 4236 may cover the projection range of the first optical element 45 on the first rotation axis 4236.

Figure 14:
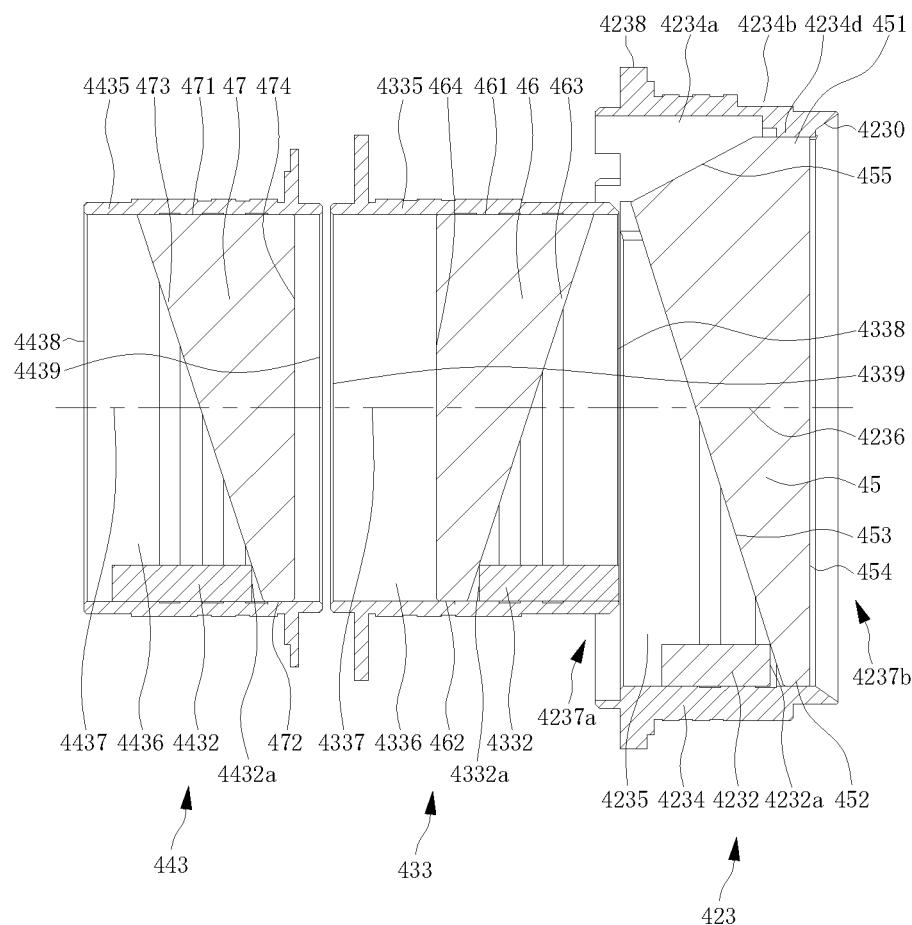

Referring to FIG. 14, in one example, when the bump 4232 is mounted in the first receiving cavity 4235, the bump 4232 and the first optical element 45 are disposed side by side along the first rotation axis 4236 of the first rotor 4231. At this time, the first end 451 of the first optical element 45 and the second end 452 of the first optical element 45 can be in contact with the inner surface of the first side wall 4234. The bump 4232 may be in contact with the first optical element 45, such that the bump 4232 may be as close as possible to the first optical element 45. Specifically, the bump 4232 may be positioned on the side where the first surface 453 of the first optical element 45 is positioned, and the bump 4232 can abut against the first surface 453 of the first optical element 45. When mounting the first optical element 45, when the first surface 453 is against the bump 4232, it can be considered that the first optical element 45 is mounted in position in the depth direction of the first receiving cavity 4235. More specifically, the bump 4232 may include a bump side wall 1232*a* and the bump side wall 1232*a* can abut against the first surface 453. In another example, the projection range of the first optical element 45 on the first rotation axis 4236 may cover the projection area of the bump 4232 on the first rotation axis 4236.

In one example, when the bump 4232 is mounted in the first receiving cavity 4235, the bump 4232 and the first optical element 45 are disposed side by side along the first rotation axis 4236 of the first rotor 4231. At this time, the first end 451 of the first optical element 45 and the second end 452 of the first optical element 45 can be in contact with the inner surface of the first side wall 4234. The bump side wall 1232*a* may be in a flat plate shape perpendicular to the first rotation axis 4236, and the bump side wall 1232*a* may also be in a stepped shape to simplify the process flow when the bump 4232 and the first rotor 4231 are integrally formed. The bump side wall 1232*a* may also be inclined relative to the first rotation axis 4236, that is, the bump side wall 1232*a* may not be perpendicular to the first rotation axis 4236. In another example, the inclination direction of the bump side wall 1232*a* may be the same as that of the first surface 453, and the bump side wall 1232*a* may be attached to the first surface 453, such that the bump side wall 1232*a* and the first surface 453 are as close as possible, thereby maximizing the counterweight effect of the bump 4232, reducing the height of the bump 4232, and reducing the blocking of the light path by the bump 4232. In another example, the projection range of the first optical element 45 on the first rotation axis 4236 may cover the projection range of the bump 4232 on the first rotation axis 4236.

In one example, the bump 4232 can act as a counterweight. The bump 4232 may rotate synchronously with the first optical element 45. The torque relative to the first rotation axis 4236 when the bump 4232 and the second end 452 rotate synchronously may be equal to the torque relative to the first rotation axis 4236 when the first end 451 rotates. That is, the torque generated when the bump 4232 and the second end 452 rotate synchronously may offset the torque generated when the first end 451 of the first optical element 45 rotates without affecting the stability of the rest of the first rotor 4231 when rotating.

In one example, the bump 4232 may be symmetrical with respect to the third auxiliary surface, and the third auxiliary surface may be a plane passing through the first rotation axis 4236, the first end 451, and the second end 452. In another example, the bump 4232 may also be symmetrical about the first auxiliary plane. In some embodiments, the first auxiliary plane may be a plane perpendicular to the first rotation axis 4236 and passing through the center of the first surface 453. In this way, the bump 4232 can better match the weight of the first optical element 45.

In one example, the density of the bump 4232 may be greater than the density of the first rotor 4231, such that when the bump 4232 are disposed in the first receiving cavity 4235, under the same quality, that is, the same weight, the size of the bump 4232 may be set to be smaller to reduce the influence of the bump 4232 on the laser pulse passing through the first receiving cavity 4235. In another example, the density of the bump 4232 may also be greater than the density of the first optical element 45, such that the size of the bump 4232 can be designed as small as possible.

In this way, the arrangement of the bump 4232 described above is beneficial to reduce the shaking caused by the uneven thickness of the first optical element 45 when the first optical element 45 rotates, and is beneficial to the entire rotor assembly 423 to rotate more smoothly.

Referring to FIG. 14, in one example, the first rotor 4231 includes a third end 4237*a* and a fourth end 4237*b* distributed along the direction of the first rotation axis 4236 of the first rotor 4231. The third end 4237*a* and the fourth end 4237*b* are disposed opposite to each other. The third end 4237*a* of the first rotor 4231 is close to the second surface 454 of the first optical element 45, and the fourth end 4237*b* of the first rotor 4231 is close to the first surface 453 of the first optical element 45. An avoiding chamfer 4230 is disposed on the inner surface of the first side wall 4234, and the avoiding chamfer 4230 is close to the third end 4237*a*. in this way, the avoiding chamfer 4230 not only facilitates the mounting of the first optical element 45 in the first receiving cavity 4235, but also helps increase the angle at which the first optical element 45 receives the reflected laser pulse.

In one example, the first rotor 4231 includes a third end 4237*a* and a fourth end 4237*b* distributed along the direction of the first rotation axis 4236 of the first rotor 4231. The third end 4237*a* and the fourth end 4237*b* are disposed opposite to each other. The third end 4237*a* of the first rotor 4231 is close to the second surface 454 of the first optical element 45, and the fourth end 4237*b* of the first rotor 4231 is close to the first surface 453 of the first optical element 45. The first rotor 4231 further includes a protrusion 4234*d*. The protrusion 4234*d* is disposed on the inner surface of the first side wall 4234 of the first rotor 4231, and is close to the third end 4237*a*. The first end 451 is mounted on the protrusion 4234*d*.

In one example, the first optical element 45 may be coated with an anti-reflection film, and the thickness of the anti-reflection film may equal to the wavelength of the laser pulse emitted by the light source, which can reduce the loss when the laser pulse passes through the first optical element 45.

Referring to FIG. 10, in the embodiments of the present disclosure, the second optical element 46 is formed with a first surface 463 and a second surface 464 opposite to each other. The first surface 463 of the second optical element 46 faces the first surface 453 of the first optical element 45, and the first surface 463 of the second optical element 46 is inclined with respect to the second rotation axis 4337. That is, the angle between the first surface 463 and the second rotation axis 4337 is not 0° or 90°. The second surface 464 of the second optical element 46 is opposite to the first surface 453 of the first optical element 45, and the second surface 464 of the second optical element 46 is perpendicular to the second rotation axis 4337. That is, the angle between the second surface 464 and the second rotation axis 4337 is 90°, in other words, the second surface 464 of the second optical element 46 is parallel to the second surface 454 of the first optical element 45.

It can be understood that since the first surface 463 and the second surface 464 are not parallel, the thickness of the second optical element 46 is not uniform. That is, the thickness of the second optical element 46 is not the same everywhere, and there are positions with a larger thickness and positions with a smaller thickness. In one example, the second optical element 46 may include a first end 461 and a second end 462. The first end 461 and the second end 462 may be respectively positioned at two ends of the second optical element 46 in the radial direction. The thickness of the second optical element 46 may gradually increase in one direction. In addition, the thickness of the first end 461 may be greater than the thickness of the second end 462. In other words, the second optical element 46 may be a wedge mirror (wedge prism).

Due to the uneven weight distribution of the wedge mirror itself, when the wedge mirror is rotated at a high speed, the entire scanning module 40 may be easily shaken and not stable enough. To solve this technical problem, in some embodiments of the present disclosure, the dynamic balance of the scanning module 40 can be improved by increasing the scanning module 40 and the weight. For example, the dynamic balance of the scanning module 40 may be improved by adding a boss 4332 in the second rotor 4331.

Referring to FIG. 10, in one example, the second rotor assembly 433 further includes a boss 4332. The boss 4332 is disposed on the second side wall 4335 of the second rotor 4331 and is positioned in the second receiving cavity 4336. The boss 4332 can be used to improve the movement stability of the second rotor assembly 433 when it rotates. Specifically, the boss 4332 extends from the second side wall 4335 to the center of the second receiving cavity 4336, and the height of the boss 4332 extending to the center of the second receiving cavity 4336 may be lower than a predetermined ratio of the radial width of the second receiving cavity 4336. The predetermined ratio may be 0.1, 0.22, 0.3, 0.33, etc. to prevent the boss 4332 from blocking the second receiving cavity 4336 too much and affecting the transmission optical path of the laser pulse.

The boss 4332 may be fixedly connected to the second rotor 4331, such that the boss 4332 and the second rotor 4331 can rotate synchronously. The boss 4332 may be integrally formed with the second rotor 4331, for example, by injection molding or other processes. The boss 4332 may also be formed separately from the second rotor 4331. After the boss 4332 and the second rotor 4331 are formed separately, the boss 4332 may be fixed on the second side wall 4335 of the second rotor 4331, such as bonding the boss 4332 to the second side wall 4335 by glue, or fixing the boss 4332 on the second side wall 4335 of the second rotor 4331 by a fastener such as a screw. In some embodiments, the surface of the boss 4332 that is attached to the second side wall 4335 of the second rotor 4331 may be a curved surface. In the embodiments of the present disclosure, the boss 4332 may rotate synchronously with the second yoke 4333, and the boss 4332 may be fixedly connected to the second yoke 4333.

Referring to FIG. 10, in one example, when the boss 4332 is mounted in the second receiving cavity 4336, the boss 4332 and the second optical element 46 are distributed along the radial direction of the second rotor 4331. At this time, the first end 461 of the second optical element 46 can be in contact with the inner surface of the second side wall 4335, the second end 462 may form a gap with the second side wall 4335, and the boss 4332 may extend into the gap. In this way, since the second end 462 and the boss 4332 are positioned on the same side of the second rotation axis 4337, and the first end 461 and the boss 4332 are positioned on opposite sides of the second rotation axis 4337, when the second optical element 46 and the second rotor assembly 433 rotate synchronously, the overall rotation formed by the second optical element 46 and the boss 4332 is stable, thereby avoiding the shaking of the second rotor assembly 433, which is beneficial to the entire second rotor assembly 433 to rotate more smoothly. In another example, the boss 4332 may be spaced from the second optical element 46, and the surface of the boss 4332 facing the second optical element 46 may be a flat surface. In another example, the projection range of the boss 4332 on the second rotation axis 4337 may cover the projection range of the second optical element 46 on the second rotation axis 4337.

Referring to FIG. 14, in one example, when the boss 4332 is mounted in the second receiving cavity 4336, the boss 4332 and the second optical element 46 are disposed side by side along the second rotation axis 4337 of the second rotor 4331. At this time, both the first end 461 of the second optical element 46 and the second end 462 of the second optical element 46 can be in contact with the inner surface of the second side wall 4335. The boss 4332 may be in contact with the second optical element 46, such that the boss 4332 may be as close as possible to the second optical element 46. Specifically, the boss 4332 may be positioned on the side where the first surface 463 of the second optical element 46 is positioned, and the boss 4332 can abut against the first surface 463 of the second optical element 46. When mounting the second optical element 46, when the first surface 463 is against the boss 4332, it can be considered that the second optical element 46 is mounted in position in the depth direction of the second receiving cavity 4336. More specifically, the boss 4332 may include a boss side wall 1332a and the boss side wall 1332a can abut against the first surface 463. In another example, the projection range of the second optical element 46 on the second rotation axis 4337 may cover the projection area of the boss 4332 on the second rotation axis 4337.

In one example, when the boss 4332 is mounted in the second receiving cavity 4336, the boss 4332 and the second optical element 46 are disposed side by side along the second rotation axis 4337 of the second rotor 4331. At this time, the first end 461 of the second optical element 46 and the second end 462 of the second optical element 46 can be in contact with the inner surface of the second side wall 4335. The boss side wall 1332a may be in a flat plate shape perpendicular to the second rotation axis 4337, and the boss side wall 1332a may also be in a stepped shape to simplify the process flow when the boss 4332 and the second rotor 4331 are integrally formed. The boss side wall 1332a may also be inclined relative to the second rotation axis 4337, that is, the boss side wall 1332a may not be perpendicular to the second rotation axis 4337. In another example, the inclination direction of the boss side wall 1332a may be the same as that of the first surface 463, and the boss side wall 1332a may be attached to the first surface 463, such that the boss side wall 1332a and the first surface 463 are as close as possible, thereby maximizing the counterweight effect of the boss 4332, reducing the height of the boss 4332, and reducing the blocking of the light path by the boss 4332. In another example, the projection range of the second optical element 46 on the second rotation axis 4337 may cover the projection range of the boss 4332 on the second rotation axis 4337.

In one example, the boss 4332 can act as a counterweight. The boss 4332 may rotate synchronously with the second optical element 46. The torque relative to the second rotation axis 4337 when the boss 4332 and the second end 462 rotate synchronously may be equal to the torque relative to the second rotation axis 4337 when the first end 461 rotates. That is, the torque generated when the boss 4332 and the second end 462 rotate synchronously may offset the torque generated when the first end 461 of the second optical element 46 rotates without affecting the stability of the rest of the second rotor 4331 when rotating.

In one example, the boss 4332 may be symmetrical with respect to the third auxiliary surface, and the third auxiliary surface may be a plane passing through the second rotation axis 4337, the first end 461, and the second end 462. In another example, the boss 4332 may also be symmetrical about the first auxiliary plane. In some embodiments, the first auxiliary plane may be a plane perpendicular to the second rotation axis 4337 and passing through the center of the first surface 463. In this way, the boss 4332 can better match the weight of the second optical element 46.

In one example, the density of the boss 4332 may be greater than the density of the second rotor 4331, such that when the boss 4332 are disposed in the second receiving cavity 4336, under the same quality, that is, under the same weight, the size of the boss 4332 may be set to be smaller to reduce the influence of the boss 4332 on the laser pulse passing through the second receiving cavity 4336. In another example, the density of the boss 4332 may also be greater than the density of the second optical element 46, such that the size of the boss 4332 can be designed as small as possible.

In this way, the arrangement of the boss 4332 described above is beneficial to reduce the shaking caused by the uneven thickness of the second optical element 46 when the second optical element 46 rotates, and is beneficial to the entire second rotor assembly 433 to rotate more smoothly.

In one example, the second optical element 46 may be coated with an anti-reflection film, and the thickness of the anti-reflection film may equal to the wavelength of the laser pulse emitted by the light source, which can reduce the loss when the laser pulse passes through the second optical element 46.

In one example, the size of the aperture of the second optical element 46 may be 50%-70% of the size of the aperture of the first optical element 45. For example, the difference between the aperture sizes of the two optical elements (the first optical element 45 and the second optical element 46) may be 50%, or the difference between the aperture sizes of the two optical elements (the first optical element 45 and the second optical element 46) may be 60%. In this way, the aperture size of the two optical elements (the first optical element 45 and the second optical element 46) can be in an appropriate range to facilitate the propagation of light.

Referring to FIG. 10, in the embodiments of the present disclosure, the third optical element 47 is formed with a first surface 473 and a second surface 474 opposite to each other. The first surface 473 of the third optical element 47 faces the second surface 464 of the second optical element 46, and the first surface 473 of the third optical element 47 is inclined with respect to the third rotation axis 4437. That is, the angle between the first surface 473 and the third rotation axis 4437 is not 0° or 90°. The second surface 474 of the third optical element 47 is opposite to the second surface 464 of the second optical element 46, and the second surface 474 of the third optical element 47 is perpendicular to the third rotation axis 4437. That is, the angle between the second surface 474 and the third rotation axis 4437 is 90°, or in other words, the second surface 474 of the third optical element 47 is parallel to the second surface 464 of the second optical element 46, or in other words, the second surface 474 of the third optical element 47, the second surface 464 of the second optical element 46, and the second surface 454 of the first optical element 45 are parallel to each other.

It can be understood that since the first surface 473 and the second surface 474 of the third optical element 47 are not parallel, the thickness of the third optical element 47 is not uniform. That is, the thickness of the third optical element 47 is not the same everywhere, and there are positions with a larger thickness and positions with a smaller thickness. In one example, the third optical element 47 may include a first end 471 and a second end 472. The first end 471 and the second end 472 may be respectively positioned at two ends of the third optical element 47 in the radial direction. The thickness of the third optical element 47 may gradually increase in one direction. In addition, the thickness of the first end 471 may be greater than the thickness of the second end 472. In other words, the third optical element 47 may be a wedge mirror (wedge prism).

Due to the uneven weight distribution of the wedge mirror itself, when the wedge mirror is rotated at a high speed, the entire scanning module 40 may be easily shaken and not stable enough. To solve this technical problem, in some embodiments of the present disclosure, the dynamic balance of the scanning module 40 can be improved by increasing the scanning module 40 and the weight. For example, the dynamic balance of the scanning module 40 may be improved by adding a boss 4432 in the third rotor 4431.

When increasing the weight of the scanning module 40 to improve the dynamic balance of the scanning module 40, a boss 4432 can be added in the third rotor 4431 to improve the dynamic balance of the scanning module 40.

Referring to FIG. 10, in one example, the third rotor assembly 443 further includes a boss 4432. The boss 4432 is disposed on the third side wall 4435 of the third rotor 4431 and is positioned in the third receiving space 4436. The boss 4432 can be used to improve the movement stability of the third rotor assembly 443 when it rotates. Specifically, the boss 4432 extends from the third side wall 4435 to the center of the third receiving space 4436, and the height of the boss 4432 extending to the center of the third receiving space 4436 may be lower than a predetermined ratio of the radial width of the third receiving space 4436. The predetermined ratio may be 0.1, 0.22, 0.3, 0.33, etc. to prevent the boss 4432 from blocking the third receiving space 4436 too much and affecting the transmission optical path of the laser pulse.

The boss 4432 may be fixedly connected to the third rotor 4431, such that the boss 4432 and the third rotor 4431 can rotate synchronously. The boss 4432 may be integrally formed with the third rotor 4431, for example, by injection molding or other processes. The boss 4432 may also be formed separately from the 4431. After the boss 4432 and the third rotor 4431 are formed separately, the boss 4432 may be fixed on the third side wall 4435 of the third rotor 4431, such as bonding the boss 4432 to the third side wall 4435 by glue, or fixing the boss 4432 on the third side wall 4435 of the third rotor 4431 by a fastener such as a screw. In some embodiments, the surface of the boss 4432 that is attached to the third side wall 4435 may be a curved surface. In the embodiments of the present disclosure, the boss 4432 may rotate synchronously with the third yoke 4433, and the boss 4432 may be fixedly connected to the third yoke 4433.

Referring to FIG. 10, in one example, when the boss 4432 is mounted in the third receiving space 4436, the boss 4432 and the third optical element 47 are distributed along the radial direction of the third rotor 4431. At this time, the first end 471 of the third optical element 47 can be in contact with the inner surface of the third side wall 4435, the second end 472 may form a gap with the third side wall 4435, and the boss 4432 may extend into the gap. In this way, since the second end 472 and the boss 4432 are positioned on the same side of the third rotation axis 4437, and the first end 471 and the boss 4432 are positioned on opposite sides of the third rotation axis 4437, when the third optical element 47 and the third rotor assembly 443 rotate synchronously, the overall rotation formed by the third optical element 47 and the boss 4432 is stable, thereby avoiding the shaking of the third rotor assembly 443, which is beneficial to the entire third rotor assembly 443 to rotate more smoothly. In another example, the boss 4432 may be spaced from the third optical element 47, and the surface of the boss 4432 facing the third optical element 47 may be a flat surface. In another example, the projection range of the boss 4432 on the third rotation axis 4437 may cover the projection range of the third optical element 47 on the third rotation axis 4437.

Referring to FIG. 14, in one example, when the boss 4432 is mounted in the third side wall 4435, the boss 4432 and the third optical element 47 are disposed side by side along the third rotation axis 4437 of the third rotor 4431. At this time, both the first end 471 of the third optical element 47 and the second end 472 of the third optical element 47 can be in contact with the inner surface of the third side wall 4435. The boss 4432 may be in contact with the third optical element 47, such that the boss 4432 may be as close as possible to the third optical element 47. Specifically, the boss 4432 may be positioned on the side where the first surface 473 of the third optical element 47 is positioned, and the boss 4432 can abut against the first surface 473 of the third optical element 47. When mounting the third optical element 47, when the first surface 473 is against the boss 4432, it can be considered that the third optical element 47 is mounted in position in the depth direction of the third receiving space 4436. More specifically, the boss 4432 may include a boss side wall 1432a and the boss side wall 1432a can abut against the first surface 473. In another example, the projection range of the third optical element 47 on the third rotation axis 4437 may cover the projection area of the boss 4432 on the third rotation axis 4437.

Referring to FIG. 14, in one example, when the boss 4432 is mounted in the third receiving space 4436, the boss 4432 and the third optical element 47 are disposed side by side along the third rotation axis 4437 of the third rotor 4431. At this time, the first end 471 of the third optical element 47 and the second end 472 of the third optical element 47 can be in contact with the inner surface of the third side wall 4435. The boss side wall 1432a may be in a flat plate shape perpendicular to the third rotation axis 4437, and the boss side wall 1432a may also be in a stepped shape to simplify the process flow when the boss 4432 and the third rotor 4431 are integrally formed. The boss side wall 1432a may also be inclined relative to the third rotation axis 4437, that is, the boss side wall 1332a may not be perpendicular to the third rotation axis 4437. In another example, the inclination direction of the boss side wall 1432a may be the same as that of the first surface 473, and the boss side wall 1432a may be attached to the first surface 473, such that the boss side wall 1432a and the first surface 473 are as close as possible, thereby maximizing the counterweight effect of the boss 4432, reducing the height of the boss 4432, and reducing the blocking of the light path by the boss 4432. In another example, the projection range of the third optical element 47 on the third rotation axis 4437 may cover the projection range of the boss 4432 on the third rotation axis 4437.

Referring to FIG. 14, in one example, the boss 4432 can act as a counterweight. The boss 4432 may rotate synchronously with the third optical element 47. The torque relative to the third rotation axis 4437 when the boss 4432 and the second end 472 rotate synchronously may be equal to the torque relative to the third rotation axis 4437 when the first end 471 rotates. That is, the torque generated when the boss 4432 and the second end 472 rotate synchronously may offset the torque generated when the first end 471 of the third optical element 47 rotates without affecting the stability of the rest of the third rotor 4431 when rotating.

In one example, the boss 4432 may be symmetrical with respect to the third auxiliary surface, and the third auxiliary surface may be a plane passing through the third rotation axis 4437, the first end 471, and the second end 472. In another example, the boss 4432 may also be symmetrical about the first auxiliary plane. In some embodiments, the first auxiliary plane may be a plane perpendicular to the third rotation axis 4437 and passing through the center of the first surface 473. In this way, the boss 4432 can better match the weight of the third optical element 47.

Referring to FIG. 14, in one example, the density of the boss 4432 may be greater than the density of the third rotor 4431, such that when the boss 4432 are disposed in the third receiving space 4436, under the same quality, that is, under the same weight, the size of the boss 4432 may be set to be smaller to reduce the influence of the boss 4432 on the laser pulse passing through the third receiving space 4436. In another example, the density of the boss 4432 may also be greater than the density of the third optical element 47, such that the size of the boss 4432 can be designed as small as possible.

In this way, the arrangement of the boss 4432 described above is beneficial to reduce the shaking caused by the uneven thickness of the third optical element 47 when the third optical element 47 rotates, and is beneficial to the entire third rotor assembly 443 to rotate more smoothly.

In one example, the third optical element 47 may be coated with an anti-reflection film, and the thickness of the anti-reflection film may equal to the wavelength of the laser pulse emitted by the light source, which can reduce the loss when the laser pulse passes through the third optical element 47.

In one example, the difference between the aperture sizes of two optical elements (the second optical element 46 and the third optical element 47) may be less than or equal to 10% of the respective aperture sizes. For example, the aperture size of the two optical elements (the second optical element 46 and the third optical element 47) may be the same, or the difference between the aperture sizes of two optical elements (the second optical element 46 and the third optical element 47) may be equal to 10% of the aperture size of one of the optical elements (the second optical element 46 or the third optical element 47).

Referring to FIG. 9 and FIG. 10, in one example, the scanning module 40 does not include the third driver 44 and the third optical element 47, but includes a plurality of second rotor assemblies 433, a plurality of second stator assemblies 431, and a plurality of second optical elements 46. Each second optical element 46 is mounted on a corresponding second rotor assembly 433, and each second stator assembly 431 is used to drive a corresponding second rotor assembly 433 to drive the second optical element 46 to rotate. Each second rotor assembly 433, each second stator assembly 431, and each second optical element 46 can be the second rotor assembly 433, the second stator assembly 431, and the second optical element 46 in any of the above embodiments, and detailed will not be repeated. In some embodiments, in the context the present disclosure, the term "plurality" means at least two or more. After the direction of the laser beam is changed by a second optical element 46, the direction can be changed again by another second optical element 46 to increase the ability of the scanning module 40 to change the laser propagation direction as a whole to scan a larger space. In addition, by setting different rotation directions and/or rotation speeds of the second rotor assembly 433, the laser beam can scan a predetermined scanning shape. In addition, each second rotor assembly 433 may include a boss (1332/1432), and each boss (1332/1432) may be fixed on the second side wall 4335 of the corresponding second rotor assembly 433 for improving the dynamic balance of the second rotor assembly 433 when it rotates.

The second rotation axes 4337 of the plurality of second rotor assemblies 433 may be the same, and the plurality of second optical elements 46 may all rotate around the same second rotation axis 4337. The second rotation axes 4337 of the plurality of second rotor assemblies 433 may also be different, and the plurality of second optical elements 46 may rotate around different second rotation axes 4337. In another example, the plurality of second optical elements 46 may also vibrate in the same direction or in different directions, which is not limited herein.

The plurality of second rotor assemblies 433 may rotate relative to the corresponding second stator assemblies 431 at different rotation speeds to drive the plurality of second optical elements 46 to rotate at different rotation speeds. The plurality of second rotor assemblies 433 may also rotate relative to the corresponding second stator assemblies 431 at different rotation directions, thereby driving the plurality of second optical elements 46 to rotate in different rotation directions. The plurality of second rotor assemblies 433 may rotate at the same speed and opposite directions. For example, at least one second rotor assembly 433 can rotate forward relative to the second stator assembly 431, and at least one second rotor assembly 433 can rotate in reverse relative to the second stator assembly 431. Or, at least one second rotor assembly 433 can rotate relative to the second stator assembly 431 at a first speed, and at least one second rotor assembly 433 can rotate relative to the second stator assembly 431 at a second speed. The first speed and the second speed may be the same or different.

In one example, the numbers of the second rotor assembly 433, the second stator assembly 431, and the second optical element 46 are all two. The two second rotor assemblies 433 can rotate coaxially, and the two second rotor assemblies 433 and the rotor assembly 423 can both rotate coaxially. The first surface 463 of one of the second optical elements 46 can face the fourth end 4237b of the first rotor 4231 and can be opposite to the first surface 453 of the first optical element 45, and the second surface 454 of the second optical element 46 can face the second surface 454 of the other optical element.

Figure 28:
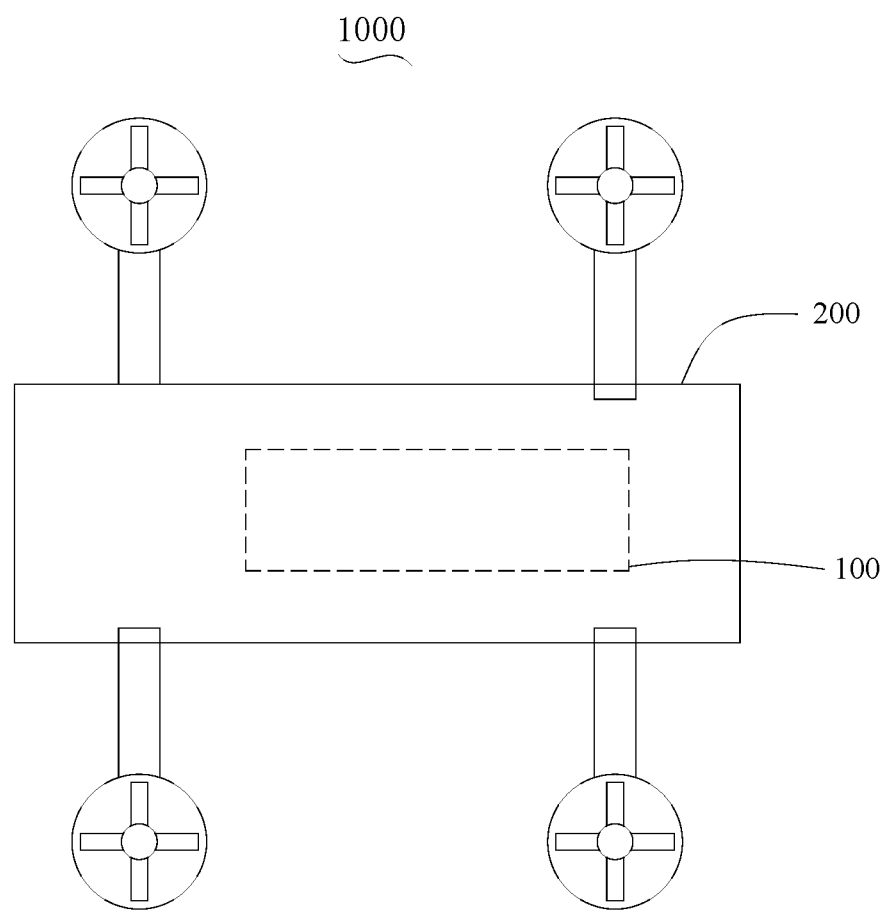
FIG. 28 is a schematic plan diagram of a mobile platform according to some embodiments of the present disclosure.

Referring to FIG. 28, an embodiment of the present disclosure further provides a mobile platform 1000. The mobile platform 1000 includes a mobile platform body 200 and the distance measuring device 100 of any of the above embodiments. The mobile platform 1000 may be a mobile platform such as an unmanned aerial vehicle, an unmanned vehicle, and an unmanned ship. A mobile platform 1000 may be configured with one or more distance measuring devices 100. The distance measuring device 100 may be used to detect the environment around the mobile platform 1000, such that the mobile platform 1000 can further perform obstacle avoidance and trajectory selection operations based on the surrounding environment.

In the present description, descriptions of reference terms such as "an embodiment," "some embodiments," "illustrative embodiment," "example," "specific example," or "some examples," mean that characteristics, structures, materials, or features described in relation to the embodiment or example are included in at least one embodiment or example of the present disclosure. In the present description, illustrative expression of the above terms does not necessarily mean the same embodiment or example. Further, specific characteristics, structures, materials, or features may be combined in one or multiple embodiments or examples in a suitable manner.

In the description of the present disclosure, the terms "first" and "second" are used for descriptive purposes only, which cannot be construed as indicating or implying a relative importance, or implicitly specifying the number of the indicated technical features. Thus, the features defined with "first" and "second" may explicitly or implicitly include one or more features. In the description of the present disclosure, "a plurality of" means at least two, such as two, three, etc., unless specifically stated otherwise.

The above descriptions of various embodiments of the present disclosure are illustrative, and do not limit the scope of the present disclosure. A person having ordinary skills in the art can make changes, modifications, substitutions, and variations based on the present disclosure. The scope of the present disclosure is defined by the following claims and the equivalents.

What is claimed is:

1. A distance measuring device, comprising:
a scanning module including a rotor assembly, the rotor assembly including a rotor and a bump, the rotor including a receiving cavity and an optical element disposed in the receiving cavity, the optical element rotating synchronously with the rotor assembly, the optical element including a first end and a second end, the first end and the second end being respectively positioned at two ends in a radial direction of the optical element, a thickness of the first end being greater than a thickness of the second end, a notch being formed on a side of the first end of the rotor or/and the optical element, the second end of the optical element being opposite to the bump and positioned on the same side of a rotation axis of the rotor, wherein the bump rotates synchronously with the optical element, and a torque associated with the synchronous rotation of the bump and the second end of the optical element relative to the rotation axis offsets a torque associated with a rotation of the first end of the optical element relative to the rotation axis; and
a distance measuring module, the distance measuring module being configured to emit a laser pulse to the scanning module, the scanning module being configured to change a transmission direction of the laser pulse and emit the laser pulse, the laser pulse reflected by an object to be detected passing through the scanning module and entering the distance measuring module, the distance measuring module being configured to determine a distance between the object to be detected and the distance measuring device based on the reflected laser pulse.

2. A distance measuring device, comprising:
a scanning module including:
- a first rotor assembly, the first rotor assembly including a first rotor, the first rotor including a first receiving cavity;
- a first optical element mounted in the first receiving cavity, the first optical element including a first end and a second end, the first end of the first optical element and the second end of the first optical element being respectively positioned at two ends in a radial direction of the first optical element, a thickness of the first end of the first optical element being greater than a thickness of the second end of the first optical element, a notch being formed on a side of the first rotor or/and the first optical element positioned at the first end of the first optical element;
- a second rotor assembly, the second rotor assembly including a second rotor and a boss, the second rotor including a second receiving cavity, the boss being disposed on an inner wall of the second rotor and positioned in the second receiving cavity; and
- a second optical element mounted in the second receiving cavity, the second optical element including a first end and a second end, the first end of the second optical element and the second end of the second optical element being respectively positioned at two ends in a radial direction of the second optical element, a thickness of the first end of the second optical element being greater than a thickness of the second end of the second optical element, the second end of the second optical element being opposite to the boss and positioned on the same side of a rotation axis of the second rotor, wherein the boss rotates synchronously with the second optical element, and a torque associated with the synchronous rotation of the boss and the second end of the second optical element relative to the rotation axis offsets a torque associated with a rotation of the first end of the second optical element relative to the rotation axis; and a distance measuring module, the distance measuring module being configured to emit a laser pulse to the scanning module, the scanning module being configured to change a transmission direction of the laser pulse and emit the laser pulse, the laser pulse reflected by an object to be detected passing through the scanning module and entering the distance measuring module, the distance measuring module being configured to determine a distance between the object to be detected and the distance measuring device based on the reflected laser pulse.

3. The distance measuring device of claim 2, wherein:
a gap is formed between the second end of the second optical element and the inner wall of the second rotor, and the boss extends into the gap.

4. The distance measuring device of claim 2, wherein:
the second optical element is spaced apart from the boss.

5. The distance measuring device of claim 2, wherein:
a surface of the boss facing the second optical element is a flat surface, and a surface of the boss attached to the inner wall of the second rotor is a curved surface.

6. The distance measuring device of claim 2, wherein:
the boss and the second rotor are integrally formed; or the boss and the second rotor are formed separately, the boss being fixed on the inner wall of the second rotor.

7. The distance measuring device of claim 2, wherein:
a density of the boss is greater than a density of the second rotor and/or the second optical element.

8. The distance measuring device of claim 2, wherein:
the second optical element is formed with a first surface inclined with respect to the rotation axis and a second surface opposite to the first surface of the second optical element, the second surface of the second optical element being perpendicular to the rotation axis.

9. The distance measuring device of claim 2, wherein:
a projection range of the boss on the rotation axis covers a projection range of the second optical element on the rotation axis.

10. The distance measuring device of claim 2, wherein:
the scanning module includes a plurality of second rotor assemblies including the second rotor assembly, a plurality of stator assemblies, and a plurality of second optical elements including the second optical element, each of the second optical elements being mounted on a corresponding second rotor assembly, each of the stator assemblies being used to drive a corresponding second rotor assembly to drive the corresponding second optical element to rotate.

11. The distance measuring device of claim 10, wherein:
the plurality of second rotor assemblies includes two second rotor assemblies, the plurality of second optical elements includes two second optical elements, and a difference between apertures of the two second optical elements is less than or equal to 70% of the respective apertures.

12. The distance measuring device of claim 11, wherein:
the apertures of the two second optical elements are the same.

13. The distance measuring device of claim 10, wherein:
the plurality of second rotor assemblies are configured to rotate relative to the corresponding stator assemblies at different rotation speeds and/or rotation directions.

14. The distance measuring device of claim 2, further comprising:
- a stator assembly, the inner wall of the second rotor being a ring structure or a part of the ring structure, and
- a positioning assembly positioned outside the inner wall of the second rotor, the positioning assembly being used to restrict the second rotor assembly to rotating around a fixed rotation axis, the positioning assembly including an annular bearing surrounding an outer side of the inner wall of the second rotor; and/or, the stator assembly including a ring-shaped winding surrounding the outer side of the inner wall of the second rotor.

15. The distance measuring device of claim 14, wherein:
the stator assembly and the positioning assembly surround the inner wall of the second rotor side by side.

16. The distance measuring device of claim 14, further comprising:
a scanning housing, the stator assembly, the second rotor assembly, and the positioning assembly being received in the scanning housing, wherein
the positioning assembly includes an inner annular structure fixed to the outer side of the inner wall of the second rotor, an outer annular structure fixed to the scanning housing, and a rolling element positioned between the inner annular structure and the outer annular structure, the rolling element being used for a rolling connection with the outer annular structure and the inner annular structure respectively.

17. The distance measuring device of claim 2, wherein:
the notch includes a chamfer disposed on an edge of the first end of the first optical element; and/or,
the notch includes an inner groove formed on an inner surface of a first rotor side wall, the inner groove being close to the side of the first end of the first optical element; and/or,
the notch includes an outer groove formed on an outer surface of the first rotor side wall, the outer groove being close to the side of the first end of the first optical element; and/or,
the notch includes a groove formed in the middle of the first rotor side wall, the groove being close to the side of the first end of the first optical element; and/or,
a rib is formed on the outer surface of the first rotor side wall extending radially outward, the rib being disposed around the first rotor side wall, and the notch including an opening disposed on the rib.

18. The distance measuring device of claim 2, wherein:
the notch includes a corner disposed at the edge of the first end of the first optical element, and the corner is opposite to an inner wall of the first rotor.

19. The distance measuring device of claim 2, wherein:
the first rotor further includes a protrusion, the protrusion being disposed on the inner surface of the first rotor side wall, the first end of the first optical element being mounted on the protrusion.

20. The distance measuring device of claim 2, wherein:
the first optical element is formed with a first surface inclined with respect to a first rotation axis and a second surface opposite to the first surface of the first optical element, the second surface of the first optical element being perpendicular to the first rotation axis.

21. A distance measuring device, comprising:
a scanning module including:
  a first rotor assembly, the first rotor assembly including a first rotor, the first rotor including a first receiving cavity;
  a first optical element mounted in the first receiving cavity, the first optical element including a first end and a second end, the first end of the first optical element and the second end of the first optical element being respectively positioned at two ends in a radial direction of the first optical element, a thickness of the first end of the first optical element being greater than a thickness of the second end of the first optical element, a notch being formed on a side of the first rotor or/and the first optical element positioned at the first end of the first optical element;
  a second rotor assembly, the second rotor assembly including a second rotor and a boss, the second rotor including a second receiving cavity, the boss being disposed on an inner wall of the second rotor and positioned in the second receiving cavity; and
  a second optical element mounted in the second receiving cavity, the second optical element including a first end and a second end, the first end of the second optical element and the second end of the second optical element being respectively positioned at two ends in a radial direction of the second optical element, a thickness of the first end of the second optical element being greater than a thickness of the second end of the second optical element, the second end of the second optical element being opposite to the boss and positioned on the same side of a rotation axis of the second rotor, wherein the scanning module includes a plurality of second rotor assemblies including the second rotor assembly, a plurality of stator assemblies, and a plurality of second optical elements including the second optical element, each of the second optical elements being mounted on a corresponding second rotor assembly, each of the stator assemblies being used to drive a corresponding second rotor assembly to drive the corresponding second optical element to rotate; and
a distance measuring module, the distance measuring module being configured to emit a laser pulse to the scanning module, the scanning module being configured to change a transmission direction of the laser pulse and emit the laser pulse, the laser pulse reflected by an object to be detected passing through the scanning module and entering the distance measuring module, the distance measuring module being configured to determine a distance between the object to be detected and the distance measuring device based on the reflected laser pulse.

* * * * *